United States Patent
Jørgensen et al.

(10) Patent No.: US 7,360,087 B2
(45) Date of Patent: *Apr. 15, 2008

(54) PERVASIVE, USER-CENTRIC NETWORK SECURITY ENABLED BY DYNAMIC DATAGRAM SWITCH AND AN ON-DEMAND AUTHENTICATION AND ENCRYPTION SCHEME THROUGH MOBILE INTELLIGENT DATA CARRIERS

(75) Inventors: Jimi T. Jørgensen, Løgtvedvej (DK); Craig L. Damon, Skibby (DK); Jan Pathuel, Herlev (DK); Christopher L. Arlaud, Helsinge (DK)

(73) Assignee: Giritech A/S, Albertslund (DE)

( * ) Notice: Subject to any disclaimer, the term of this patent is extended or adjusted under 35 U.S.C. 154(b) by 776 days.

This patent is subject to a terminal disclaimer.

(21) Appl. No.: 10/759,789

(22) Filed: Jan. 16, 2004

(65) Prior Publication Data

US 2004/0221163 A1 Nov. 4, 2004

Related U.S. Application Data

(63) Continuation-in-part of application No. 10/428,895, filed on May 2, 2003, now Pat. No. 7,103,772.

(51) Int. Cl.
*H04L 9/00* (2006.01)
(52) U.S. Cl. .............................. 713/168; 726/2; 726/3; 726/11; 726/12; 455/410; 455/411
(58) Field of Classification Search ................ 713/168, 713/185; 726/2–3, 11–12; 709/224–225, 709/203; 455/410–411
See application file for complete search history.

(56) References Cited

U.S. PATENT DOCUMENTS 6,405,203 B1 6/2002 Collart
6,732,278 B2 5/2004 Baird, III et al.

OTHER PUBLICATIONS

International Search Report for PCT/US04/02438, mailed Feb. 15, 2006.
International Preliminary Report on Patentability for PCT/US04/02438, issued Jul. 31, 2006.

*Primary Examiner*—T. B. Truong
(74) *Attorney, Agent, or Firm*—Qin Shi

(57) ABSTRACT

Methods and systems are provided for improving access control, administrative monitoring, reliability, as well as flexibility of data transmission and remote application sharing over a network. Secure, stable network connections and efficient network transactions among multiple users are supported by an open and distributed client-server architecture. A datagram schema is adapted to enable dynamic datagram switching in support of a multitude of applications and network services. Mobile intelligent data carriers are provided that allow for the implementation of an authentication and encryption scheme. The intelligent data carriers are adapted to target deliver applications to authorized users, thereby achieving access control to not only data but also applications. The authentication and encryption scheme in one embodiment is based on physical or performance biometrics. The methods and systems of this disclosure may be advantageously deployed in an enterprise network environment to support a wide spectrum of business, research, and administrative operations.

59 Claims, 8 Drawing Sheets

PERVASIVE, USER-CENTRIC NETWORK SECURITY ENABLED BY DYNAMIC DATAGRAM SWITCH AND AN ON-DEMAND AUTHENTICATION AND ENCRYPTION SCHEME THROUGH MOBILE INTELLIGENT DATA CARRIERS

CROSS REFERENCE TO RELATED APPLICATIONS

This application is a continuation-in-part of U.S. patent application Ser. No. 10/428,895, filed May 2, 2003, now U.S. Pat. No. 7,103,772 the entire disclosure of which is hereby incorporated by reference.

BACKGROUND OF THE DISCLOSURE

1. Field of the Embodiments

The present disclosure relates in general to digital network communications. Specifically, the present disclosure relates to secure data transmission and provision of remote application services in an open or closed network setting. More specifically, methods and integrated systems are provided for improving access control, administrative monitoring, reliability and integrity of data transmission and remote application sharing over a network. The disclosed methods and systems employ a datagram schema that enables dynamic datagram switching in network transactions in support of a multitude of applications and network services. Mobile intelligent data carriers are provided in various embodiments that allow for implementation of an authentication and encryption scheme. The pervasive, user-centric network security enabled by the disclosed methods and systems may be advantageously deployed in, among other things, the financial and banking environment, the national security and military information technology (IT) systems, the healthcare management networks, the IT infrastructure for legal and other professional consultation services, and various online commercial transaction systems. The systems and methods according to this disclosure may be implemented in connection with biometric and other suitable authentication means.

2. Description of the Related Art

The digital revolution, accompanied by globalization, is transforming people's life in an unprecedented way. The growth and evolution of the Internet fuels the expansion of the existing businesses while fostering the emergence of new enterprises cross nation lines. In today's global economy, the viability of a business or research institution turns in a large part on its efficiency in processing and managing information. Data transmission and management is playing an increasingly vital role in a variety of industries. Engineers and business visionaries have been faced with a significant challenge to institute secure network systems that enable stable and efficient data transmission, effective access control, and remote sharing and management of application resources among distributed computers in service to multiple users.

Various network configurations have been in use in institutional IT infrastructures. Ethernet, token ring, and client-server architecture, for example, are widely adopted. Related technologies for data encryption and compression are similarly known and have been utilized to facilitate secure data transmission. The existing network systems often suffer from interception of data transactions and loss of network connections. It is generally difficult to restore a lost connection. It is even more challenging to accurately reestablish the parameters of a lost connection thereby ensuring the integrity of the reconnection. Data may be lost and data transmission will need to start over. The loss may be permanent if one cannot trace and gather a threshold level of information to allow rescue. This lack of stability greatly compromises the fidelity of data transmission and thus poses a fatal problem for distributive data processing and management. Significant costs are incurred in coping with such failure. As manifested in the difficulties encountered in the recent years by on-line electronic businesses, this problem can hamper an entire industry.

The problem of instable—hence unreliable—network communications is compounded by a want of comprehensive, robust, user-friendly, and cost-efficient network security solutions for safeguarding information dissemination and application management in a distributive enterprise IT environment. Private businesses and public institutions alike often suffer significant financial losses from security breaches. A great deal of money is also wasted on inefficient IT security solutions due to uncoordinated information and application management.

Drawbacks of the current network security solutions are manyfold. In the main, four aspects are noteworthy: First, there is lacking an integrated system that secures an entire network without severely limiting business growth. Organizations are forced to employ a multiplicity of products from different vendors to fulfill different security functions. Each of these products only solves a discreet aspect of the overall network security needs. For example, a firewall does not encrypt data being transmitted across the Internet; an Intrusion Detection System (IDS) cannot validate and ensure that the person who enters an authorized login name and password to open a Virtual Private Network (VPN) connection is in fact the intended user; and, a VPN doesn't help an IT department monitor user rights and access policies. Thus, no existing system or method is capable of singularly protecting every aspect of a network. Resorting to multiple security products from competing vendors creates incompatibility problems. Maintaining a fluctuating number of peripheral security devices and software packages can also be extremely complex and overly expensive. On the whole, such patchwork solution is less than effective in protecting institutional IT framework.

Secondly, the existing focus is on securing devices and data. Such system-centric approach fails to safeguard the point of access at individual users who use the devices. This inherent problem with the current approach will become more and more conspicuous as the number of devices and degree of user mobility increases—an inevitable as the world is transitioning into pervasive computing.

To appreciate the inherent flaws of the system-centric systems, one can consider the various scenarios of cyber-crimes. Cyber-crimes are often marked by the perpetrator's attempt to disguise its identity, whether masquerading as someone else or covering its trail over the routings. Such attempt too often succeeds because, at least in part, the techniques used to establish and verify the user's identity are fallible. For example, most passwords are easy to break; they are often too obvious or are stored on a device that can be easily compromised. The existing infrastructure supporting digital certificates and public/private keys is also subject to abuse. Therefore, the existing ways for identifying the users of a network device and securing the device vis-á-vis these users—hence system-centric—presents inherent security liabilities. A high level of security will remain illusory if no effective means is adopted for pinpointing the identities of those who attempt to access a protected network. A major paradigm shift is thus warranted for better network security, from protecting the devices and data to protecting the users. A user-centric scheme for establishing and validating user identities, thereby enabling mobile access and event-based, user-centric security, is desirable.

Third, the existing IT security solutions are too complex for ordinary users. Average users are expected to perform complicated security procedures, which often result in errors and security lapses in the enterprise IT environment. For example, VPNs are far from straightforward in their installation, operation, or maintenance. Encrypting emails involves extra work so very few ever bother to do it. Even selecting and remembering a good password can be too much trouble for many people. Relying on users who are not IT experts to perform complicated security procedures simply doesn't work. An ordinary user may find ways to bypass the security procedures or outright ignore them. Moreover, maintaining and operating a deluge of software patches also drains the resources in many IT departments and run beyond their capacity. Therefore, an effective security solution that is user friendly and that draws minimal operational and administration overheads is in need.

And finally, like in other fields, certain inertia exists in the IT security industry. Changes and new methodologies to some extent are resisted. The existing way of doing things prevails and dominates the landscape of network security solutions on both the provider side and the consumer side. The adherence to the existing technologies and the band-aid approach for improvements and modifications hampers the development of true innovative solutions.

For the aforementioned reasons, there is a need for a new network security paradigm that delivers the desired reliability, efficiency, and user-friendliness. The kind of security solution that can meet the needs of distributive IT framework and support pervasive computing and information processing must address the fallacies of the existing systems.

A skilled network engineer or a learned user of business IT networks will appreciate the importance of better IT security solutions. To that end, a brief review of the history of institutional computing and IT networks will be useful.

The first computers were mainframes. These complex monolithic devices required a protected environment to function properly. They could only be operated by skilled technicians with highly specialized knowledge. Access to them was confined and they offered limited connectivity with other devices. As a result, they were easy to secure.

The advent of the personal computer (PC), the evolution of networking technology and, particularly, the recent explosive growth of the Internet transformed the way people use and relate to computers. The size of the computer devices decreased; they became readily moveable, as well as operable by lay individuals aided by friendly user interfaces. Computers were connected to create computer networks, allowing for information and application sharing. The Internet brought the network connectivity to its acme—the true global connectivity that is affordable to the mass. In addition to the desktop and laptop PCs, personal digital assistant (PDAs), Tablet PCs, and mobile phones grew popular among people who need network access outside of their home or office.

The rapid advance of technologies and expansion of business needs presented an unprecedented challenge for the IT departments around the world. An ever-increasing amount of data—accessible from a vast number of devices—needs to be protected. And, such protection must be instituted against the backdrop of the broadband "always-on" connections. Also noteworthy are the regulatory initiative in various countries addressing privacy and information ownership concerns over the Internet. Clearly, a network security solution that is technically robust and comprehensive business-wise is needed, especially in view of the next inevitable phase of the IT evolution, one marked by pervasive computing. All analog devices are being and expected to be replaced by digital counterparts. Televisions, telephones, CDs and DVDs, digital cameras, video cameras, and computer game platforms alike will—if not already—all support Internet access. As network data access becomes possible everywhere and all the time, the need for protecting proprietary corporate data and sensitive private information becomes more pressing and, the level of difficulty in meeting such needs correspondingly elevates.

In sum, reflecting on the evolution of the organizational IT infrastructure and the current deficiencies in secure network communications, an ordinarily skilled artisan will appreciate the need for systems and methods that improve the security, stability, efficiency, and flexibility of network data transmission and, connected thereto, the need for a new network paradigm for secure and reliable enterprise information management and application sharing.

SUMMARY OF THE VARIOUS EMBODIMENTS

It is therefore an object of this disclosure to provide systems and methods for improving the reliability, flexibility, and efficiency of secure data transmission and application sharing over a network. Particularly, the methods and systems disclosed herein enable an open client-server architecture that supports secure, flexible network connections and reliable, efficient network transactions among multiple users. This IT network platform delivers pervasive security, i.e., security on demand with variegated network connecting devices, and it is user-centric, i.e., it secures the users rather than the devices the users use to connect to the network. The pervasive and user-centric security may be instituted according to one embodiment with the presently disclosed systems and methods anytime, anywhere, using any network device.

A datagram schema is provided in one embodiment, which allows for the implementation of dynamic datagram switching in support of a multitude of applications and network services. In another embodiment, mobile intelligent data carriers are provided, which implement an authentication and encryption scheme for user authentication. The pervasive, user-centric network security according to this disclosure may be advantageously deployed in any enterprise IT environment where a distributive computer network is used, including, for example, governments, militaries, manufacturers, and in financial service, insurance, consulting, healthcare, and pharmaceutical industries. According to various embodiments, this IT security platform may facilitate a broad array of business operations, including, inter alia, inventories, sales, customer services, marketing and advertisement, teleconferencing, and remote sharing of a variety of applications. The systems and methods of this disclosure may be implemented in connection with biometric and other suitable authentication methodologies in certain embodiments.

The present disclosure thus provides a network security platform that is distinctive compared to the existing patchwork solutions. A holistic approach is taken and a single solution is provided that allows organizations to protect the entire network, as the network dynamically extends its resources to users around the world who connect through a diverse array of devices or application interfaces. The network security platform of this disclosure focuses on securing the user, not the various network host devices used by the user. Such user-centric scheme affords unprecedented simplicity and flexibility, which, in turn, lends improved user-friendliness to the network system. The enhanced security is transparent to the user. And yet, the user activities may be effectively monitored as needed. IT departments have the complete control over all user access.

In accordance with this disclosure, there is provided, in one embodiment, a system of secure network connectivity between one or more users and at least one network server. The system comprises: at least one intelligent data carrier, issued to one user, wherein the intelligent data carrier comprises at least (i) one memory, adapted to store data, (ii) one input-output apparatus, adapted to input and output data, and (iii) one processor, adapted to process the data stored in said memory, wherein the intelligent data carrier is capable of connecting to a host computer device thereby transmitting data via said input-output apparatus over the network, and wherein the intelligent data carrier is adapted to establish a network identity for the user through an authentication and encryption scheme; and a dynamic datagram switch for dynamic allocation and swapping of datagrams for a multiplicity of applications in service to the one or more users.

According to one embodiment, the intelligent data carrier is mobile. According to another embodiment, the intelligent data carrier is implemented with one of USB key, Compact Flash, Smart Media, Compact Disk, DVD, PDA, firewire device, and token device.

According to yet another embodiment, the authentication and encryption scheme comprises the following sequential steps: (a) a request being caused to forward from the intelligent data carrier to the network server that the intelligent data carrier be authenticated; (b) the network server presenting to the intelligent data carrier a plurality of authentication methods; (c) the intelligent data carrier selecting one authentication method from the plurality through an event; (d) the network server sending the intelligent data carrier a demand, based on the selected method, for authentication data from the intelligent data carrier; (e) the network server transforming the authentication data received from the intelligent data carrier into one or more data authentication objects, wherein each data authentication object is a data vector object, capable of being analyzed using one or more classifiers; (f) the network server analyzing the data authentication objects, according to the one or more classifiers, thereby determining the result of the authentication; and (g) the network server sending the result to the intelligent data carrier, indicating a successful or failed authentication attempt.

According to a further embodiment, the event in step c) is a click of a mouse, a touch on a screen, a keystroke, an utterance, or a biometric measurement.

According to still a further embodiment, the demand in step e) comprises at least one of a pseudo random and a true random code. A pseudo random code is generated based on a mathematically pre-calculated list. A true random code is generated by sampling and processing a source of entropy outside of the system.

According to another embodiment, the randomization is performed with one or more random generators and one or more independent seeds.

According to a further embodiment, the analyzing in step f) is based on one or more analysis rules. In a still further embodiment, the one or more analysis rule comprises classification according to the one or more classifiers of step e).

According to another embodiment, the classification is speaker verification, wherein the data object vectors involve two classes, the target speaker and the impostor. Each class is characterized by a probability density function and the determining in step (f) is a binary decision problem.

According to yet another embodiment, the determining in step (f) comprises computing at least one of the sum, superiority, and probability from the one or more data vector objects, based on the one or more classifiers of step (e). In still another embodiment, the sum is one of a superior and a random sum computed from the one or more data vector objects.

According to a further embodiment, the one or more classifiers in step e) comprise a super classifier derived from the more than one data vector objects.

According to a still further embodiment, the super classifier is based on physical biometrics, comprising at least one of voice recognition, fingerprints, handprints, blood vessel patterns, DNA tests, retinal or iris scan, and face recognition. In another embodiment, the super classifier is based on performance biometrics, comprising habits or patterns of individual behavior.

According to a further embodiment, the authentication and encryption scheme comprises asymmetrical and symmetrical multi-cipher encryption. In a still further embodiment, the encryption uses at least one of output feedback, cipher feedback, cipher block chaining, and cipher forwarding. In another embodiment, the encryption is based on Advanced Encryption Standard (AES) Rijndael.

According to yet another embodiment, the authentication and encryption scheme uses Secure Key Exchange (SKE). SKE employs a public key system in one embodiment. SKE uses Elliptic Curve Cryptosystem (ECC) private keys in another embodiment.

According to still anther embodiment, the authentication and encryption scheme includes at least one of a logic test adapted to validate that the intelligent data carrier has been registered with the server, a device test adapted to validate the physical parameters at the intelligent data carrier and the host computer device, and a personal test adapted to authenticate the user based on event-level data.

According to a further embodiment, the multiplicity of applications comprises at least one of window-based remote terminal server applications, applications on 3270/5250 terminal emulators for mainframe, directly embedded applications, and multimedia applications, wherein the directly embedded applications comprise at least one of database applications, data analysis tools, Customer Relation Management (CRM) tools, and Enterprise Resource Planning (ERP) packages.

According to another embodiment, the dynamic datagram switch comprises a datagram schema and a parser. The datagram schema comprises two or more datagrams, belonging to one or more datagram types. The datagram is adapted to carry (i) content data for network transmission and (ii) other information for managing and controlling network connections and support network applications. Each datagram type comprises a plurality of functions. The parser is adapted to parse the one or more datagram types.

According to yet another embodiment, the datagram schema comprises at least one major datagram type and within the one major datagram type, at least one minor datagram type.

According to still another embodiment, the parser is capable of parsing a matrix of datagram types. In a further embodiment, the matrix comprises a first multiplicity of major datagram types and in each major datagram type of the first multiplicity, a second multiplicity of minor datagram types.

According to another embodiment, the major datagram type is selected from the group consisting of (i) the server messages and connection control datagram, adapted to authenticate and control user connections, (ii) the content datagram, adapted to transmit the content data, (iii) the broadcast datagram, adapted to manage point-to-point, point-to-multipoint, and multipoint-to-multipoint data transmission, (iv) the connection proxy datagram, adapted to pass proxy data between the network server and the intelligent data carrier, (v) the instant message type, adapted to transmit messages in real-time, (vi) the large content transfer datagram, adapted to transfer oversized data and media files, (vii) the user directory datagram, adapted to search for network users, and (viii) the remote management datagram, adapted to remotely control network users.

According to another embodiment, each datagram in the datagram schema has a generic layout, which includes (A) header fields for (i) one or more major datagram types, (ii) one or more minor datagram type, (ii) the datagram length, and (iii) a datagram checksum, and (B) a datagram payload for carrying data in transmission.

In yet another embodiment, the generic layout comprises one or more additional header fields. In a further embodiment, the generic layout follows a TCP header.

According to another embodiment, the intelligent data carrier further comprises a radar connector; the radar connector interfaces the network and is adapted to monitor and control network connections. In still another embodiment, the network server further comprises a radar connector adapted to monitor and control network connections. The radar connector of the network server is connected to the radar connector of the intelligent data carrier over the network. In a further embodiment, the radar connector is further adapted to detect lost connections and initialize contact to the network server thereby reestablishing connections.

According to yet another embodiment, the system of secure network connectivity further comprises an injector, adapted to connect an existing networks to the network server and transmit data between the existing network and the intelligent data carrier via the network server, wherein said existing network is wired or wireless. In still another embodiment, the injector further comprises a radar connector, interfacing the network and adapted to monitor and control network connections.

In accordance with the present disclosure, there is provided, in another embodiment, a client-server communication system, which comprises at least one server and one client. The server comprises a dynamic datagram switch for dynamic allocation and swapping of datagrams for a multiplicity of network applications. The client is an intelligent data carrier, capable of connecting to a host computer device thereby transmitting data via the input-output apparatus over the network. The intelligent data carrier is adapted to establish a network user identity through an authentication and encryption scheme for secure data transmission between the server and the client.

According to another embodiment, the client-server communication system further comprises an injector, adapted to connect an existing network to the server and transmit data between the existing networks and the client via the server. The existing network is a wired or wireless network.

According to yet another embodiment, the server, client, and injector each comprises a radar connector. The radar connector interfaces the network and is adapted to monitor and control network connections. The radar connector of the client is connected to the radar connector of the server over the network, and the radar connector of the injector is connected to the radar connector of the server over the network.

According to a further embodiment, the server in the client-server communication system further comprises an encrypted virtual file system for dedicated data storage for the client.

In accordance with the present disclosure, there is provided, in yet another embodiment, an intelligent data carrier, which comprises at least (i) one memory, adapted to store data, (ii) one input-output apparatus, adapted to input and output data, and (iii) one processor, adapted to process the data stored in said memory. The intelligent data carrier is capable of connecting to a host computer device on a network thereby transmitting data via its input-output apparatus over the network. The data transmission is through dynamically-switched datagrams. The intelligent data carrier is adapted to establish a network user identity through an authentication and encryption scheme for secure network data transmission.

In accordance with the present disclosure, there is provided, in still another embodiment, a method for secure network communication. The method comprises: issuing to a network user an intelligent data carrier, which is capable of connecting to a host computer device on the network thereby transmitting data via its IO apparatus over the network and establishing a network identity for the network user through an authentication and encryption scheme; and providing a dynamic datagram switch in a server on the network for dynamic allocation and swapping of datagrams in support of a multiplicity of applications. In various embodiments, the method performs authentication, encryption, and randomization in connection with data vector objects. Super classifiers are used, particularly with physical and behavior biometric measurements in certain embodiments.

In accordance with the present disclosure, there is provided, in a further embodiment, a method for target delivery of one or more applications to a user. The method comprises issuing the user an intelligent data carrier, adapted to dock onto a host computer device that is connected to a network on which a network server sits and communicate with the network server over the network, wherein the network server communicates with the intelligent data carrier through dynamically-switched datagrams; the server authenticating the user through an authentication and encryption scheme; and granting the user access to the one or more applications upon successful authentication.

According to another embodiment, the one or more applications are preloaded on the intelligent data carrier or installed on the network server or the host computer device. In yet another embodiment, the host computer device is connected to the network via wired or wireless means. The host computer device may be a desktop or laptop computer, a personal digital assistant (PDA), a mobile phone, a digital TV, an audio or video player, a computer game consol, a digital camera, a camera phone, and a network-enabled domestic appliance.

According to a further embodiment, the one or more applications may be window-based remote terminal server applications, applications on 3270/5250 terminal emulators for mainframe, directly embedded applications, and multimedia applications. The directly embedded applications comprise at least one of database applications, data analysis tools, Customer Relation Management (CRM) tools, and Enterprise Resource Planning (ERP) packages.

DETAIL DESCRIPTION OF THE VARIOUS EMBODIMENTS

Brief Discussions of Relevant Terms

Figure 1:
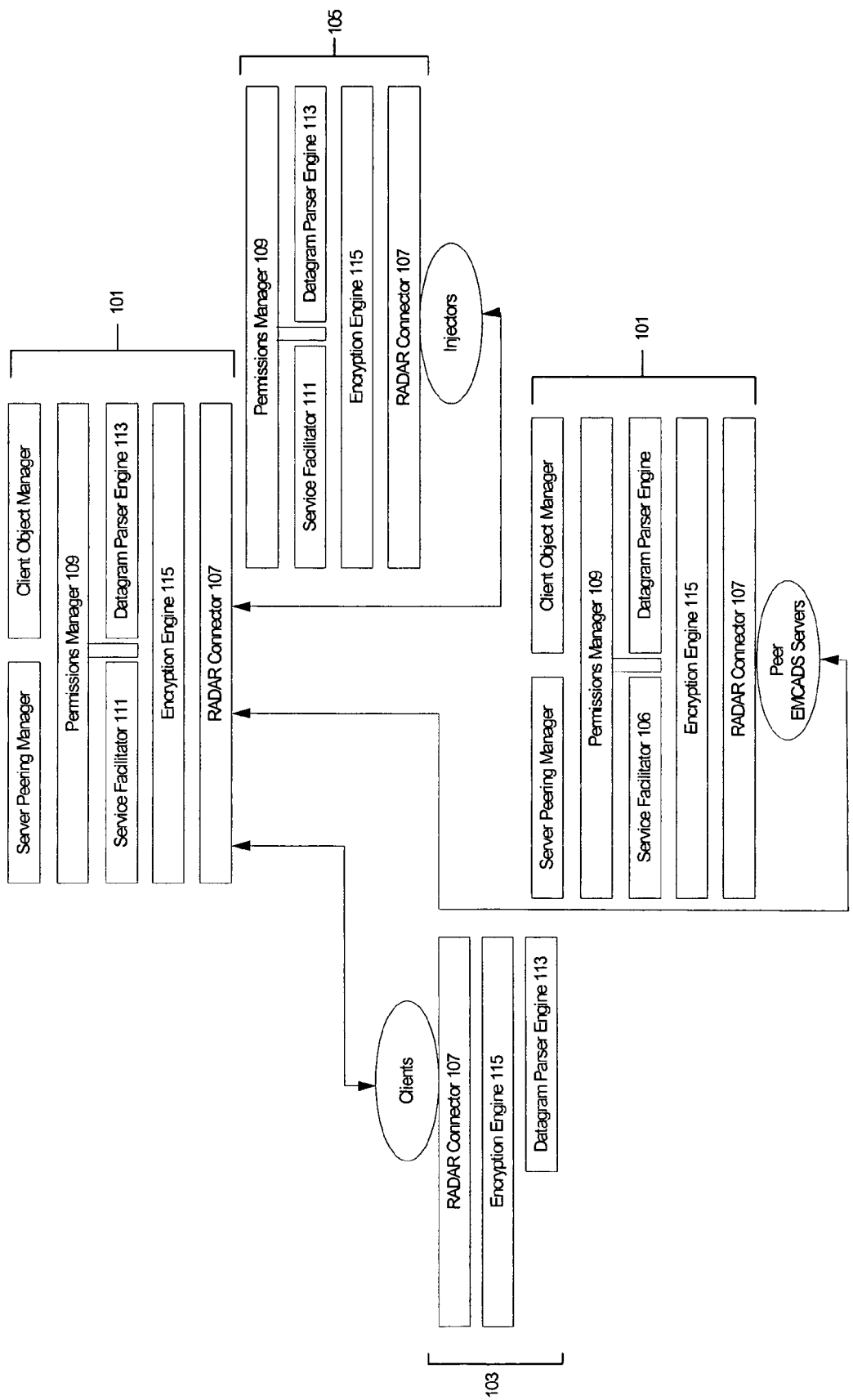
FIG. 1 depicts the interactions between a client, a server, and an injector according to one embodiment of this disclosure.

The following terms, network, client, server, data, data vector object (also referred to as data object vector, object vector), classifier, decision-making, deterministic analysis, object based deterministic analysis (also referred to as object analysis), random number, random number generator, seed, randomization, probability, probability density function, authentication, private key, public key, Elliptic Curve Cryptography (ECC), ECC signature, parser, packet, header, TCP, UDP, firewall, Universal Serial Bus (USB), Apple Serial Bus (ASB), Serial Port, Parallel Port, token, firewire, as well as other relevant terms throughout the present disclosure, are to be understood consistently with their typical meanings established in the relevant art, i.e. the art of mathematics, computer sciences, information technology (IT), physics, statistics, artificial intelligence, digital networks, network communications, Internet technologies, cryptography, encryption and decryption, compression and decompression, classification theories, prediction modeling, decision making, voice recognition, and biometrics.

The following terms, Secure Key Exchange (SKE), Advance Encryption Standard (AES), Public Key Infrastructure (PKI), Encrypted Virtual File Systems (EVFS), Virtual Private Network (VPN), Intrusion Detection System (IDS), Demilitarized Zone (DMZ), Personal Digital Assistant (PDA), USB key, USB token, USB dongle, Parallel Port dongle, Serial Port dongle, firewire device, token device, Smart Card, Smart Media, Compact Flash, Smart Digital Media, DVD, Compact Disk, Multiprotocol Label Switching Standard (MPLS), Lightweight Directory Access Protocol (LDAP), Electronic Data Exchange (EDI), Internet Relay Chat (IRC), Cyclic Redundancy Checksum (CRC), Terminal Identifier (TID), as well as other relevant terms throughout the present disclosure, are to be understood consistently with their typical meanings established in the IT industries, electronic or online commerce, and particularly the network security and any related fields.

A network, as used herein, refers to any group of networking enabled devices interconnected via a medium (such as fiber optic cable) suitable for transmitting digital and/or analog data over a distance. A network may be an open network, such as the Internet, or a closed network, such as an enterprise intranet system. The network-enabled device, also referred to as network-connecting device, connecting device, or device, may be a computer, a digital mobile phone, a PDA, a digital camera, a digital audio-video communicator, or any other devices that may be connected to a network via wire or wireless means. The network-connecting device may be a client or a server as referred to in this disclosure. In one embodiment, the connecting device may also refer to a host computer for a mobile client such as an intelligent data carrier. See the discussion infra on the client as an intelligent data carrier. In certain embodiments, a network may include one or more such clients and one or more such servers. In other embodiments, a network also includes one or more injectors, discussed infra in the detailed description of this disclosure.

As used herein, a Virtual Private Network (VPN) applies security procedures and tunneling to achieve privacy in network transactions while sharing public network infrastructure such as the Internet. Tunneling refers to the transmission of the protected data—such as those proprietary to a business or private to an individual—through a public network. The routing nodes in the public network are unaware that the transmission is part of a private network. Tunneling is typically accomplished by encapsulating the private network data and protocol information within the public network transmission units so that the private network protocol information appears to the public network as data. Tunneling enables using the Internet to transmit data on behalf of a private network. Numerous tunneling protocols have been developed, among which some examples are the Point-to-Point Tunneling Protocol (PPTP), developed by Microsoft and several other companies; generic routing encapsulation (GRE), developed by Cisco Systems; and the Layer Two Tunneling Protocol (L2TP). Tunneling, and the use of a VPN, does not substitute for encryption in ensuring secure data transmission. Encryption may be used in connection to and within the VPN.

Biometrics, as used in the present disclosure, refers to the individual characteristics—physical or behavioral—that are used to establish user identities in order to authenticate a user and properly authorize or deny access to a protected institution network or a protected source of information. Physical biometrics comprises voice recognition (i.e., speaker verification), fingerprints, handprints, blood vessel patterns, DNA tests, retinal or iris scan, and face recognition, among other things. Performance biometrics comprises habits or patterns of individual behaviors.

Data, as used herein, refers to any information capable of being transmitted over a network. Data is used interchangeably in various embodiments with the term digital information or information. The content data refers to any data that is designated for transmission by a user over a network. For example, in a financial institution or a bank, the customer account information constitutes one type of content data that may be transmitted among one or more clients and servers used or operated by various authorized account managers and system administrators. The account payment information would be one type of content data in the context of EDI transactions. Another example of a different kind of content data is the inventory information on raw materials and finished products in a manufacturing facility; this data is often transmitted among clients and servers throughout such a facility for access by production engineers and business planning personnel. Multimedia data such as audio, video files represent yet another form of content data. The transaction data—also referred to as the connection data—means, in the present disclosure, any information that depicts the state of the network connection between a client and a server and the data transmission between them. It includes information on that state of user authorization and methods of authentication, among other things.

Data Compression and encryption, as referred to in this disclosure, may be implemented according to the typical industry practice. A variety of specifications and algorithms for compression/decompression and encryption/decryption are well known in the art and many related products are publicly or commercially available; they may be utilized in the methods and systems according to the various embodiments of this disclosure.

A user interface, as used herein, refers to any kind of computer applications or programs that enables interactions with a user. A user interface may be a graphical user interface (GUI), such as a browser. Examples of such a browser include Microsoft Internet Explorer™ and Netscape Navigator™. A user interface also may be a simple command line interface in alternative embodiments. A user interface may also include plug-in tools that extend the existing applications and support interaction with standard desktop applications such as Microsoft Office, ERP systems etc. Further, a user interface in certain embodiments may also refer to any point of information entry, such as, inter alia, a keypad, a PDA, a microphone, or any type of biometric input unit.

A radar connector, as used herein, refers to a module that is adapted to monitor and control network connections. It may be included or connected to a client, a server, or an injector, according to the various embodiments. The radar connector of the client in certain embodiments is adapted further to detect lost connections and initialize contact to the server thereby reestablishing connections. It first looks to connect to a port; thereafter, it continuously monitors the network connections and when a loss of connection is detected, it attempts to reestablish the connection by calling the server. On the server side, the radar connector may remain active at all times, monitoring the state of connections with various clients.

Pervasive computing, as used in this disclosure, refers to the increased and widespread use of network computers or other digital devices in people's business and domestic affairs. The rapid growth of digital and web-enabled electronics and domestic appliances (e.g., mobile phone, digital TV, PDA, Global Positioning System (GPS), camera phone, and networked microwave, refrigerator, washer, dryer, and dishwasher etc.) and the omnipresence of the broadband Internet connections mark the era of pervasive computing.

Pervasive security, as used in the various embodiments, refers to a network security platform that delivers security on demand, using one or more network host or connecting devices. The user centric security according to this disclosure refers to that the system secures the one or more users instead of one or more computer host devices employed by the users to connect to the network server. The pervasive and user-centric security may be instituted in one embodiment using the systems and methods of this disclosure anywhere, anytime, using any network device.

Datagram is defined as "a self-contained, independent entity of data carrying sufficient information to be routed from the source to the destination computer without reliance on earlier exchanges between this source and destination computer and the transporting network." See, Encyclopedia of Technology Terms, Whatis.Com, QUE, November 2001. Datagram and packet can be used interchangeably. Id.

The term "intelligent data carrier" (IDC) is used interchangeably with the term "client" in various embodiments of this disclosure. An intelligent data carrier comprises at least (i) one memory, adapted to store data, (ii) one input-output apparatus, adapted to input and output data, and (iii) one processor, adapted to process the data stored in said memory. An intelligent data carrier is capable of connecting to a host computer device thereby transmitting data via its IO apparatus over the network. It is also adapted to establish a network identity of a network user through an authentication and encryption scheme, according to certain embodiments of this disclosure. In one embodiment, the intelligent data carrier is mobile. The intelligent data carrier may be implemented with or on a USB key, a firewire device, Smart Card, Compact Disk, DVD, Smart Media, Compact Flash, PDA, Smart Digital Media, or a token device. A token device may be a software dongle such as a Serial Port dongle or a Parallel Port dongle, any onetime password generation device, or system access device. Other digital media reader may be implemented as intelligent data carriers according to this disclosure. They are capable of connecting to a variety of host computer devices through various ports or drives and in different manner. The intelligent data carrier bears all the data and faculties for establishing secure network connections on behalf of the user and launching applications on-demand, once the user is properly authenticated by the server. See infra the detailed discussion on a client as an intelligent data carrier.

A Client-Server-Injector Network Communication System

A client-server communication system is provided in one embodiment of this disclosure that includes one or more clients and one or more servers. Each client is an intelligent data carrier capable of supporting an authentication and encryption scheme for secure connections to a network server. See infra the discussion on a client as an intelligent data carrier. The system enables user centric security, as it authenticates and protects each user directly through an intelligent data carrier. No matter what kind of connecting devices or local host computers are used, a user may dock the intelligent data carrier to the host and launch an authentication session to connect to the target server. Thus, the focus point of access safeguard is not at the connecting device or local host machine but, rather, it is directly on the individual user who is issued an intelligent data carrier. The intelligent data carrier may be mobile; such mobility enhances the pervasiveness in the security solution afforded by the system. It is security on demand, using any connecting device or local host machine.

In another embodiment, an injector is included in the client-server communication system. The client-server-injector system enables convenient integration with existing network infrastructures and facilitates the overall security of data transmission and application sharing. See infra the detailed discussion on the injector connecting with the server and client. One or more clients, one or more servers, and one or more injectors may be instituted in such a network communication system. Each injector links to and communicates with one or more servers. Each server connects to and serves one or more clients. The multiple servers in the system may communicate with each other in managing data flows in the entire network.

FIG. 1 outlines the connections among an injector 105, a client 103, and a pair of peer servers 101 according to one embodiment. Each server, client, and injector has a radar connector 107, interfacing with the network. The radar connector 107 constantly monitors the state of network connections. When a loss of connection is detected, the radar connector 107 on the client side makes one or more attempts to reestablish the connection by calling the server. Since the client has recorded—and hence remembers—the parameters of the connection state for the most recent connection(s), the lost connection may be quickly restored with the desired accuracy. Consequently, the integrity of data transmission may be protected and the rate of failure may be reduced.

Figure 6:
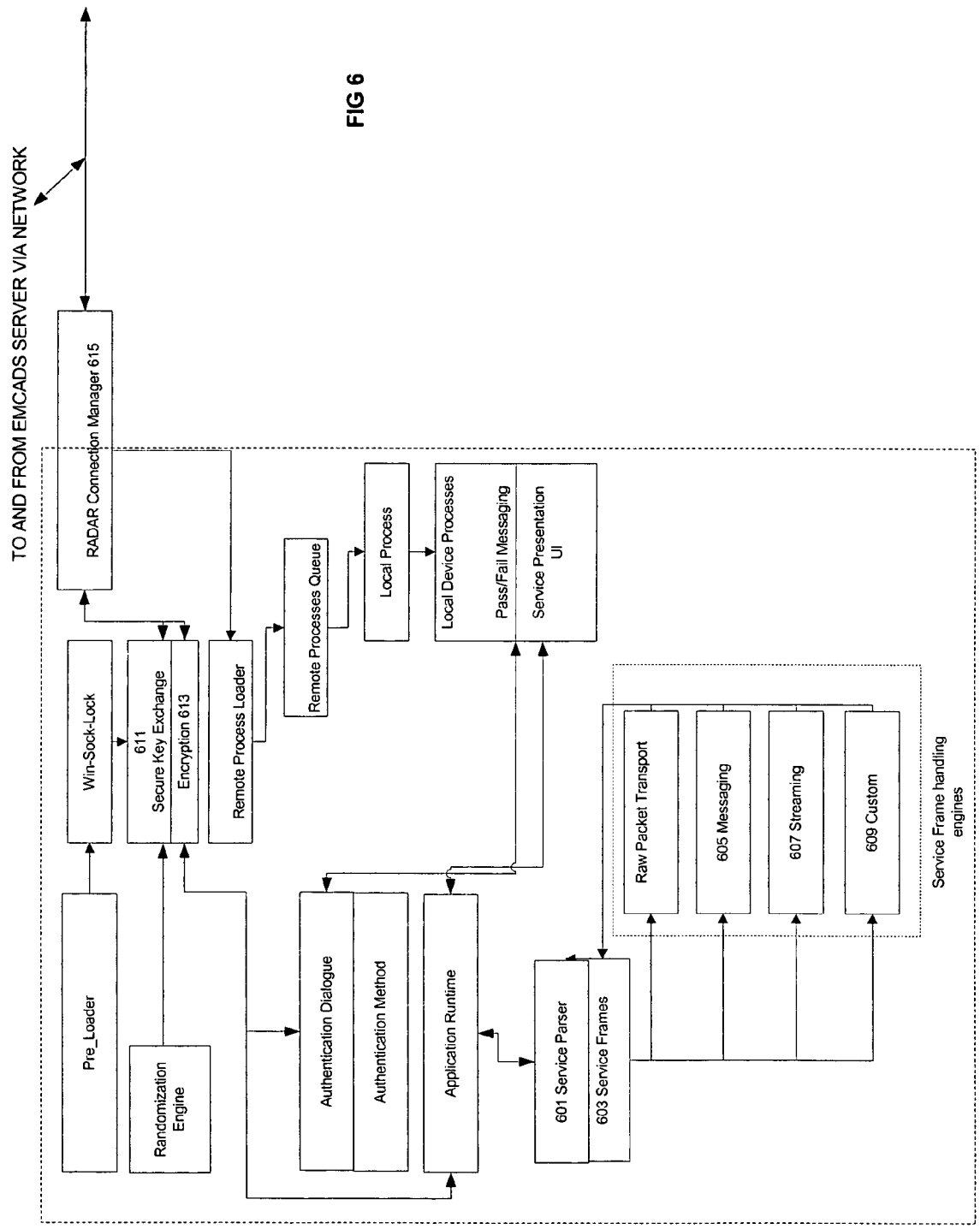
FIG. 6 depicts a client according to another embodiment of this disclosure, including the various components, modules, and processes involved therein.

In addition to the radar connector 107, certain other modules and processes are common among the client 103, injector 105, and two peer servers 101 depicted in FIG. 1. The permissions manager 109 assigns and manages user permissions. The service facilitator 111 ensures that specific applications or services are provided to the user as requested. A datagram parser engine 113 is included in each client 103, server 101, and injector 105, as shown in FIG. 1. The parser engine 113 may consist of a parser and a dynamic datagram switch of the system. See, FIGS. 7 and 8, a dynamic datagram switch 701, 801 and a frame parser 703, 803 are included in the server 101 and injector 105, respectively. Correspondingly, a service parser 601 and services frames 603 are included in the client 103, as shown in FIG. 6. The datagram switch 701, 801 operates in conjunction with the radar connector 107 on both the client side and the server side to process multiple instances of datagram transmissions. The detailed discussion on the dynamic datagram switch 701, 801 is set forth below. The encryption engine 115 processes encryption and decryption of the data transactions over the network. In the client 103, server 101, and injector 105 systems, the encryption engine 115 is one level behind the radar connector 107 that interfaces with the network. The parsing engine 113 and the service facilitator 111 implemented in both the server 101 and the injector 105 enable the overall system to support a multitude of network services and applications as well as transmission of various types of data. Further details on these and other modules and processes are discussed in the separate sections below for the client 103, server 101, and injector 105.

Client as an Intelligent Data Carrier

A client is any computer or device that is capable of connecting to a server computer or device through a network, wired or wireless. A client may also refer to computer software or firmware that calls and connects to a server. The client is an intelligent data carrier (IDC) according to one embodiment. A client or IDC may be implemented by executing a software, firmware, or flash memory on a host computer device linked in a network. A user interface is provided in one embodiment by the host computer device or the IDC, which allows a user to monitor the network transactions and control data transmission once the user connects to a network server through the IDC. For example, the user interface may provide a login form for the user to log onto the network. The form may accept entries in different formats, whether textual, object, or graphical. The user interface also enables a user to issue instructions for controlling the network transaction and data transmission.

An intelligent data carrier may be mobile according to one embodiment of this disclosure. In various embodiments, an intelligent data carrier may be implemented with or on a USB key, Compact Flash, Smart Media, Compact Disk, DVD, PDA, firewire device, token device such as Serial Port dongle or Parallel Port dongle, or other digital, analog devices or medium readers.

An intelligent data carrier has three principle components according to one embodiment: a memory adapted to store digital information, an input-output (IO) apparatus adapted to input and output digital information, and a processor adapted to process digital information stored in the memory. An IDC is capable of connecting to a computer host device that sits in a network and thereby transmitting data over the network via its IO apparatus.

The memory of an IDC may take the form of any computer readable media, such as CDs, floppy disks, DVDs, Erasable Programmable Read-Only Memory (EPROM), and flash memories (Compact Flash, Smart Media, USB key, etc.).

The IO apparatus of the IDC is capable of connecting to a host computer device via any kind of IO connection or port, including, for example, mouse ports, keyboard ports, serial ports (USB ports or ASB ports), parallel ports, infrared ports, and firewire connections (IEEE 1394), among other things. The IO connection may be wired or wireless according to various embodiments. For example, in one embodiment, short-range wireless connection may be established between the IDC and a host device pursuant to Bluetooth specification. See, www.bluetooth.org. In other embodiments, 802.11b-g and infrared communication are used. The IO apparatus includes a transceiver in a further embodiment that is adapted to send and receive voice or image data. The IDC thus supports VoIP applications.

The processor of the IDC comprises an integrated circuit (IC) in one embodiment. In another embodiment, the IC is an Application-Specific Integrated Circuit (ASIC). The IC supports the execution of the preloaded applications on the IDC as well as the applications installed on the host computer device or those made available from the remote server. In alternative embodiments, the processor of the IDC does not itself include an IC; it relies on an IC of a host computer device and is adapted to process information stored in the IDC's memory and information loaded onto the IDC's memory from applications installed on the host computer device. See infra for detailed discussions on application delivery.

The intelligent data carrier according to this disclosure is adapted to establish a network identity for a user through an authentication and encryption scheme. The intelligent data carrier locates the server and presents itself to the server by initiating the authentication process. See infra the discussions on authentication and encryption. In the secure network system of this disclosure, each user may be issued an IDC that allows the user to connect to the network server and access the data and applications thereon. A user may use the IDC to connect, disconnect, and reconnect to the server at will and as needed. The connection may be made from any network host device and at any time according to one embodiment. A host computer device may be a desktop or laptop computer, a personal digital assistant (PDA), a mobile phone, a digital TV, an audio or video player, a computer game consol, a digital camera, a camera phone, and a network-enabled domestic appliance such as a networked refrigerator, microwave, washer, dryer, and dishwasher. In certain embodiments, the IDC may be directly embedded in a host device thereby provides secure data exchange or application sharing over a network. The network access is private and secure with regard to each user. See infra the discussion on Encrypted Virtual File System. The IDC thus affords great mobility and enhanced, user-centric security to network communications.

Applications may be delivered to an intended user through an IDC in a secure, controlled manner. In one embodiment, certain licensed applications may be preloaded to an IDC that is issued to an authorized user, one who is registered with the server. The user may run the application off the IDC upon proper authentication by the server, irrespective of what local host the IDC is docked to. That is, for example, the user may insert a USB key IDC to a computer—which is connected to the Internet—at one location and launch the application off the USB key IDC once successfully connected to the server—also sitting on the Internet. The user may close the application and save the file onto the server or the USB key IDC. The files are stored in an Encrypted Virtual File System (EVFS) connected to the network server. See infra the discussions of EVFS. When at another location, the user may launch the application—upon proper authentication by the server—off the USB key IDC using a different computer host device and continue working on the same file. Such secure, mobile, and user-centric connectivity between the IDC and the network server thus provides a paradigm for managing and controlling not only data access but also application delivery.

Intelligent data carriers may be used to deliver standalone applications or operating systems according to one embodiment. A user may be issued an IDC with applications and/or an operating system that is read only and copy protected. The user may use the IDC to boot a host system that does not have an operating system or storage device installed thereon and to access server-based applications or the preloaded applications on the IDC.

Intelligent data carriers may be used to deliver applications and media content according to another embodiment. For example, the user may be provided with an IDC containing the application that is copy protected and read only as well as a unique serial number to permit the initial installation of the application. When the installation is completed, the IDC may request the system name, MAC number, processor serial number, or other static system-based information to create an anti-copying code, which is then stored on the IDC in the form of an encrypted code hidden from the user. This code may ensure that the application be only installed on the original host device.

Intelligent data carriers are used for media specific distribution according to yet another embodiment. Each user may be issued an IDC that works with one or more specific decoders authorizing access to specific digital media sources, such as DVD, CD, or MP3 data files. The server may track the access and usage of the specific data files through the IDC.

The application delivery paradigm according to this disclosure is therefore especially useful for proprietary data content, as well as commercial software packages and IT tools, including, among other things, specialized database applications, data analysis tools, and various Customer Relation Management (CRM) and Enterprise Resource Planning (ERP) packages. Controlled and targeted delivery, coupled with rigorous authentication and encryption as well as centralized data and file management, makes this paradigm a practical rival of the existing software licensing schemes such as enterprise licenses and floating licenses. In this capacity, an IDC enables digital rights management (DRM) for proprietary data, applications and services.

Figure 5:
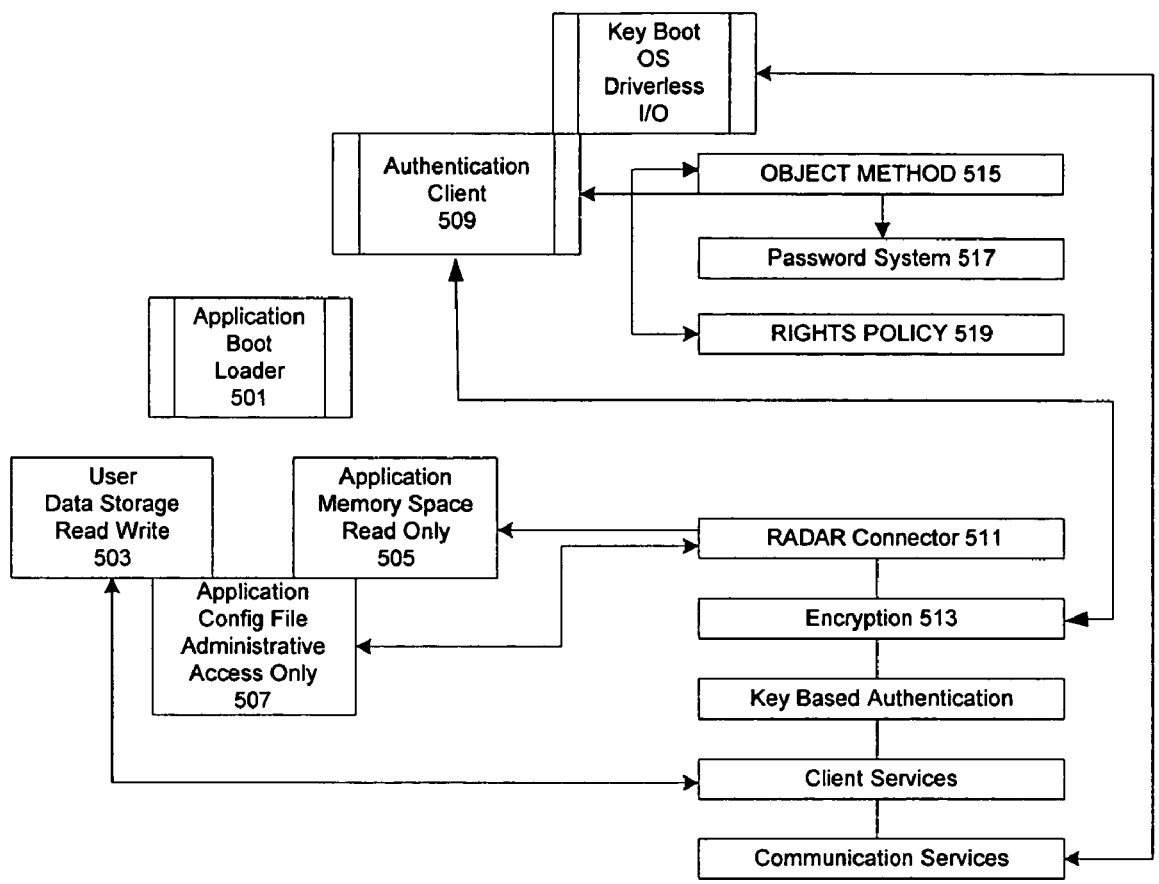
FIG. 5 illustrates an intelligent data carrier, the various modules and processes implemented therein according to another embodiment of this disclosure.

Referring to FIG. 5, an intelligent data carrier implements a number of modules and processes according to one embodiment of this disclosure. For example, an Application Boot Loader 501 allows System Integrators (SIs) and Original Equipment Manufacturers (OEMs) to create custom boot calls to applications that are stored on the IDC or applications installed on the host computer device. The Application Boot Loader 501 is part of the processor of an IDC according to this embodiment. It may call a config file, a SYS file, or an executable file, among other things, to boot an application.

The memory of the IDC may be partitioned—by the SIs or OEMs, for example—into user data storage 503, application data storage 505, and administrative config partition 507, according to one embodiment. The user data storage 503 is read-and-write enabled. The application data storage 505 is read-only. The administrative config partition 507 is read-only and copy protected. The partition information is stored on the IDC in such a way that it is not in the user's view nor directly accessible by the user.

Additional modules are also included, including an On Device Authentication Client module 509 for user authentication, a radar connector 511 for monitoring and control of network connections, and an Encryption module 513, among other things. The Authentication Client 509 may employ various user authentication means including object method 515, password system 517, and other rights policies 519, among other things. The detailed discussion on authentication and encryption is set forth below.

FIG. 6 provides another illustration of a client according to one embodiment of this disclosure. Various modules and components are also depicted, as are the processes involved. For example, depending on the connection with the server, the client supports different type of transmission, including messaging 605, streaming 607, and other custom communications 609. A datagram parser (service parser 601) is employed, corresponding to that of the datagram switch (701, 703) in the network server in one embodiment. See infra the discussion on the server with a dynamic datagram switch. Secure Key Exchange 611 and encryption 613 are implemented in the client. See infra the discussion on authentication and encryption. Randomization is utilized in connection to the authentication and encryption scheme. See infra the discussion on randomization in the creation and analysis of data objects. Additionally, a radar connector 615 is included as part of the client, linking the client to the server. The radar connector 615 monitors the connections between the client and the server. The connection may be through a public network such as the Internet. It can also be established within a private, enterprise network, especially one that involves distributive computing.

Server with a Dynamic Datagram Switch

A server can be any computer or digital device that sits on an open—e.g., the Internet—or closed—e.g., an institutional environment—network that is capable of connecting to a client, authenticating the client, and providing data and application access to the client. The network may be wired, or in part or in whole wireless. The server defines the permissions or rights of the various clients or users in the system. The permissions may be compiled and issued based on the physical user identities—e.g., according to biometrics measurements—and the geographical locations—e.g., local host names, the local time, or any other detectable parameters. Once the client is successfully authenticated, the server accepts the connection from the client and allows access to the data or applications that are owned by the user or that the user is authorized to access. The data files are in an EVFS that provides secure, private access to each user.

See infra the discussion on EVFS. In other embodiments, the server may deliver applications to the authorized user once the connection is established, as discussed supra.

Figure 7:
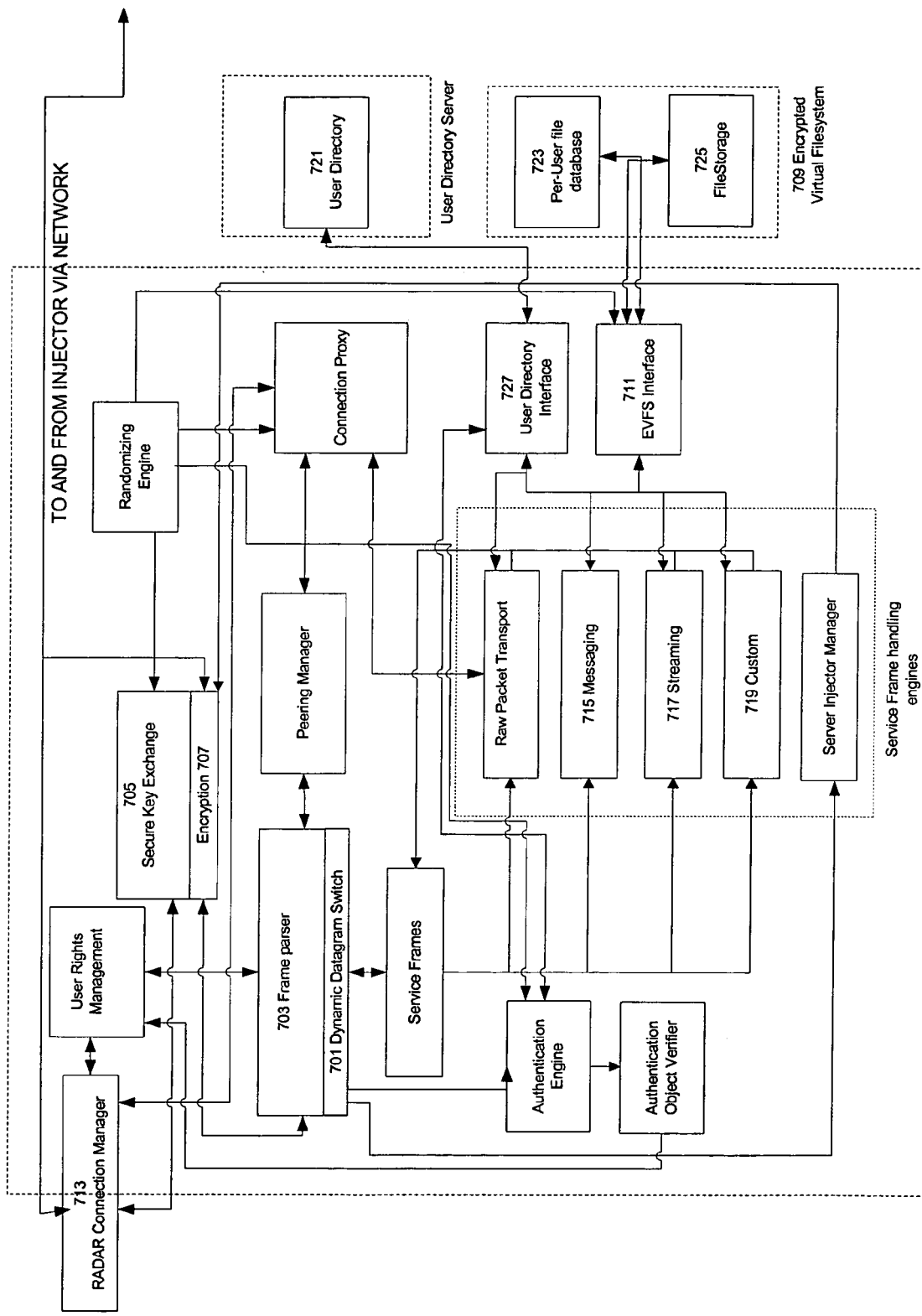
FIG. 7 depicts a server according to another embodiment of this disclosure, including the various components, modules, and processes involved therein.

As shown in FIG. 7, a server according to one embodiment includes a set of modules and components, some of which are analogous to that included in the client, shown in FIG. 6. For example, SKE 705 and encryption 707 are implemented in the server. Randomization is also utilized in connection with the authentication and encryption scheme. As discussed supra, an EVFS 709 is linked to the server, providing each client a virtual private file system for data access and storage. The EVFS 709 links to the server via an EVFS interface 711. See infra for detailed discussions. Further, a radar connector 713 is included as part of the server, interfacing with the radar connector 615 at the client side. The network connection between the client and server with a radar connector on each side enables effective monitoring and control of the network connection. The radar connector may also detect lost connections and reestablish the connection when needed, according to another embodiment of this disclosure. Various applications or services are supported, including, for example, messaging 715, streaming 717, and customized communications 719.

The data transmission between the client and the server is effectuated by a dynamic datagram switch based on a datagram schema in certain embodiments. See infra Example 1. All the data—whether the content data or transaction data—destined for transport through the server is formatted into a datagram. Each datagram is carried within a TCP packet according to one embodiment. In alternative embodiments, other network protocols such as UDP, HTTP, and HTTPS may be used. Multiple datagram types are defined in the datagram schema according to one embodiment. A major datagram type may have a plurality of minor or sub types. A minor datagram type may further comprise lower level datagram subtypes in alternative embodiments. A set of methods and functions may be defined for each datagram type or subtype. Each datagram type or subtype is capable of supporting one or more specific applications and carrying one or more specific kinds of data. The various types may require different and specific privileges and/or permissions.

Datagrams are processed in the server by the dynamic datagram switch 701. The dynamic datagram switch is capable of creating 701, allocating, processing, and swapping datagrams in real time. Datagram allocation and de-allocation are performed dynamically. In one embodiment, the same memory space is used when one datagram is de-allocated while another is allocated. Memory pointers are used for multiple datagrams. When one datagram is in service, its pointer points to the allocated memory. The use of memory pointer provides high-level efficiency and speed in deploying multitudes of network applications and supporting network data transmission in service to one or more users. The switch of datagrams may be implemented, in certain embodiments, within a network connection through one port; and in alternative embodiments, the switch of datagrams may be implemented in connection with multiple ports.

The dynamic datagram switch 701 constitutes the datagram parser engine 113 according to one embodiment. The parser engine 113 also includes a parser 703, which filters the datagrams based on their major and minor types. For example, data are first read from the socket and are appended to the in-queue for that socket. The parser engine 113 then checks to see whether that socket has a complete datagram in the queue. If not, it goes back to sleep and waits for the next packet to arrive at the socket. If yes, it removes the completed datagram from the socket's in-queue and sends it to a decryption and parsing unit to be decrypted and parsed.

The parser engine 113 then asks whether the datagram passes decryption and validation. If no, it checks to see whether the datagram show any signs of alteration or injection. If alteration or injection is detected, the datagram is discarded and the user who sends the datagram may be disconnected. If the datagram is successfully decrypted and validated, the parser engine 113 then tries to determine the intended recipient of the datagram. If the datagram is intended for another connected server, the datagram is then forwarded to the peer parser engine 113 on that peer server. If the datagram is targeted for the local server, it is then passed on to the local parser 703.

The parser 703 then checks whether the sender has the permission to send that particular type of datagram. This is performed using the object classifier in one embodiment. See infra Example 2 and the discussion on authentication and encryption. If the sender has no permission to send the particular type of datagram, the datagram is discarded and a log file is created. If the sender has the permission for the datagram type, the parser further checks to see whether the sender has permissions to send the particular datagram and whether the recipient has the permission to receive the datagram. If no, and if the negative permission is permanent, then the datagram is discarded and a log file is created. If no, but if the negative permission is temporary, then the datagram may be stored for later retrieval and processing. If the sender has permissions to send the datagram and the recipient has the permission to receive the datagram, the parser then proceeds to determine the datagram type.

Figure 3:
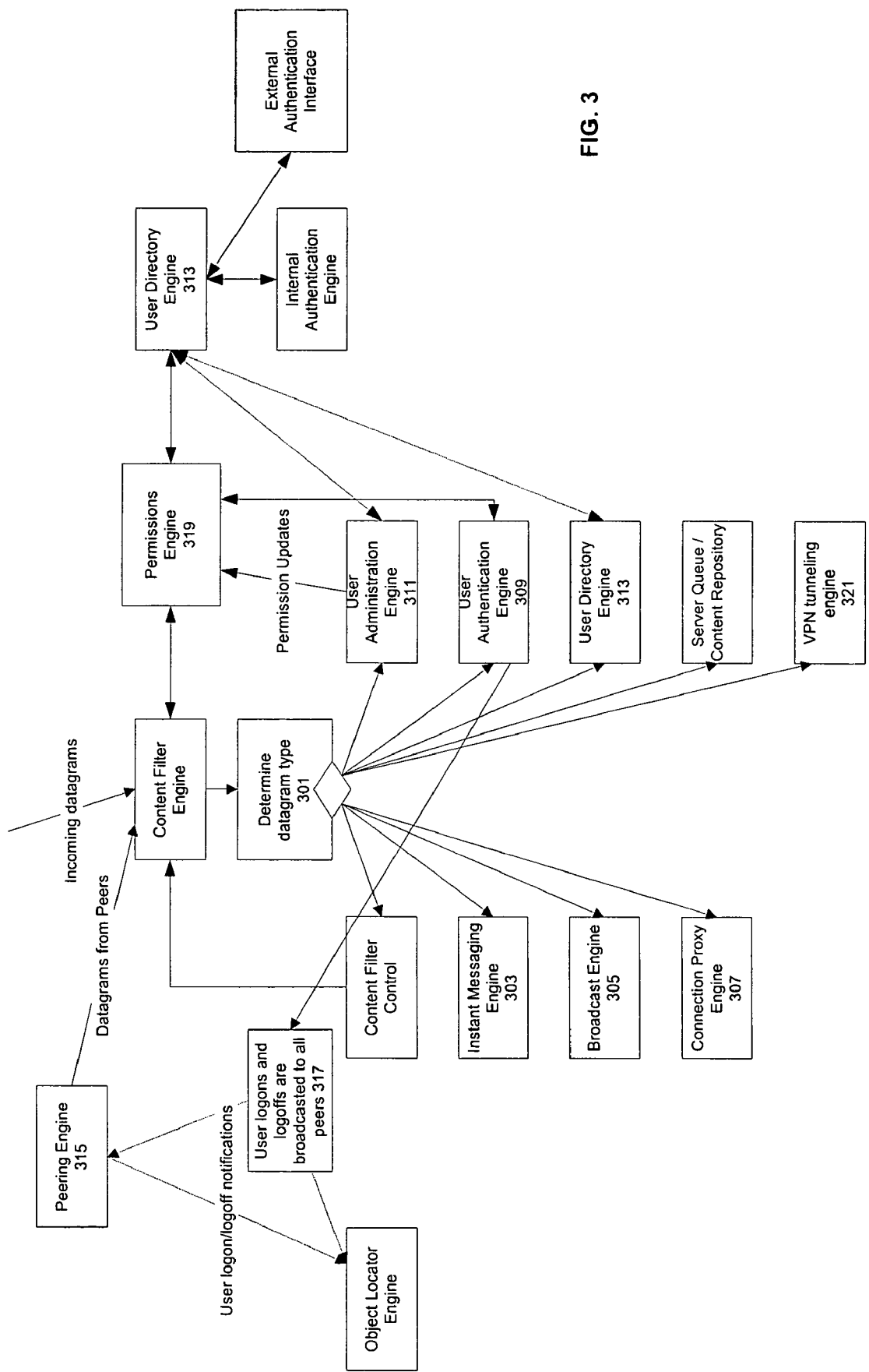
FIG. 3 depicts a datagram parser according to another embodiment of this disclosure, including the various components, modules, and processes involved therein.

FIG. 3 shows the relevant processes for determining datagram types 301 and parsing datagrams implemented in a parser 703 according to one embodiment. Each datagram type has a corresponding processing engine, such as instant messaging engine 303, broadcast engine 305, connection proxy engine 307, user authentication engine 309, user administration engine 311, user directory engine 313, etc. Once the datagram type is resolved, the datagram is fed into and processed by the designated engine for the corresponding datagram type.

Peering engine 315 refers to the peer parser engine residing at another connected server, a peer server. User logons and logoffs are broadcasted 317 to all peers. User access to each peer servers may be coordinated and managed as desired. For example, an existing connection the user has to a server may be terminated when the user is successfully authenticated by and connected to a peer server that grants higher level of access privilege. Connected with the user administration engine 311, the permission engine 319 manages and records permissions for all users. Other modules or processes may be included in other embodiments that provide additional functionalities as needed, including, for example, the VPN tunneling engine 321.

In one embodiment, the server may dynamically process a matrix of datagram types. The matrix includes a first predetermined number (e.g., 256) of major datagram types, each of which has a second predetermined number (e.g., 256) minor datagram types. In alternative embodiments, the parser 703 is capable of parsing a matrix of datagram types that has more than two dimensionalities or layers. The parsing may be implemented, therefore, based on datagram types, fields, and layers.

Figure 4:
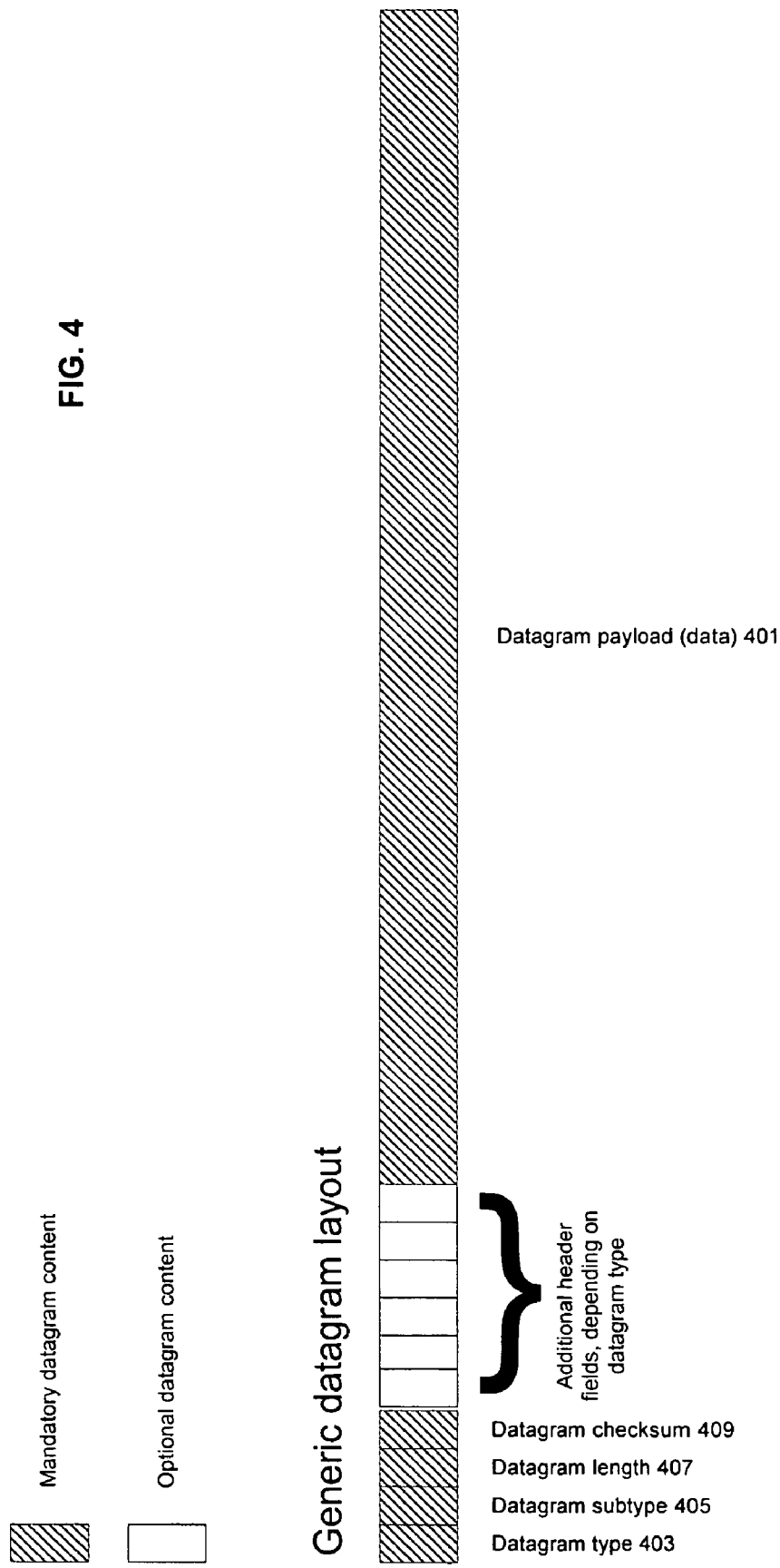
FIG. 4 is a generic layout of a datagram according to another embodiment of this disclosure.

The appropriate functions or methods may be executed for each datagram once the datagram is properly parsed out, according to the generic layout of the datagram. FIG. 4 provides a generic layout of the datagrams according to one embodiment. The datagram layout includes the payload 401 and the header fields such as the major datagram type 403, the minor datagram type or subtype 405, the datagram length 407, and the datagram checksum 409. The payload 401 carries the content data in transmission. Additional header fields 411 may be included for different datagram types.

Referring to Example 1 infra, in one embodiment, the major datagram types include, among other things: the server messages and connection control datagram, capable of authenticating and controlling user connections; the content datagram, capable of managing content data transmission; the broadcast datagram, capable of managing real-time point-to-multipoint and multipoint-to-multipoint data transmission; and the connection proxy datagram, capable of transmitting proxy data between the network server and the intelligent data carrier.

The server messages and connection control datagram includes minor or sub datagram types such as: the authentication request datagram, capable of initiating an authentication request; the authentication reply datagram, capable of sending a response upon a request of authentication; and the authentication result datagram, capable of sending the result of an authentication session.

The content datagram includes minor or sub datagram types such as: the normal content datagram, capable of transmitting content data; the remote logging datagram, capable of communicating with the network server and establishing a login session; and the remote data collector datagram, capable of transmitting data from a remote connection; the content approval request datagram, capable of requesting verification of the content data transmitted; and the content approval reply datagram, capable of responding to a request of verification of the content data transmitted.

The connection proxy datagram includes minor or sub datagram types such as: proxy data to server, capable of passing proxy data to the network server from the intelligent data carrier; and proxy data from server, capable of passing the proxy data from the network server to the intelligent data carrier. Another example of major datagram type is the instant message type. It includes minor datagram types such as the file transmission type, the audio-video transmission type, the instant mail message type, and the remote data collection type.

Injector Connecting with Server and Client

The secure network system of this disclosure includes an injector in a further embodiment, adapted to connect the server to an existing network infrastructure. The injector can be software or firmware that provides network connectivity. The injector converts physical connection data into logical network resources. It allows convenient integration with the existing networks and reduces the need to modify the existing IT infrastructures.

Figure 8:
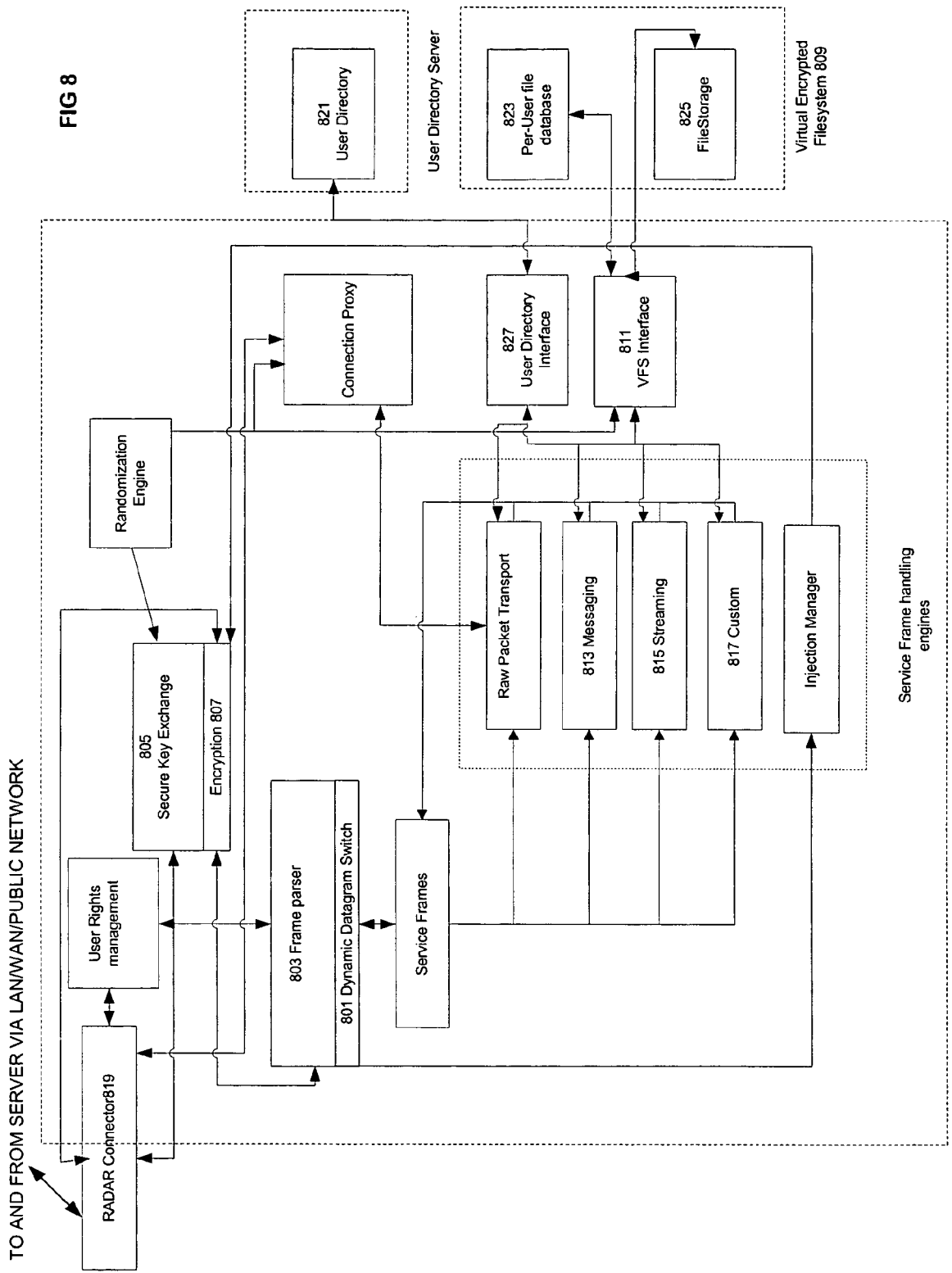
FIG. 8 depicts an injector according to another embodiment of this disclosure, including the various components, modules, and processes involved therein.

Referring to FIG. 8, an injector in one embodiment includes similar modules and processes as those in a client (FIG. 6) or a server (FIG. 7). For example, SKE 805 and encryption 807 are implemented in the injector. Randomization is also utilized in connection to the authentication and encryption scheme. Like the server, the injector is also linked to an EVFS 809, providing users a virtual private file system for data access to the existing networks. The EVFS 809 links to the injector via a Virtual File System (VFS) interface 811. The injector, like the client and the server, also supports different types of communications, including, for example, messaging 813, streaming 815, and other custom communications 817.

Moreover, the injector employs a dynamic datagram switch 801 and has a datagram or frame parser 803. The datagram switch 801 and frame parser 803 correspond to the datagram switch 701 and datagram parser 703 in the network server. A radar connector 819 is also included as part of the injector, interfacing with the radar connector 713 at the server side. The radar connector 819 monitors and controls the network connection between the injector and the server. The radar connector 819 may also detects lost connections and reestablish the connection when needed, according to another embodiment.

Authentication and Encryption

In various embodiments of this disclosure, the secure network system may employ a variety of authentication and encryption means, including, for example, an encrypted or non-encrypted ASCII string, a single classifier model, and a super classifier model. Symmetrical and asymmetrical multi-cipher encryption may be used. Encryption may be altered over time by output feedback, cipher feedback, cipher block chaining, cipher forwarding, or any other method that alters the cipher and/or key in a manner that both the encryption or decryption engine can predict or reproduce. In certain embodiments, Secure Key Exchange (SKE) is employed. SKE involves the generation of random key pairs that are only used once and thereafter discarded. Pursuant to SKE, no keys are stored on any device or system except the public-private key pair owned or controlled by the server. SKE differs from Public Key Infrastructure (PKI), which requires a public key storage system to serve multiple users. The omission of an intermediate public key storage system—a typical target for network hackers—allows for enhanced network security.

The SKE module in the secure network system according to certain embodiments uses various public key systems, including commercial off the shelf (COTS) systems. In one embodiment, Advanced Encryption Standard (AES) Rijndael is used. See, Federal Information, Processing Standards Publication 197, Announcing the Advanced Encryption Standard, November 2001, (available at csrc.nist.gov/publications/fips/fips197/fips-197.pdf). See also, websites of csrc.nist.gov/CryptoToolkit/aes/; csrc.nist.gov/CryptoToolkit/aes/rijndael/; and csrc.nist.gov/CryptoToolkit/aes/rijndael/rijndael-ip.pdf. In another embodiment, a 163 bit Elliptic Curve Cryptography (ECC) key may be used. The ECC technology is known. See, e.g., Tatsuaki Okamoto et al., PSEC: Provably Secure Elliptic Curve Encryption Scheme, (Submission to P1363a), March 1999 (available at grouper.ieee.org/groups/1363/P1363a/contributions/psec.pdf). See also, websites of world.std.com/-dpj/elliptic.html and csrc.nist.gov/cryptval/dss/fr000215.html.

In alternative embodiments, various encryption methods may be employed on a random base and in combination. For example, the alternative ciphers include, among others: Gost, Cast128, Cast256, Blowfish, IDEA, Mars, Misty 1, RC2, RC4, RC5, FROG, SAFER, SAFER-K40, SAFER-SK40, SAFER-K64, SAFER-SK64, SAFER-K128, SAFER-SK128, TEA, TEAN, Skipjack, SCOP, Q128, 3Way, Shark, Square, Single DES, Double DES, Triple DES, Double DES16, Triple DES16, TripleDES24, DESX, NewDES, Diamond II, Diamond II Lite and Sapphire II. The alternative hashes include, among others: MD4, SHA, SHA-2, RipeMD128, RipeMD160, RipeMD256, RipeMD320, Haval (128, 160, 192, 224 and 256 bits) with Rounds, Snefru, Square, Tiger, and Sapphire II (128, 160, 192, 224, 256, 288 and 320 bits).

The authentication in one embodiment is based on event-level data. An authenticating event includes a mouse click, a keystroke, a touch on a screen, an utterance, or taking a biometric measurement. Event-level data encompasses data generated at the event as well as data generated pre- and post-event. An event window may be specified in recording or measuring the event. That is, for example, a sampling of sound may be taken within a time limit. This data may be used in compiling super-classifiers according to one embodiment.

The use of a super classifier involves three aspects: the classification (see infra Appendix 1), analysis (see infra Appendix 2), and decision (see infra Appendix 3). A super classifier function is a feature extraction of input vector data. The input vector data may be binary or non-binary. See, e.g., appendix 3. An object vector based super classifier is used in one embodiment. See infra, Example 2. Randomization is applied in the super classifier based object analysis, discussed in the next section.

Authentication is performed each time when a client or an IDC attempts to connect to a network server. According to one embodiment, an authentication and encryption scheme is enabled with the IDC. The authentication and encryption scheme involves a series of steps. First, the user sends, via the client or the IDC a request to the network server, requesting to be authenticated. The initiation of an authentication session is thus from the client or the IDC. Second, the server sends to the IDC a list of authentication methods that are available, from which the user selects one through an event—e.g., a click of mouse, a touch on a screen, an utterance, a keystroke, or any other suitable notification event. Input from a digitizer such as a camera or biometric device constitutes other examples of suitable notification events. Third, based on the selected authentication method, the server sends the IDC a demand for authentication data. The demand may be for a password, which is true random or pseudo-random according to various embodiments. The pseudo random password is generated based on a mathematically pre-calculated list, and a true random password is generated by sampling and processing a source of entropy outside of the system. Fifth, the server transforms the authentication data received from the IDC into one or more data objects or object vectors. Sixth, the server performs the object analysis on the data objects, using one or more classifiers or a super classifier. A super classifier based on biometrics measurements may be used. And finally, the result of the analysis or the decision based on the classifier is sent from the server to the IDC, which either affirms the proper authentication of the user thereby permitting the connection of the IDC to the server or declares that the authentication attempt from the IDC failed.

According to other embodiments, three phases of authentication or three authentication tests may be implemented: the logical test for client-server match, the device test for the IDC, and the personal test for the user. Randomization may be used in connection with one or more of the three tests, with or without data object classifiers.

The logical test for client-server match is a test that allows the IDC or client to find its correct server. It involves a number of steps. At the outset, when the server is installed or initialized, a public/private ECC key pair is created at the server, used only for validation purposes. Any client or IDC of this server is given the server public key (PK1) when the IDC is configured or created, such that the IDC is imprinted with the server's "genetic code" and hence has "registered" with its designated server. Later, when an IDC is assigned to a user and attempts to connect to the server remotely over a network, the server's randomizer generates a large stream of random data and uses it for seed in producing a new ECC (PK2) public/private key pair for this connection session. This public key is then signed with the server private key previously created that is only for validation purposes. The server thereafter sends both the newly produced public ECC key as well as the signature to the IDC. Upon receiving such information, the IDC uses the "validation only" public key, with which it was imprinted, to verify the signature of the public ECC key. If the signature does not match the "imprint," the server is not the right server and the IDC disconnects. If the signature matches, the IDC generates a new ECC (PK3) public/private key pair for the session, and sends the public key as part of the Client Identity and Facility (CIF, see supra, Example 1). The CIF is in turn encrypted using the server's public key PK2.

The device test for the IDC focuses on the physical parameters of the IDC for verification. For example, at the time of deploying the client software on a carrier device, i.e., when the carrier or storage device becomes an IDC, the IDC is registered on the server and certain of its parameters are stored on the server, such as in a server database. When the IDC generates the CIF package, it stores in the CIF any information it may gather on the host computer device or network connecting device where it is docked, encrypts the entire CIF package with the public key PK1 which has been validated in the previous logical test, and sends the encrypted CIF to the server. After decryption, the server may verify whether the data in the CIF matches the parameters pre-registered in the server and whether the IDC is connected from a known or legitimate network host. If the verification fails, the server may end the session and disconnect the IDC.

The personal test for the user focuses on authentication of a particular user. This test may be implemented with or without classifiers or a super classifier. A test without using a super classifier may involve a number of steps. For example, following a successful SKE, an authentication request datagram is sent to the IDC, including a list of authentication methods and, if one of these methods is a challenge-response based authentication, a challenge that the IDC be authenticated. The IDC then chooses one of the authentication methods. It may or may not prompt the user for interactive login. In cases where the IDC already has sufficient knowledge to authenticate, automatic login is provided. Proceeding with the authentication, the IDC sends an authentication object to the server, implemented in another datagram type, which contains the validation data to be examined by the server. The analysis of the authentication data objects varies based on the authentication method that is in use.

A user test with the use of a super classifier, on the other hand, may proceed as follows. A super classifier is implemented based on the various types of datagram types and datagrams at the server. Upon a successful SKE, an authentication request datagram is sent from the super classifier to the IDC, including a list of authentication methods and a challenge that the IDC be authenticated if one of the authentication methods is a challenge-response based authentication. The IDC then similarly selects an authentication method. For authentication, the server sends the IDC a request for execution of an event-level task. The request is built with the super classifier based on input from a randomizer. The IDC performs the task and the resulting event level data is then wrapped into an authentication data object. This data object includes in one embodiment a separate random generated identifier for this particular network exchange session, such that the likelihood of compromising the session is minimized. The authentication object is then returned from the IDC, which is analyzed by the server's "verifier" based on the super classifier. Data object analysis may vary depending on the specific authentication method that is in use.

Randomization in the Creation and Analysis of Data Vector Objects

Randomization techniques are well known in the field of theoretical and applied mathematics. They are often applied in the decision-making processes where no apparent common denominator exists. The use of randomization is facilitated by the vast computing power available today. Randomization typically involves the use of a seed. Random number generators generate pools of random numbers based on the supply of one or more seeds. Depending on the characteristics of the seed, randomization may be classified into pseudo random or true random. Most random generators are pseudo-random number generators. They are based on a mathematical pre-calculated list, one that can be compromised. By contrast, true random numbers are usually generated by sampling and processing a source of entropy outside the computer systems or networks involved. One must identify the source of the entropy and how the entropy generated the seed in order to break a true randomizer.

Randomization is also applied in computer or network security. The existing application of randomization in data security is largely static. For example, a random number may be generated by a client, a server, or another computer device, and subsequently passed onto a computer by the user. If the number matches a number within the random number "frame" allowed by the system specific random generator, the user will be granted access. This is similar to a Public Key Infrastructure (PKI) where two secretly generated keys are matched and validated at a shared validation point. One problem with this paradigm is that the shared validation point may be compromised relatively easily: At the system shared validation point is a random generator that contains a frame of numbers (or any desired output combination such as alpha digits) based on a given seed. Although the random generator seems to generate an infinite number of random numbers, the total number of random numbers to be generated is pre-determined once the generator is created (seeded). That is, what is random is only the order in which the random numbers are generated. Such randomization is static. Each random number is theoretically predictable.

Randomization according to certain embodiments of this disclosure is applied in a non-static manner. Randomization is implemented in data objects through one or more classifiers or super classifiers. See infra Example 2. A true random generator is seeded to provide random numbers for the analysis of data vector objects. Data objects are utilized in certain of the tests for authentication as discussed supra.

Multiple and separate private keys are generated based on true random values in various embodiment. These keys do not contain any information based on the initial server validation key, because the data object transforms the number into a value or a data image, based on entropy outside the computer at the event level. It is therefore outside the environment of the randomizer or random generator and becomes non-static. Since what is used for the randomization-based object transformation is itself a key, it becomes possible to match the two unknowns (private keys) and make them known. In alternative embodiments, more than two private keys may be similarly generated and used. Moreover, any numbers of private keys may be generated by the objects in the classifier, and thereby makes the number of private keys unknown.

In this embodiment, randomization is implemented both for (i) confronting the user or the client with an authentication challenge based on a true random generator and (ii) selecting the object analysis to be performed and performing the selected analysis.

A typical pre-programmed random generator may take the following form:

$$y_{i+1} = \frac{1}{N}\sum_{j=1}^{N} \frac{(a_j x_{i,j} + c_j) \bmod m_j}{m_j}$$

See, e.g., Numerical Recipes, W. H. Press et al., Cambridge University Press. Whether simple linear congruential generators or improved generators are used, multiple random generators may be employed—thereby creating a combinatorial problem—so as to prevent the calculation of the seed from, for example, observing a number of random numbers generated in sequence. In certain embodiments, the least significant digits are truncated in the sequence, to minimize the possibility of leaving out any hints. In other embodiments, besides the seed, the generator specific constants a, c and m are also provided according to the above formula. A table with a large number of possible values may be created for constants a and m. When the constants are chosen using some noise input, this approach will derive more robust randomizers. In still other embodiments, a number of pre-chosen random generators may be used in connection with N independent seeds. A simple sum may be used as follows:

$$y_{i+1} = \frac{1}{N}\sum_{j=1}^{N} \frac{(a_j x_{i,j} + c_j) \bmod m_j}{m_j}$$

An example of a useful algorithm for combining two linear congruential generators with a combined period of about $2.3 \times 10^{18}$ is the ran2 described in Numerical Recipes. The algorithm may be modified using two independent seeds. It may be further modified using 3 or N generators. In one embodiment, at least one seed is obtained using an indeterministic source that a perpetrator does not have easy access to. The indeterministic source may be anything outside of the randomizer and beyond the network system of interest, such as, for example, an external device, the occurrence of an external event, a third party, and bits derived from the recent history of the computer.

When one specific classifier is used in the analysis of an object-based vector, the predictability may be relatively high such that a perpetrator may solve the classifier and the seed. In certain embodiments, an ensemble of classifiers—i.e., multi classifiers or super classifier—are used, where lower predictability may be achieved. The dimensionality of the feature vectors may be reduced as the variations that are not class discriminative are discarded. See infra, Appendices 1 and 2.

In summary, true randomization according to this disclosure improves protection on data access. The data objects are based on specific values—such as those of biometrics measurements in one embodiment—that are only known to the user at the event level. This focus on the user—rather than the devices—marks the user-centric security according to this disclosure. The data objects transformed at the event level in a true randomized manner and analyzed in a super classifier provides a superior foundation for establishing and verifying user identities.

Encrypted Virtual File System (EVFS)

An EVFS according to the various embodiments is a per-user (or group of user), per-client virtual file system, also referred to as a file repository. It is a server-based file system or file and data storage facility, which allows the users of a network system to store files or data away from their local hosts or client carriers. An EVFS may be useful when, for example, the storage capacity is deficient at the local host. Examples of the use and implementation of EVFSs are available in public. See, e.g., the websites of
www.microsoft.com/technet/treeview/default.asp?url=/
　　TechNet/prodtechnol/wind ows2000serv/deploy/confeat/
　　nt5efs.asp;
www.serverwatch.com/tutorials/article.php/2106831; and
www.freebsddiary.org/encrypted-fs.php.

According to one embodiment of this disclosure, the server of the secure network system is connected to an EVFS 709 through an EVFS interface 711, as shown in FIG. 7. The EVFS 709 includes a user directory 721, a per-user file database 723, and file storage 725. The user directory contains relevant information for all the users, including password, login parameters, biometric profile, physical or geographic location, online and offline status, public ECC key used to encrypt files which are stored in the EVFS. The users are the individuals who have connected to the network server through a client or an IDC and have used or are using certain applications supported by the network. The applications may be delivered and run off the IDC according to one embodiment of this disclosure. The applications may also run on a host computer or device to which the IDC or the client is connected. Or, alternatively, the applications may run remotely on the server on behalf of the client.

The server uses a user directory interface 727—which resides in the server—to access the user directory 721. The file storage 725 is a digital medium that has stored thereon the files and any other data of interest to the users. It may be any kind of computer memories. This is the physical location where the files or data generated from or modified by the user applications are stored; the user applications are executed on the IDC, the host computer, or remotely on the server. The file storage 725 may be optimized for speed and convenient access.

The per-user file database 723 contains user file information such as the original file name, date and time, and an encrypted representation of the encryption key used to encrypt the file. All files stored within the EVFS 709 are assigned true random names as well as true random encryption keys; they are mixed among each other in the file storage 725. The data access is private and secure with respect to each user. Each individual user may only see and access those files or data that the user has ownership of or that the user has obtained the permissions to access. The level of access the user has with respect to each file or document is controlled by the server. That is, a user may only be permitted to read and edit a file, but not to move or copy it off the server—or the IDC if the application is run off the intelligent data carrier—in certain embodiments. As such. Each user virtually has a private database—i.e., per-user database 723—connected to the server.

The EVFS 709 used in the secure network system disclosed herein provides enhanced protection to the data and applications belonging to each user. In case of physical compromises, e.g., the IDC is lost or stolen, the data stored in the EVFS 709 will be unreadable—or not in view—to anyone but the properly authenticated user, the owner of the file who has access to the private ECC encryption key that can unlock the files.

The provision of EVFS 709 thus enhances the user-centric aspect of the secure network system according to the various embodiments. Along with encryption, authentication, and other features discussed throughout the present disclosure, the EVFS 709 enables secure delivery and stand-alone operation of applications through an IDC.

The various embodiments are further described by the following examples, which are illustrative of the disclosed embodiments but do not limit the same in any manner.

EXAMPLE 1

Datagram Examples and Specifications of Major and Minor (Sub) Datagram Types

Data Gram Examples

Instant Message Types
　Instant Message
　Remote logging
　Remote data-collection
　Execute remote command
　File Transmission
　Audio-video communication
　EDI transaction Broadcast Types
　Non real-time point-to-multipoint transmission
　　Stock ticker
　Non real-time multipoint-to-multipoint transmission
　　Channel-based chat (IRC style)
　Real-time point-to-point transmission
　　User-to-user chat
　　Audio-video conference (audio or voice telephony)
　Real-time point-to-multipoint transmission (broadcast)
　　Audio-video broadcast
　Real-time multipoint-to-multipoint transmission
　　Audio-video conference User Directory Types
　Query
　Update Server Queue Types
　Offline storage
　Server swap area Content Filter Control
　Filter status
　Filter statistics
　Filter update (add/remove rules)
　Filter set
　Filter reset Mandatory Datagram Fields The beginning of each datagram may be laid out as follows:

| Byte size | Populated by | Content |
| --- | --- | --- |
| 1 | Client | Datagram major type |
| 1 | Client | Datagram minor type (sub type) |
| 8 | Server | Datagram received at server (timestamp) |
| 4 | Server | Data gram originator (Client-ID of sender) |
| 1 | Client | Signature/CRC type |
| n | Client | Signature/Checksum field (e.g., ECC Signature, MD4, MD5, SHA, SHA1 etc.) |

Additional header fields may be appended to the aforementioned fields, depending on the type of the datagram. The additional header fields are typically populated by the client, and may be validated by the server.

Signature/CRC Types:

| Type | Length of CRC field |
| --- | --- |
| 0: No checksum | 0 bytes (Deprecated) |
| 1: ECC Signature | 87 bytes |
| 2: SHA | 20 bytes |
| 3: SHA1 | 20 bytes |
| 4: MD4 | |
| 5: MD5 | 16 bytes |
| 6: | |
| 7: | |
| 8: CRC32 | |

There are appended additional headers in various datagrams. The headers are populated by the client and may be validated by the server.

Symmetric Cipher Types

Part of the SKE (Secure Key Exchange) are negotiated. Symmetric ciphers may be supported by both the client and the server and selected based on permissions and cipher type priority.

| Type | Name |
| --- | --- |
| 1 | Rijndael |
| 2 | Blowfish |
| 3 | RC6 |
| 4 | Twofish |

Secure Key Exchange

SKE is utilized to implement random, one-time (throwaway) encryption keys in certain embodiments, such that no symmetric cipher keys are stored in the client that would subject to the risk of compromise.

Other information or data are exchanged over the network when SKE is executed. These information or data may substantiate restrictions or elevated privileges for the user.

SKE Process Overview
1. Client connects to server
2. Server sends SPK datagram to client
3. Client validates server signature and returns CIF datagram
4. Server validates client data and returns SKP datagram
5. Client sends receipt
6. Server sends receipt SPK Datagram The Server Public Key (SPK) datagram is used to transport the server public key for the session to the client. The server may sign the key with the private key from the pre-shared public/private ECC key pair that is generated during server installation to guard against intervening hacking.

| Byte Size | Description |
| --- | --- |
| 2 | Length of Server's Public Key for the session (in hex) |
| n | Server Public Key for the session |
| n | Signature |

CIF Datagram

The Client Identity and Facility (CIF) datagram encodes data regarding the client (IDC), including information on the host where the IDC runs, as well as the public key the client wishes to use for the session.

The data are encoded in a CSV-like manner.

| Field | Description |
| --- | --- |
| 1 | Client Public Key for the session |
| 2 | Space separated list of cipher-methods and keylengths supported |
| 3 | Space separated list of hash-methods |
| 4 | Client Device Type (may be encoded binary data) |
| 5 | Client Identifier (may be encoded binary data) |
| 6 | Symmetric Cipher key for client -> server stream |
| 7 | IV for the Symmetric cipher |

Cipher and keylength are formatted as follows:
<cipher method>-<keylength><cipher method>-<keylength>

Client Device Type refers to a description of the IDC hardware environment (such as the PNP Device-ID for windows-based hosts). Any information can be used on the host to which the IDC have been connected, including, for example, the host's Processor Serial number, the firmware revision and serial number of the motherboard (or motherboard BIOS), authentication data from different hardware tokens (e.g., biometric input devices, smartcard readers, flash readers), and the MAC of the network interface through which the host communicates with the server.

The entire CIF datagram may be encrypted using the server public key. The Exchanged Value (EV) is sent along the encrypted package. The encrypted datagram sent may read as follows:
$1^{st}$ and $2^{nd}$ octet are (in hex) the length of the EV.
n octets follows with the EV
n octets follows with the encrypted CIF data SKPP Datagram The Server Key Package (SKP) datagram holds information on cipher, bit length and keys, but can be extended for other purposes.

The server need not sign the information in the SKP datagram. The SKP are encrypted with client's public key, which in turn are sent to the server and encrypted with the server's public key. This datagram is encoded in a CSV like manner:

| Field | Description |
|---|---|
| 1 | SKP Datagram type |

SKP Type 0

This is the normal SKP datagram. It holds information to the client on the cipher, keylength and ciphermode for up- and down-stream.

| Field | Description |
|---|---|
| 2 | Cipher chosen for server -> client stream |
| 3 | Bitlength for server -> client stream |
| 4 | Ciphermode (ECB, CBC, CFB, OFB) for server -> client stream |
| 5 | Cipher chosen for client -> server stream |
| 6 | Bitlength for client -> server stream |
| 7 | Ciphermode (ECB, CBC, CFB, OFB) for client -> server stream |
| 8 | Symmetric Cipher key for server -> client stream |
| 9 | Symmetric IV for the server -> stream |

SKP Type 1

Instructs the IDC to retrieve a "client identity" update from a specific server (or an additional identity).

| Field | Description |
|---|---|
| 2 | IP address of server holding the additional identity |
| 3 | Port on which the server listens |
| 4 | Optional "Client Identity" to give the server during SKE. |

SKP Type 8

Informs the IDC that it is not allowed to connect to the system from its current location. The server may automatically terminate the connection upon successful transfer of the type 8 SKP datagram.

| Field | Decription |
|---|---|
| 2 | Message to show user (optional) |

SKP Type 9

Asks the IDC to attempt retrieval of a firmware update.

| Field | Description |
|---|---|
| 2 | IP address of server holding the firmware update. |
| 3 | Port on which the server listens. |
| 4 | Optional "Client Identity" to give the server during SKE. |

SKP Type 10

Instructs the IDC to ask the user to return the IDC device, as it has been reported missing or lost.

| Field | Description |
|---|---|
| 2 | Message to show user |

SKP Type 11

Instructs the IDC to attempt "self destruction".

| Field | Description |
|---|---|
| 2 | Method (bitfield) |
| 3 | Cookie (optional) |

SKP Type 11 Methods

| Bit | Decription |
|---|---|
| 0 | Unlink drives |
| 1 | Wipe |
| 2 | Add "cookie" |

The SKP datagram are encrypted with the client's public key. The Exchanged Value (EV) is sent along the encrypted package. The encrypted datagram send may read as follows:

$1^{st}$ and $2^{nd}$ octet are (in hex) the length of the EV.

n octets follows with the EV n octets follows with the encrypted SPK data

CR Datagram

The Client Receipt (CR) datagram is a SHA-1 Hash of the entire (unencrypted) SKP datagram, encrypted with the symmetric cipher, bitlength and method provided by the server.

SR Datagram

The Server Receipt (SR) datagram returns the same hash, both as receipt and as a test of the Cipher stream from the server to the client.

Major Type 0: Server Messages and Connection Control

The datagram type is used for the server to send messages, error notifications, and server-client specific information over the network connection.

Subtype 1: Authentication Request

Upon connecting to the server, the server may issue a Type 0,1 datagram, requiring the client to identify itself This datagram informs the connected client on the authentication method required to be authenticated by the server.

Subtype 2: Authentication Reply

This datagram is used by the client to validate the user.

A plurality of authentication methods may be used in connection to these subtypes of datagrams, as exemplified in the following list:

| | |
|---|---|
| 0 | Username and password |
| 1 | Username and password + x.509 Client certificate signature (see, e.g., www.webopedia.com/TERM/X/X_509.html) |
| 2 | Username and password + ECC signature |
| 3 | Password |
| 4 | Password + x.509 Client certificate signature |
| 5 | Password + ECC signature |
| 6 | One-time password (S-Key style, predefined, ordered list of passwords) |
| 7 | One-time password + x.509 Client certificate signature |
| 8 | One-time password + ECC signature |
| 9 | Voicekey |
| 10 | Voicekey + x.509 Client certificate signature |
| 11 | Voicekey + ECC signature |
| 12 | Biometric hash |
| 13 | Biometric hash + x.509 certificate signature |
| 14 | Biometric hash + ECC signature |
| 15 | x.509 Client certificate (signature) |
| 16 | ECC signature |
| 17 | Content Transfer ID (TID) |
| 18 | One-time password transmitted by alternative carrier. |
| 19 | Temporary auth-token |

The specific authentication method used determines the number of additional data fields in these datagrams. The examples of various fields when certain methods are used are shown below:

Method 0

| Byte Size | Description |
|---|---|
| 1 | Length of UserName field |
| n | Usrname |
| 1 | Length of Password field |
| n | Password |

Method 1

| Byte Size | Description |
|---|---|
| 1 | Length of UserName field |
| n | Username |
| 1 | Length of Password field |
| n | Password |
| n | x.509 signature on username and password fields |

Method 2

| Byte Size | Description |
|---|---|
| 1 | Length of UserName field |
| n | Username |
| 1 | Length of Password field |
| n | Password |
| n | ECC signature on username and password fields |

Method 8

| Byte Sie | Description |
|---|---|
| 1 | Length of password field |
| n | One-time Password |
| n | ECC Client certificate signature |

Method 11

| Byte Size | Description |
|---|---|
| 1 | Length of ECC signature |
| n | ECC signature on Voicekey data |
| n | Voicekey data |

Method 12

| Byte size | Description |
|---|---|
| n | Biometric hash |

Method 14

| Byte Size | Description |
|---|---|
| 1 | Length of ECC signature |
| n | ECC signature on Biometric hash |
| n | Biometric hash |

Method 16

| Byte Size | Description |
|---|---|
| n | ECC signature on Challenge |

Subtype 3: Authentication Result

After the authentication request is processed, the client will receive a 0,3 datagram which delivers the authentication result. This datagram has certain static fields:

| Byte Size | Description |
|---|---|
| 1 | 1 = Granted, 0 = Denied |

For successful authentication, additional fields may be included:

| Byte Size | Description |
|---|---|
| 1 | User Profile sent |
| 4 | If profile sent, indicates length of profile field |
| n | Mime-encoded User Profile |

Subtype 4: Generic Error

If the server encounters any error during a client session, this type of datagram captures the error. The fields included are:

| Byte size | Description |
|---|---|
| n | Error message |

Subtype 5: Invalid Datagram

If the datagram passed to the server are considered invalid for any reason, this type of datagram will contain the reason in its payload.

| Byte Size | Description |
|---|---|
| n | Error description |

Subtype 6: Improper Permissions

This datagram denotes that the network access is denied.

| Byte Size | Description |
|---|---|
| 1 | Major Type |
| 1 | Minor Type |
| n | Error Message |

Subtype 7: Keep-Alive

This datagram is sent by the server and/or the client to each other in a predetermined interval, to keep the TCP connection open. This is useful when the system is running through various proxy-firewalls (e.g., FW-1) or running over a dial-up connection (e.g., through a dial-up router).

This type of datagram is also useful for the server to request that the client return a keep-alive datagram, so as to detect whether the client is alive. The server may disconnect when no response is received from the client.

| Byte size | Description |
|---|---|
| 0, 1 | 0 = No answer needed; 1 = Please reply |

Major Type 1: Content Datagram

Subtype 1: Normal Content Datagram

This datagram contains the actual content data to be transmitted.

| Byte size | Content |
|---|---|
| 4 | Final Recipient-ID |
| n | Mime encoded data |

Subtype 2: Remote Logging

This datagram contains log-entries from a connecting device, with a "log-collector" client installed, destined for a logging server, which may itself be a client to another network, according to certain embodiments.

| Byte size | Content |
|---|---|
| 8 | Final Recipient-ID |
| n | Mime encoded log-data |

Subtype 3: Remote Data-Collector

This datagram represents a query for a client from the "Remote Data Collector" engine at the server, to acquire data from the client for establishing the connection.

| Byte size | Content |
|---|---|
| 8 | Final Recipient-ID |
| 1 | Data gram type (query or answer) |
| n | Mime encoded data |

Subtype 4: Content Approval Request

This datagram is used for requesting approval of the content data transmitted, such as, signing off documents, expense reports, and approving an electronic financial transaction.

| Byte size | Content |
|---|---|
| 8 | Final Recipient-ID |
| n | Mime encoded and XML formatted content for approval |

Subtype 5: Content Approval Reply

| This datagram is used to reply to Content Approval Requests (Subtype 4). | |
|---|---|
| Byte size | Content |
| 8 | Final Recipient-ID |
| 1 | Approve or reject |
| 1 | Length of signature field |
| n | ECC Signature on the data-field of the "Type 8" packet. |

Major Type 2: Broadcast Datagram

This type of datagrams is used for a variety of conferencing and broadcasting applications. A number of subtypes may be implemented, including: non real-time point-to-multipoint transmission; real-time point-to-point transmission (e.g., user-to-user chat, audio-video conference); real-time point-to-multipoint transmission (e.g., stock ticker, audio-video broadcast); real-time multipoint-to-multipoint transmission (e.g., audio-video conference).

Major Type 3: Connection Proxy

The Connection Proxy datagrams are used to carry raw connection data and send the same from an embedded or built-in application on the client to a network server.

Proxy Connections are typically requested over a control-channel, i.e., the first connection to the server, and established when a new connection to the server is opened upon the request, which is successfully processed. A "Proxy Connection-ID" is then given, also used for authentication purposes. In alternative embodiments, the Proxy Connections may be established over the control-channel directly. This supports data transmission via a single connection. It lightens the load on the server and client if the proxy connection carries very little data, such as the case when a Terminal Server or telnet connection is used.

Connection Types

Different types of connection protocols may be used.

| | |
|---|---|
| 0: | TCP |
| 1: | UDP |

Subtype 1: Proxy Data from Client

These datagrams carry the actual data for the proxy connection, coming form the client end. One user may have one or more proxy connection open at the same time. A Connection ID (CID) field is included to identify each connection.

| Byte Size | Description |
|---|---|
| 2 | Proxy Connection ID |
| n | Data |

Subtype 2: Proxy Data to Client

These are the connection data coming back from the proxy connection to the client (or the owner of the connection). No other field than the actual data is included, since the proxy connection only sends to and receives connection data to the owner of the connection. In order for the client to identify which remote connection (i.e., server) responded, the CID is included in the originator field of the datagram.

| Byte Size | Description | |
|---|---|---|
| N | Data | |

| Type | Sender | Description |
|---|---|---|
| 0: | Server | Remote Socket Connected. |
| 1: | Server | Remote Socket Disconnected. |
| 2: | Client | Disconnect Remote Socket but keep Proxy Connection (CID). |
| 3: | Client | Terminate Proxy Socket Connection (complete teardown). |
| 4: | Server | Proxy Socket Terminated (complete teardown). |

Major Type 4: Large Content Transfer

These datagrams are designed to transfer large pieces of content data such as audio-video media and data files.

Subtype 0: Receipt on Transfer

If the sender requested a receipt from the final-recipient, the final-recipient may issue a 4,0 type datagram with a receipt on the transfer.

The receipt returned includes the content of the CRC field and the transfer-ID.

| Byte Size | Description |
|---|---|
| 1 | Length of CRC field |
| n | Checksum on content transferred |
| n | Transfer-ID |

Subtype 1: Content Transfer Request

Used by a client to request transfer of large content. Upon receiving client's request, the server will return a Transfer-ID (TID) for the client to use, so the client can open an additional connection to the server for transferring the content. As such, the control-connection will not be blocked during lengthy transfers.

| Byte Size | Description |
|---|---|
| 4 | Size in bytes of content to be transferred |
| 2 | Total number of chunks to send |
| 4 | Final Recipient-ID |

Subtype 2: Content Transfer Reply

| Byte Size | Description |
|---|---|
| 1 | 0 = Transfer denied, 1 = Transfer Allowed |
| n | If Transfer Allowed, this field will be present and contain the Transfer ID (TID) to be given to the server, when the client opens another connection for transferring the file. |

Subtype 3: Content Transfer Segment

| Byte Size | Description |
|---|---|
| 2 | Segment number |
| n | Segment chunk |

Subtype 4: Re-Transmission Request

This is used to re-request a segment of content, usually in the case where the content transferred fails to pass checksum check. It may also be used to recover from loss of transfer-connection.

| Byte Size | Description |
|---|---|
| 2 | Chunk to resend |
| n | TID |

Major Type 5: User Directory

Datagrams of this type are used to search for users, user groups, or update user information in the User Directory.

Search fields in the query are treated as a mask. Searches are done with the search masks treated as a regular expression, when the underlying database infrastructure supports.

MySQL may be implemented to provide a default database base system, in which regular expression searches are supported. The system configuration thus supports all searches using regular expressions.

Subtype 1: User Online

This datagram are used to notify the system when a user becomes connected to the network.

| Byte Size | Description |
| --- | --- |
| 4 | UserID of user |

Subtype 2: User Offline

This datagram are used to notify the system when a user is disconnected from the network.

| Byte Size | Description |
| --- | --- |
| 4 | UserID of user |

Subtype 3: User Search Request

This is used by the connected client to search for users in the entire user directory based on a certain data mask. This type of search returns the type 5,10 datagrams.

| Byte Size | Description |
| --- | --- |
| n | Mask to search for |

Subtype 4: Distinct User Search

Similar to Subtype 3, but returns a more precise match on the user. This type of search returns the type 5,10 datagrams.

| Byte Size | Description |
| --- | --- |
| 4 | UserID |
| 8 | Last login |
| 1 | Online status |
| n | Display Name |

Major Type 6: Remote Management

This datagram type enables the administrators or privileged users in the network system to remotely control other connected clients, execute applications on the connected clients and push updates.

Subtype 1: Execute Remote Console Application

The 6,1 datagram executes the application defined and maintains an open handle to the application, where the process-id of the application are returned to the initiator upon successful execution. This process-id must be used in all subsequent command—or control datagrams for the process.

| Byte Size | Description |
| --- | --- |
| 8 | Target User-ID |
| n | Full path and name of application to execute |

Subtype 2: Remote Execution Result

Are sent back to the initiator of the 6,1 datagram upon successful execution of the 6,1 datagram.

| Byte Size | Description |
| --- | --- |
| 8 | Destination User-ID |
| 2 | Process-ID |

Subtype 3: Remote Process Terminated

When the remote process initiated by the 6,1 datagram terminates, a 6,3 datagram are sent with the exit code from the application.

| Byte Size | Description |
| --- | --- |
| 8 | Destination User-ID |
| 2 | Process-ID |
| 2 | Application Exit Code |

Subtype 10: Remote Tool Request

To simplify retrieval of data from a remote client, or perform basic control on a remote device, a basic tool-set are made available to retrieve information from the remote device, including information on a list of running processes, logged-in user(s), data storage etc.

| Byte Size | Description |
| --- | --- |
| 8 | Target User-ID |
| 1 | Tool identifier |
| n | Optional Parameters (if the specific tool need them) |
| Tool Identifiers | |
| 0 | List Running Processes |
| 1 | List Running Processes including hidden processes |
| 2 | Kill process (PID given as parameter) |
| 3 | List Services |
| 4 | Stop Service (Service Name as Parameter) |
| 5 | Start Service (Service Name as Parameter) |
| 6 | Restart Service (Service Name as Parameter) |
| 7 | List Local Storage Devices, including volume label, size, block size, space used and file-system type. |

Subtype 11: Remote Tool Reply

Contains a CSV formatted reply depending on the tool requested.

| Byte Size | Description |
| --- | --- |
| 8 | Destination User-ID |
| n | CSV data output from Remote Tool |

Subtype 20: Application Transfer Request

Used to initiate the transfer of an application or application update.

| Byte Size | Description |
| --- | --- |
| 1 | Transfer type Destination User-ID |
| 1 | Options (bitfield) |
| 4 | Size of content |
| n | Path and Name target of file (optional, defaults to root of client) Options Bitfield |

| Bit | |
| --- | --- |
| 1 | Auto execute (also covers auto-update, auto-expand etc.) |
| 2 | Prompt user (before execution/update) |
| 3 | Return Receipt after transfer Transfer types |
| 1 | Transfer of file (for update, existing file are not required present) |
| 2 | Transfer of Client firmware (replaces current) |
| 3 | Transfer of Client .ISO codes (replaces current, ISO codes include CD ROM data format e.g., ISO 9660, and other data standards per the International Organization for Standardization, www.iso.org) |
| 4 | Transfer of compressed archive (to be expanded at target location) |

Subtype 21: Application Transfer Reply

Used to signal grant or denial.

| Byte Size | Description |
| --- | --- |
| 1 | Allow/Deny |
| 8 | Transfer-ID (Only appended if transfer granted) |

Subtype 22: Application Transfer Content Part

These datagrams hold the actual data for transfer.

The four-octet 'Content Part' field would allow for up to 256^4 parts in a single transfer, which would provide for the transfer of applications, images and archives exceeding 4 Gigabytes in size (if, e.g., using datagrams holding 1K of data each).

The 'Transfer Part' Field starts at 1 and increments by one for every part transferred, sending a 6,22 datagram with a 'Transfer Part' of 0 (zero) to signal end-of-transfer.

| Byte Size | Description |
| --- | --- |
| 8 | Transfer-ID |
| 4 | Transfer Part |
| n | Data Content |

Subtype 23: Transfer Receipt

A checksum of the application transferred.

| Byte Size | Description |
| --- | --- |
| 1 | CRC-Type |
| n | Checksum on Application Transferred |

Major Type 7: Real-time Multimedia Transfer

This type of datagrams is utilized to support client-to-client transmissions of multimedia content.

Subtype 1: Transfer Request

Used to request permission to begin the transmission.

| Byte Size | Description |
| --- | --- |
| 4 | Recipient UserID |
| 2 | Media Content Type |
| 4 | Minimum Bandwith Required in Kbit/S Media Content Types |

| Type | |
| --- | --- |
| 1 | 5 KHz, 8 bit, 1 channel audio |
| 2 | 8 KHz, 8 bit, 1 channel audio |
| 3 | 11 KHz, 8 bit, 1 channel audio |
| 4 | 11 KHz, 8 bit, 2 channel audio |
| 5 | 22 KHz, 16 bit, 2 channel audio |
| 6 | 44 KHz, 16 bit, 2 channel audio |

Subtype 2: Transfer Reply

Byte Size Description
4 Recipient UserID
1 Accept (1) or Deny (0)
4 Content Stream ID (issued by the receiving client and should exist only if the request was accepted)

Subtype 3: Media Stream Packet

These datagrams carry the individual packets that make up the transmission.

| Byte Size | Description |
| --- | --- |
| 4 | Recipient UserID (0 for using recipient list) |
| 4 | Content Stream ID |
| n | Stream Packet (content data) |

Subtype 4: Transmission Termination

Can be issued by both sender and receiver to indicate either end-of-transmission (if sent by transmission source) or abort-transmission. (if sent by the recipient).

| Byte Size | Description |
|---|---|
| 4 | Recipient UserID (zero for using recipient list) |
| 4 | Content Stream ID |

Subtype 5: Recipient List Management

When performing a one-to-many transmission such as a lecture, conference call (VoIP), one may rely on these datagrams to manage data distribution to the entire list of recipients.

| | Description |
|---|---|
| Byte Size | |
| 1 | Action |
| n | Data |
| | Action Definitions: |
| Action | |
| 0 | Delete recipient list (if one set) |
| 1 | Add user(s) to list (space-separated list of UserIDs as data) |
| 2 | Remove user(s) from list (space-separated list of UserIDs as data) |

Subtype 6: Transmission Diversion Request

These datagrams enable the client to transfer its "end of the transmission" notification to another user.

| Byte Size | Description |
|---|---|
| 4 | Recipient ID |
| 2 | Media Content Type |
| 4 | Minimum Bandwidth Required in Kbit/S |

EXAMPLE 2

Object Vector Based Super Classifier and Biometrics

Figure 2:
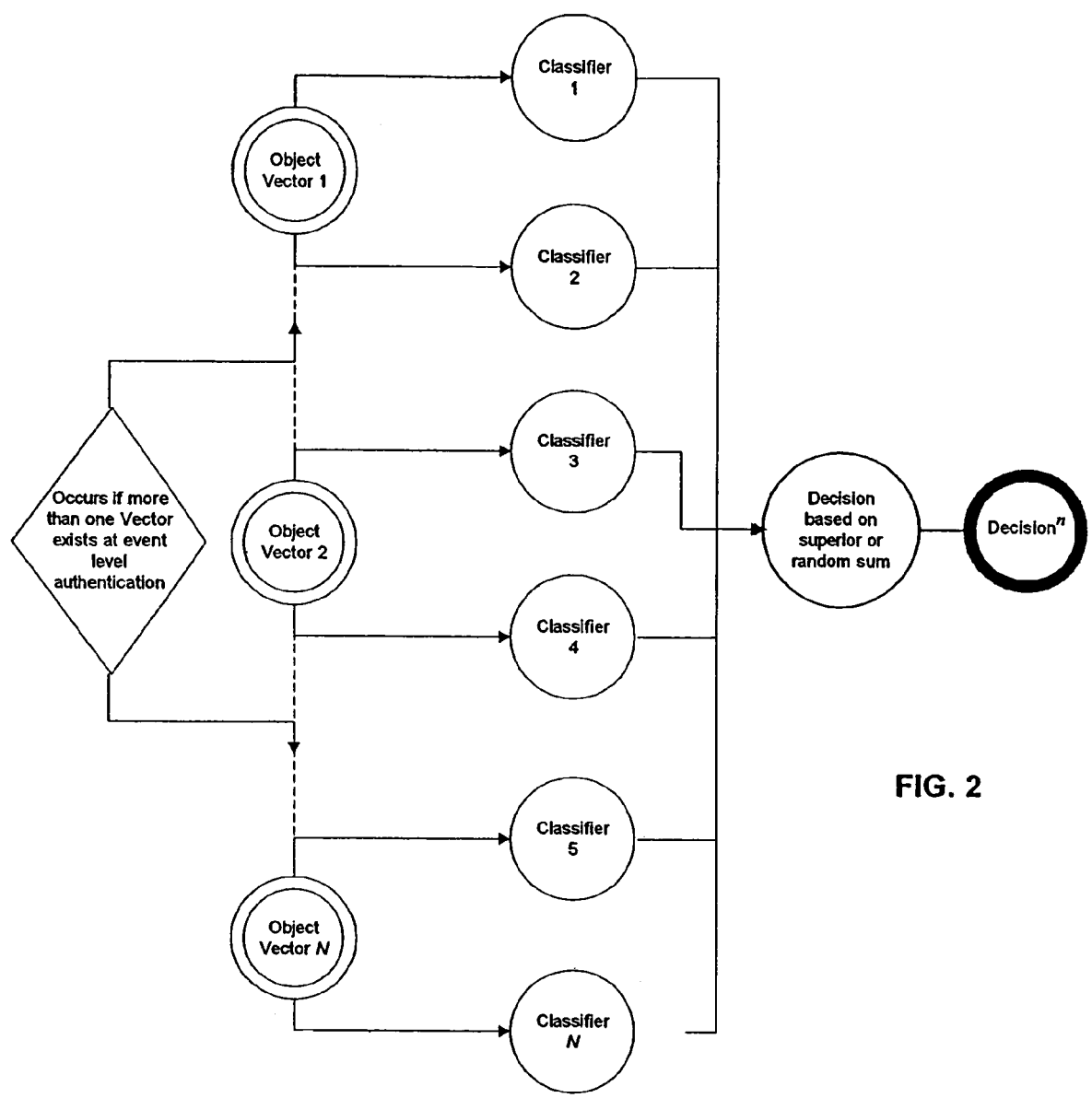
FIG. 2 illustrates an object vector super classifier according to another embodiment of this disclosure.

Referring to FIG. 2, an object vector super classifier (also referred to as multi classifiers) is shown. More than one data object vectors are used for event-level authentication. The classification decisions may be made based on superior or random sum computed from the data vector objects, including Object Vector 1, 2, and 3 in FIG. 2. Here, each object vector is connected to one or more classifiers from classifiers 1 to N. That is, feature extractions may be made from multiple object vectors and then transformed into a set of classifiers, which collectively constitute a super classifier. Event-specific transformation provides relatively simple distributions that characterize event-based features.

One example of user authentication using super classifiers involves biometrics. In one embodiment of this disclosure, the super classifier is used in connection with physical biometric measurements, including voice recognition, fingerprints, handprints, blood vessel patterns, DNA tests, retinal or iris scan, and face recognition, among other things. In an alternative embodiment, the super classifier is used in connection with performance biometric measurements, including habits or patterns of individual behavior.

The event-based authentication session and the selection and execution of the object analysis based on those user-specific events increases the likelihood of identifying or deriving binary structures in the object decision analysis. As binary structures are added to a super classifier, the authentication session may be evaluated with a high probability rate.

It is to be understood that the description, specific examples and data, while indicating exemplary embodiments, are given by way of illustration and are not intended to limit the various embodiments of the present disclosure. All references cited herein are specifically and entirely incorporated by reference. Various changes and modifications within the present disclosure will become apparent to a skilled artisan from the description and data contained herein, and thus are considered part of the various embodiments of this disclosure.

Appendix 1: Object Classification In Speaker Verification

Classification and Probability Density Estimation

Speaker verification is a classification problem like any other data object vector involving two classes: target speakers (/) (user of object) and impostors (-/) (perpetrator of object). In order to do classification, in this case, a set of measurements derived from recordings of a speakers voice are needed. These measurements are conveniently represented as D-dimensional vectors:

$$(\vec{x} \in R^D)$$

Each speaker is characterized by a probability density function:

$$p(\vec{x}|I)$$

which measures the likelihood of observations. The probability density is characterized by $$p(\vec{x}|I) \geq 0, \forall \vec{x} \qquad \text{Equation: 1.1}$$

$$p(\vec{x}) = p(\vec{x}|I)P(I) + p(\vec{x}|\neg I)P(\neg I) \qquad \text{Equation: 1.2}$$

$$\int_{\vec{x}} p(\vec{x})d\vec{x} = 1 \qquad \text{Equation: 1.3}$$

where P(I) and P(-/) are the a priori probabilities of respectively target speaker trials and impostor trials. For speaker verification, the a posteriori probability of the claimed speaker, I, given an observation, $\vec{x}_i$, is of interest.

The a posteriori probability can be computed by Bayes rule $$P(I|\vec{x}) = \frac{P(I)p(\vec{x}|I)}{p(\vec{x})} \qquad \text{Equation: 1.4}$$

Since / and -/ are mutually exclusive we have $$P(I|\vec{x}) + P(\neg I|\vec{x}) = 1 \qquad \text{Equation: 1.5}$$

i.e. the probability that the identity claim was correct given the observation, $\vec{x}_i$, plus the probability of some other speaker (not I) was speaking sum to one. It is attractive to use the a posteriori probability $P(I|\vec{x})$ for classification purposes: the identity claim is accepted or rejected by the rule:

$$\text{Decide} \begin{cases} \text{accept} & \text{if } P(I|\vec{x}) \geq P(\neg I|\vec{x}) \\ \text{reject} & \text{otherwise} \end{cases}$$

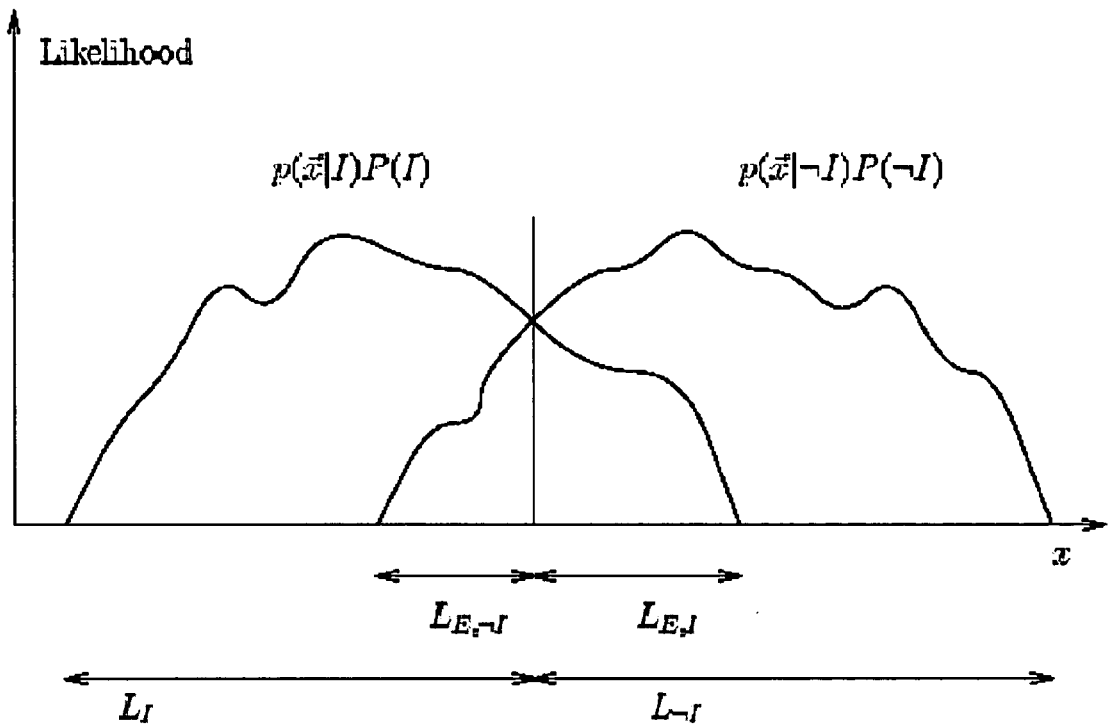

Figure: 1 Probability densities for the two classes, I and -I. The densities overlap in the regions:

$L_{E,I}$ & $L_{E,\neg I}$; ⟵——— Equation: 1.6 this causes the Bayes error rate to be greater than 0. A classifier that uses this decision rule is called a Bayes classifier. The error rate of a Bayes classifier is equal to $$E_{Bayes} = \int_{L_I} P(\neg I|\vec{x})p(\vec{x})d\vec{x} + \int_{L_{\neg I}} P(I|\vec{x})p(\vec{x})d\vec{x} \quad \text{Equation: 1.7}$$

$$\text{Equation: 1.8}$$

$$= \int_{L_I} P(\neg I)p(\vec{x}|\neg I)d\vec{x} + \int_{L_{\neg I}} P(I)p(\vec{x}|I)d\vec{x} \quad \text{Equation: 1.9}$$

where $$L_I = \{\vec{x} \mid P(I|\vec{x}) \geq P(\neg I|\vec{x})\} \quad \text{Equation: 1.10}$$
$$L_{\neg I} = \{\vec{x} \mid P(I|\vec{x}) < P(\neg I|\vec{x})\} \quad \text{Equation: 1.11}$$

In practice the probability functions:

$$P(I|\vec{x}) \text{ and } P(\neg I|\vec{x})$$

are unknown and can only be approximated. Hence, the error rate of any practical decision strategy is bound to have an error rate which on average is not less than the Bayes error rate.

A Priori Probabilities & Risk Minimizations

The average error consists of two terms; rejections of target speakers (TA errors):

$$E_I = \int_{L_{\neg I}} P(I) p(\vec{x}|I) d\vec{x} \quad \text{Equation: 1.12}$$

and acceptances of impostors (IR errors):

$$E_{\neg I} = \int_{L_I} P(\neg I) p(\vec{x}|\neg I) d\vec{x} \quad \text{Equation: 1.13}$$

Using a posteriori probabilities to classify samples is essentially the same as classifying according to maximum likelihood. The overall error rate is, however, dependent on the relative number of impostor and target speaker trials. If impostor trials are much more frequent than target speaker trials, then it pays of too classify some samples as class -I even if class I is more likely, because the overall absolute error is more dependent on E-I than on EI. In other words, E-I is minimized at the expense of EI. The way to balance these error rates optimally is by fixing the a priori probabilities to reflect the relative number of impostor/target speaker trials (object attempts).

Assigning prior probabilities is only one way of balancing TA and IR errors. Generally the two types of errors may have different consequences and it may therefore be desirable to achieve a balance which reflects the cost of misclassification. In this case P(I) and P(-I) are replaced by:

$$C(I) = P(I)C(\neg I|I) \quad \text{Equation: 1.14}$$
$$C(\neg I) = P(\neg I)C(I|\neg I) \quad \text{Equation: 1.15}$$

where $C(I|\neg I)$ is the cost of classifying an $\neg I$-sample as I. The classification is here according to risk and not a posteriori probability:

$$R(I|\vec{x}) = \frac{C(I|\neg I) P(I) p(\vec{x}|I)}{p(\vec{x})} \quad \text{Equation: 1.16}$$

Analogously to equation 1.6 we have the decision rule:

$$\text{Decide} \begin{cases} \text{accept} & \text{if } R(I|\vec{x}) \geq R(\neg I|\vec{x}) \\ \text{reject} & \text{otherwise} \end{cases} \quad \leftarrow \text{Equation: 1.17}$$

A more pragmatic approach to the problem of balancing TA and IR errors is to decide a priori an acceptable error rate for either $E_I$ or $E_{\neg I}$, and then use this to determine the decision surfaces (and by extension $P(I)$ and $P(\neg I)$). Whatever way is chosen, the real problem of estimating the class likelihoods, $$p(\vec{x}|I)$$

and $$p(\vec{x}|\neg I)$$

remains the same.

Probability Estimation

One approach to implementing a decision rule is to separately estimate the probability densities and $$p(\vec{x}|I)$$

and $$p(\vec{x}|\neg I)$$

in the test situation - use Bayes rule to convert likelihoods to probabilities, which can be used in place of $$P(I|\vec{x})$$

This solution, however, is more extensive than required, since the verification (which by virtue of it's utterance translation becomes a binary data object) problem only depends on the likelihood ratio:

$$(\text{LR}(\vec{x})):$$

$$P(I|\vec{x}) \geq P(\neg I|\vec{x})$$

$$\updownarrow$$

$$\text{LR}(\vec{x}) = \frac{P(I)}{P(\neg I)} \frac{p(\vec{x}|I)}{p(\vec{x}|\neg I)} \geq 1$$

In terms of LR(~x), the decision function 2.6 becomes:

$$\text{Decide} \begin{cases} \text{accept} & \text{if } \text{LR}(\vec{x}) \geq 1 \\ \text{reject} & \text{otherwise} \end{cases} \quad \longleftarrow \text{Equation: 1.18}$$

The Bayes decision surface between class *I* and class *-I* is characterised by:

$$\text{LR}(\vec{x}) = 1.0$$

For classification purposes we only need to know on which side of the decision surface the test sample $\vec{x}$ falls. In the example given in figure 2.1, this surface is the simplest possible: a single point $x = t$, where $t$ is the decision threshold.

A distinction is made between parametric and non-parametric classification. The difference lies in the prior assumptions that are made about the class distributions. Parametric classification assumes that the samples to be classified belong to a narrowly defined family of probability density functions, whereas non-parametric classification makes only weak assumptions about the prior distributions. Hence, non-parametric classification is more general, whereas parametric classifiers are easier to construct, because they have fewer degrees of freedom.

Parametric Classification

As an example of parametric classification, we might assume that the classes $(j = 1, 2)$ are characterised by normal probability densities:

$$\mathcal{N}(\vec{v}; \vec{\mu}_j, \mathbf{S}_j) = \frac{1}{(2\pi)^{D/2} |\mathbf{S}_j|^{1/2}} \exp\left(-0.5(\vec{v} - \vec{\mu}_j)^T \mathbf{S}_j^{-1} (\vec{v} - \vec{\mu}_j)\right)$$

Equation: 1.19

In this case:

$$\text{LR}(\vec{x})$$

is given by:

$$\ln\left(\text{LR}(\vec{x})\right) = g(\vec{x}) \quad \longleftarrow \text{Equation: 1.20}$$

$$g(\vec{x}) = (\vec{x} - \vec{\mu}_2)^T \mathbf{S}_2^{-1} (\vec{x} - \vec{\mu}_2)$$

$$- (\vec{x} - \vec{\mu}_1)^T \mathbf{S}_1^{-1} (\vec{x} - \vec{\mu}_1) + 2 \ln\left(\frac{|\mathbf{S}_2|^{1/2}}{|\mathbf{S}_1|^{1/2}}\right)$$

Equation: 1.21

This is a quadratic function. If we furthermore assume that the two distributions share the same covariance matrix *S1* = *S2* = *S*, this simplifies to $$g(\vec{x}) = \vec{a}(\vec{x} - \vec{\mu})$$ ← Equation: 1.22

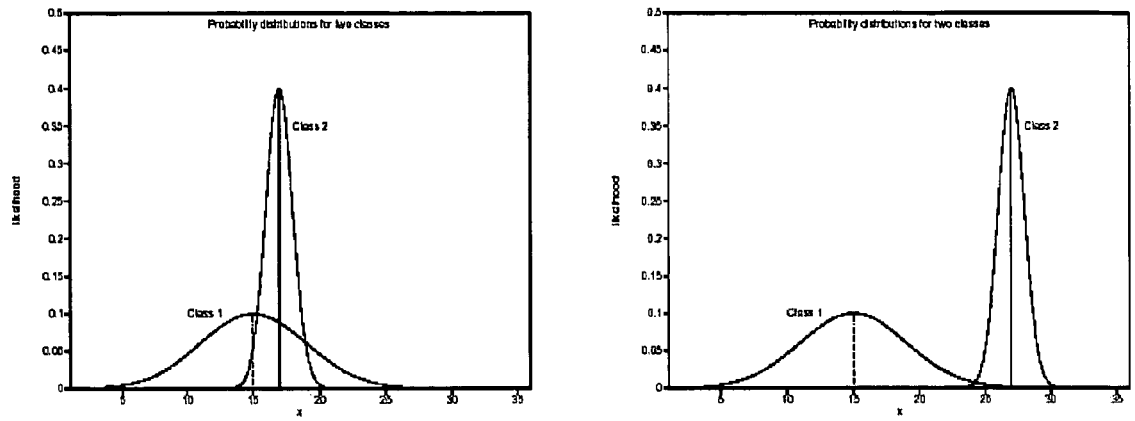

Figur 2 Two classes were the Bayes classifier uses quadratic decision surfaces.

Left: The classes have similar means:

$$\mu_1 = 15, \mu_2 = 17$$

Right: The classes have different means:

$$\mu_1 = 15, \mu_2 = 27$$

In the right example, the Bayes decision surface can be approximated well by a linear function.

where $$\vec{a} = S^{-1}(\vec{\mu}_1 - \vec{\mu}_2)$$ ← Equation: 1.23

$$\vec{\mu} = \frac{1}{2}(\vec{\mu}_1 + \vec{\mu}_2)$$ ← Equation: 1.24

This is a linear function. In discriminate analysis equation 1.22 is known as Fisher's linear discriminate function. As we have seen, this discriminate function is optimal for normally distributed classes characterized by the same covariance matrices, but its usefulness goes beyond this. It is a robust function, which (although not optimal) can be used with good results if the class distributions have the form of "spherical clouds". In fact, even if it is known that equation 1.21 - and not equation 1.22 - is the optimal discriminate function, equation 1.22 may yield better results (Raudys and Pikelis 1980). The problem when
using equation 1.21 is that from a limited sample set, it is difficult to obtain good estimates for $S1$ and $S2$. This is especially true in high dimensional spaces.

The linear classifier is less sensitive to estimation errors since the dependence is primarily on the first order moments (the means):

$\mu_1$ & $\mu_2$:

which are easier to estimate than S1 and S2 (the second order moments). If needed, the linear classifier may be further simplified by assuming S to be diagonal, or even S equal to the identity matrix.

Example
Figure 2 shows two examples of 1-dimensional density functions for two normally distributed classes. In both examples the Bayes decision surfaces are quadratic, because the variances are different $(\sigma_1^2 = 16, \sigma_2^2 = 1)$ In case one the means are:
$\mu_1 = 15, \mu_2 = 17$ and in case two:

$\mu_1 = 15, \mu_2 = 27$

Assuming equal priors, we can determine a decision rule using equation 1.21:

$$LR(x) = 1 \quad \longleftarrow \text{Equation: 1.25}$$

$$\Updownarrow$$

$$\left(\frac{1}{\sigma_2^2} - \frac{1}{\sigma_1^2}\right)x^2 + \left(\frac{2\mu_1}{\sigma_1^2} - \frac{2\mu_2}{\sigma_2^2}\right)x + \frac{\mu_2^2}{\sigma_2^2} - \frac{\mu_1^2}{\sigma_1^2} - 2\ln\left(\frac{\sigma_1}{\sigma_2}\right) = 0$$

Equation: 1.26

Hence we have the decision rule:

$$\text{Decide} \begin{cases} \text{Class 1} & \text{if } x \leq 15.3 \quad \vee \quad x \geq 18.9 \\ \text{Class 2} & \text{otherwise} \end{cases}$$

The error rate is $$E = \frac{1}{2}(E_1 + E_2)$$
$$= \frac{1}{2}(0.30 + 0.07)$$
$$\approx 18.8\%$$

In the linear case we have from 1.22:

$$LR(x) = 1 \qquad \text{Equation: 1.27}$$

$$\Updownarrow$$

$$x = \frac{1}{2}(\mu_1 + \mu_2) \qquad \text{Equation: 1.28}$$

which leads to the decision rule $$\text{Decide} \begin{cases} \text{Class 1} & \text{if } x \leq 16.0 \\ \text{Class 2} & \text{otherwise} \end{cases}$$

With the error rate $(0.40 + 0.16)/2 \approx 28\%$. The Quadratic classifier is here significantly better than the linear classifier. In case 2 the corresponding decision rule becomes $$\text{Decide} \begin{cases} \text{Class 1} & \text{if } x \leq 24.2 \;\vee\; x \geq 31.4 \\ \text{Class 2} & \text{otherwise} \end{cases}$$

for the quadratic classifier and $$\text{Decide} \begin{cases} \text{Class 1} & \text{if } x \leq 21.0 \\ \text{Class 2} & \text{otherwise} \end{cases}$$

for the linear classifier. The average error rates are respectively 0.007% and 0.03%, which very small for both decision rules. Relatively, the quadratic decision rule is, however, still significantly more accurate. This is not because it is quadratic: a linear decision rule such as $$\text{Decide} \begin{cases} \text{Class 1} & \text{if } x \leq 24.2 \\ \text{Class 2} & \text{otherwise} \end{cases}$$

has the same small error rate as the quadratic decision rule. Hence, the difference in performance is here caused by the assumptions about the prior distributions.

Linear versus Non-Linear Decision Surfaces

Assuming a priori that the solution to $$LR(\vec{x}) = 1 \quad \text{Equation: 1.29}$$

is linear in $\vec{x}$ simplifies the design of a classifier. Non-linear classifiers are more powerful, because they allow the solution to 1.29 to be drawn from a larger set (which usually includes the linear solution as a special case). There is, however, nothing limiting about assuming linear decision surfaces, since the linearity refers to $\vec{x}$, but the vector $\vec{x}$ may be "preprocessed" before being given to the classifier. Assume, for instance, that the optimal decision surface - in a given 2D problem $$(\vec{x} = (x_1, x_2)^T)$$

has the form $$Ax_1^2 + Bx_2^2 + Cx_1x_2 + Dx_1 + Ex_2 + F = 1$$

A linear classifier is able to implement this decision surface if the classification, rather than in terms of $x_1$ and $x_2$ is done in terms of $$(\phi_1(\vec{x}), \phi_2(\vec{x}), \phi_3(\vec{x}), \phi_4(\vec{x}), \phi_5(\vec{x}))^T$$

where $$\begin{aligned}
\phi_1(\vec{x}) &= x_1^2 \\
\phi_2(\vec{x}) &= x_2^2 \\
\phi_3(\vec{x}) &= x_1 x_2 \\
\phi_4(\vec{x}) &= x_1 \\
\phi_5(\vec{x}) &= x_2
\end{aligned} \quad \text{Equation: 1.30}$$

In other words, the 2D quadratic decision function can be implemented by a linear function in a 5D space.

Non-parametric Classification

Figure 3 shows a realistic example of what the class (speaker or the object) distributions in a speaker recognition system or an object recognition engine might look like.

The assumption that the observations from a given speaker are drawn from a normal distribution is here reasonable.

Fisher's discriminate function is suitable for discrimination between any two speakers (and in this case comparative to object containing any given data source), but is obviously a poor model (in 2D) for discriminating between one target speaker and the remaining speakers in the population (a line can not be drawn which separates an individual speaker from most of the other speakers in the population). In fact, the impostor class is too complicated to be modeled well by any simple parametric distribution. This is a common situation for many pattern classification problems. A number of techniques exist for non-parametric classification and probability density estimation.

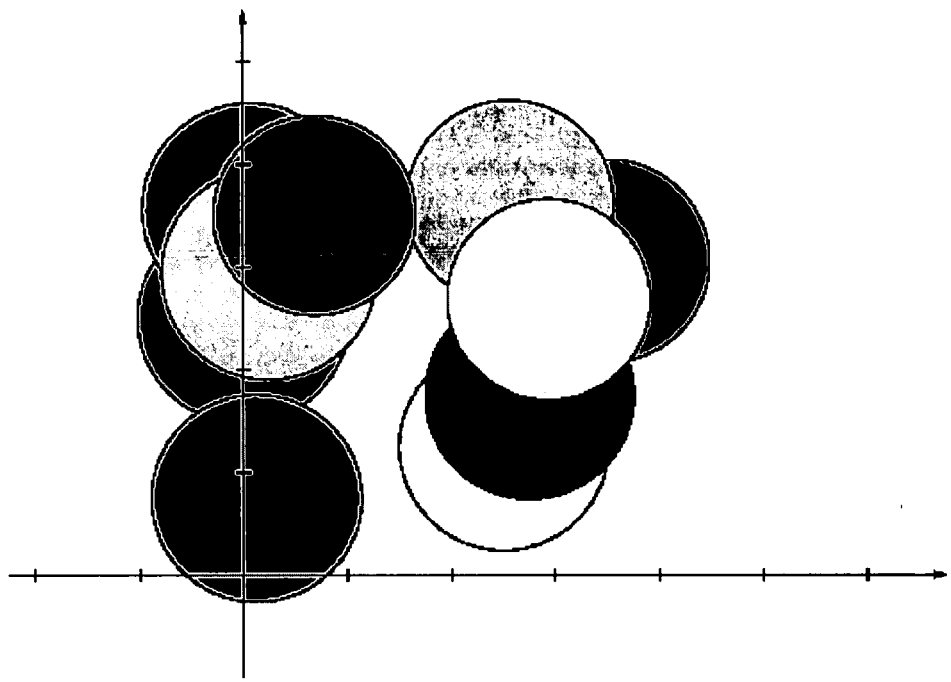

Figur 3 Probability distribution of 2D samples drawn from a set of ten different

Non-parametric Probability Density Estimation

Given a training set of samples with known class membership, non-parametric probability density estimation is the problem of constructing a PDF, that approximates the real PDF characterizing the classes without assuming anything about this function other than it exists.

Histogram Rules

The simplest approach to non-parametric density estimation is to divide the feature space into volumes $v$ of size $h^D$, where h is the side length of a D-dimensional hypercube. The likelihood of a given test sample, $\vec{x}$, can then be computed by identifying the volume, $v(\vec{x})$, to which it belongs, and computing the relative number of training samples that fall in this volume:

$$\hat{p}(\vec{x}) = \frac{n(v(\vec{x}))}{Nh^D} \quad \text{Equation: 1.31}$$

where $n(v(\vec{x}))$ is the number of samples that fall in the volume, $v(\vec{x})$, to which $\vec{x}$ belongs, and $N$ the total number of samples in the training set. 1.2.2 k-Nearest Neighbour.

Nearest neighbour PDF estimation removes the problem of selecting the parameter h by letting the sizes of the different volumes vary so that a fixed number of training samples (k) fall in each volume. The result is a so called Voroni partition (tessellation) of the feature space. An example (k = 1) is given in figure 4

Like the histogram rule, however, the probability density estimate is discrete:

two neighbouring samples on different sides of a cell boundary generally have different likelihoods, despite the fact that the distance between them may be

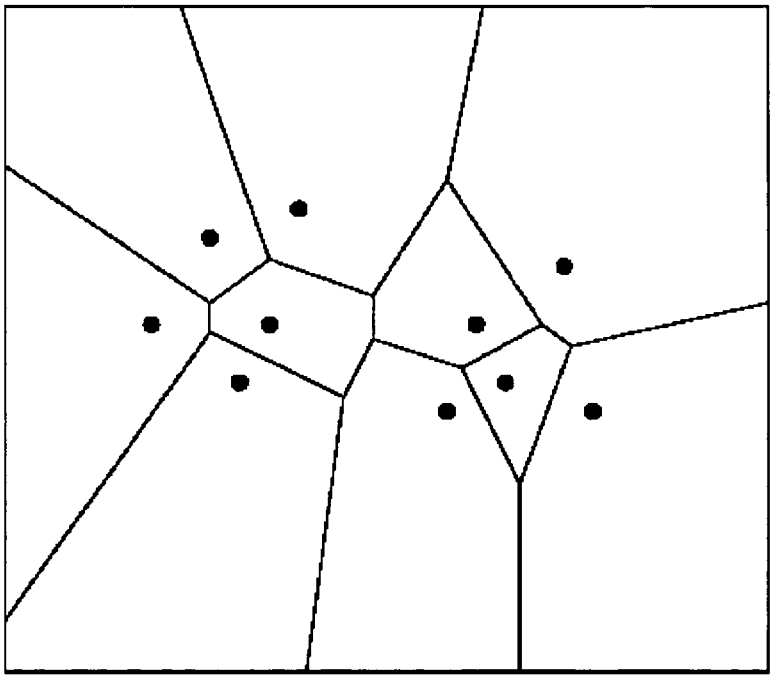

Figur 4: Voroni partition of the feature space resulting from a 1-nearest neighbour Rule arbitrarily small. The Voroni partition also has a boundary problem, because some cells may have an infinite volume, which means that samples falling in these cells have an estimated likelihood of zero.

*Kernel Functions*

An alternative generalisation of the histogram rule is to compute $\hat{p}(\vec{x})$ as a sum of kernel functions (Hand 1982):

$$\hat{p}(\vec{x}) = \frac{1}{N} \sum_{i=1}^{N} \frac{1}{h^D} K\left(\frac{\vec{x} - \vec{\mu}_i}{h}\right) \qquad \longleftarrow \text{Equation: 1.32}$$

The shape of the kernel $K(\vec{x})$ determines the characteristics of $\hat{p}(\vec{x})$. For instance a uniform kernel $$K(\vec{x}) = \begin{cases} 1 & \text{if } \vec{x} \in [-1; 1]^D \\ 0 & \text{otherwise} \end{cases} \qquad \longleftarrow \text{Equation: 1.33}$$

essentially leads to the histogram rule, whereas if $K(\vec{x})$ is a continuous function then $\hat{p}(\vec{x})$ is continuous as well. Gaussian kernels are a popular choice:

$$K(\vec{x}) = \frac{1}{\sqrt{2\pi}} \exp\left(-0.5 \sum_{i=1}^{D} x_i^2\right) \qquad \longleftarrow \text{Equation: 1.34}$$

Since $\hat{p}(\vec{x})$ approximates a PDF, it is convenient to require $$\int_{\vec{x}} K(\vec{x}) d\vec{x} = 1 \qquad \longleftarrow \text{Equation: 1.35}$$

$$K(\vec{x}) \geq 0, \forall \vec{x} \qquad \longleftarrow \text{Equation: 1.36}$$

because this automatically means that $\hat{p}(\vec{x})$ is a PDF.

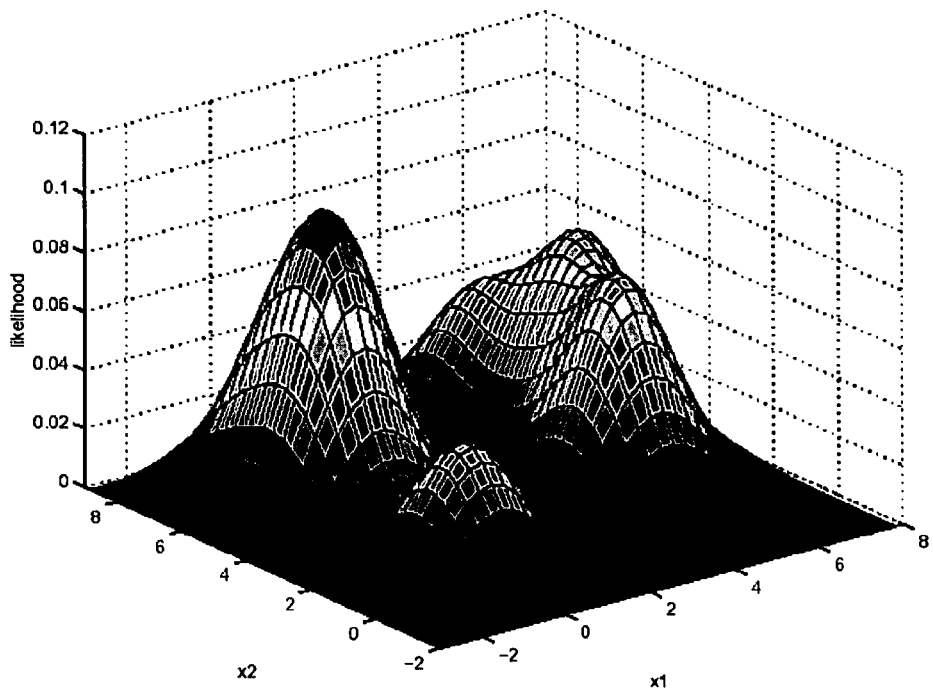

Figure 5: Likely Hood

Likely hood

Figure 5: Kernel estimate of the density function corresponding to figure 3 The kernel functions are generally placed non-uniformly in the feature space. Hence, as opposed to the simple histogram rule, some regions of the feature space are not "modelled" at all, and in others - where the density function is complicated - several kernel functions may overlap in order to model the density.

For instance, to approximate the density function shown in figure 3, it would be reasonable to use 10 kernels, with the centers corresponding to the center of each of the circular regions into which samples of a specific speaker fall. In this case h should reasonably correspond to the standard deviation of a given speakers data. An example of this is shown in figure 1.5, where Gaussian kernels have been used.

*Non-parametric Classification*

The purpose of estimating PDF's is to be able to compute a postheory probabilities, which can be used in decision rule 1.6. It is possible, however, to implement 1.6 directly, without this intermediate step. The way to do this is, basically, to partition the feature space into regions and label each region according to which class samples falling in this region (probably) belong to.

It is not hard to see how the k-Nearest Neighbour rule can be used for classification: simply label each Voroni cell according to which class the majority of the k samples in the cell belong. The resulting decision surfaces will be piece wise linear.

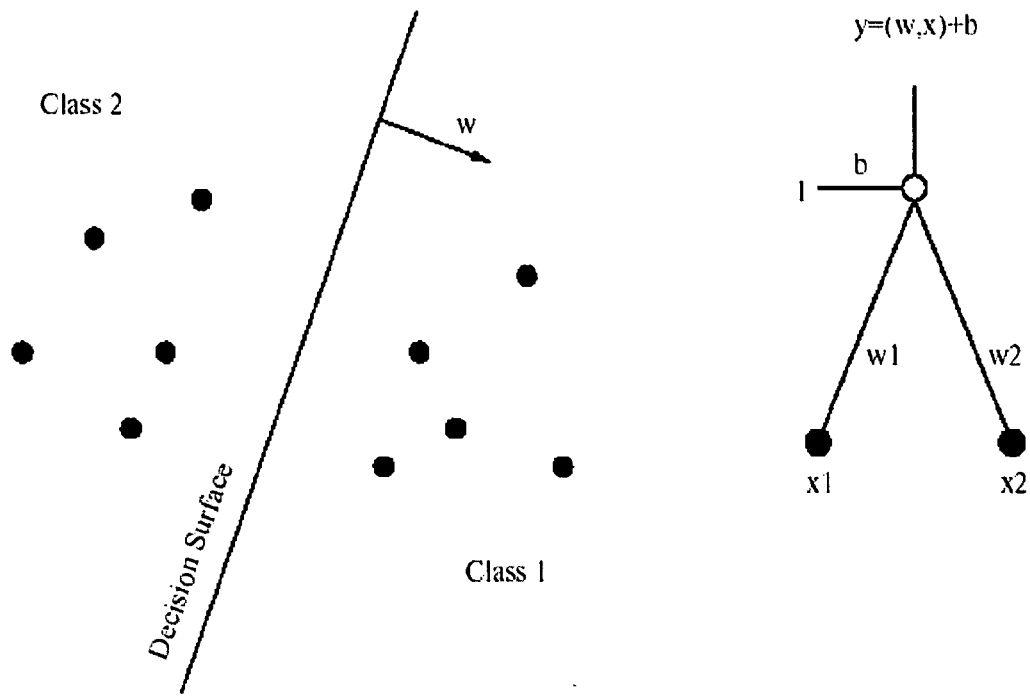

Figur 6: The perceptron (right) forms a hyper plane and classifies samples according to which side of the hyper plane they fall.

Classifiers can also be based on kernel functions. In this case the requirements to the kernel functions K() are less restrictive, because the constraints of a PDF do not have to be fulfilled. The Radial Basis Function (RBF) network is an example of a classifier based on kernel functions.

Basis Function Radius Maximisation

For RBF networks a structure can be imposed on the basis functions by considering the radii of the basis functions:

$$B(\vec{x}) = K\left(\left|\frac{\vec{x} - \vec{\mu}}{h}\right|\right)$$ ⬅ Equation: 1.59 the smaller $h$ is the more "spiked", is the basis function. A spiked basis function is only sensitive to a very small region of feature space and may well signify over training. Wide basis functions ($h$ large) cover a large volume of the feature space; the larger h is the more the basis function resembles a simple bias which is always active. Hence, a network trained to have large radii is more likely to be able to generalise; the radii should be expanded to the point where it does not significantly impair the classification performance on the training set.

*Classifier Ensembles*

It is a problem for many models - in particular neural networks - with even just a limited complexity, that the training algorithms used for estimating their parameters are unable to determine the global minimum of the optimization criteria, but only succeeds in determining a local minimum. For this reason it can be useful to train several classifiers on the same data, and use these networks to create a new "super" classifier. The combination of different networks can not easily be done in the parameter domain, but networks representing different local minima are likely to model different parts of the problem, and a classifier defined as the average output of the individual classifiers will in general perform better than any of the individual classifiers: if the individual mean square error rates (equation 1.40) of N classifiers is denoted, $$E_1, \ldots, E_N$$

t can be shown that the expected mean square error rate of the ensemble of classifiers is given by (Perrone and Cooper 1994):

$$E_{ensemble} = \frac{1}{N^2} \sum_{i=1}^{N} E_i \quad \longleftarrow \quad \text{Equation: 1.60}$$

provided the networks make errors independently. Hence, as long as the errors are uncorrelated, the performance of the classifier ensemble can be improved by adding more networks: the mean square error rate is cut in half each time the number of networks is doubled.

For perceptron type models, networks representing different local minima can be created simply by initializing the weights differently (Hansen and Salamon 1990; Battiti and Colla 1994). In Benediktsson et al. (1997) individual networks (perceptrons) are trained on data that has been transformed using different data transforms. Ji and Ma (1997) propose an algorithm specifically for selecting and combining weak classifiers (perceptrons).

Speaker Verification

Speaker verification and object handling in a randomized environment is a pattern recognition problem, and conceptually it is a very simple, since only two classes (patterns) need to be discriminated: target speakers or object and impostors. However, it is not easy to separate the two classes in the feature space. The class distributions are complex and must in practice be modelled using non-parametric techniques. Neural networks are attractive classifiers for problems of this kind: their discriminative training schemes enable them to focus the modelling on the regions of feature space that discriminate speakers or objects well.

A problem with many training or object learning algorithms, however, is that they are unable to guarantee optimal values of the model parameters. In this case structural risk minimization techniques can be used for placing constraints on the models that enhance their ability to generalize. A different approach to the problem with -sub-optimal- parameters is to use ensemble techniques: An ensemble of simple sub-optimal classifiers can be combined to form a new more powerful and robust classifier. Ensemble methods are attractive, because the error rate of the classifier ensemble, in principle, is inversely proportional to the number of ensemble members.

Appendix 2: Object Analysis Exemplified By RBF Based Phoneme Modeling

This example presents a classifier architecture, which can be applied for speaker verification at the event level, however it is to be viewed as example of a method that could be used for any given object data type. The classifier -a RBF network - is itself not ableto identify the events on which it operates and relies on the feature extractionprocess to do this. Figure 1.1 shows the classifier architecture schematically.Hidden Markov Models are used for segmenting the speech signal. A hidden Markov phoneme model, models the phoneme segments as a mixture of normaldistributions, where the means and covariances of the mixtures change at discrete points in time: at the state transitions. The discrete changes should ideally be continuous, but this is difficult to model.

After the phoneme segments have been identified, a new feature extraction is performed (section 1.1), whereby each individual phoneme segment is re-presented by a single vector of features. A feature vector representing an entirephoneme observation will here be referred to as a phoneme vector:

$$(\vec{\phi})$$

When the phoneme vectors have been extracted, the signal no longer contains time information; the fact that the phoneme vectors were measured sequentially over a period of time is irrelevant and contains no information about the speaker
identity. Further[1] the binary form of the voice print is *"created"* on a (true) random utterance model, which makes the binary object entirely unique. What this essentially means is that the vector model becomes a random vector $\vec{n}$ The basic feature representation used here is in terms of filter bank energies
and the phoneme vectors therefore need to be normalised in order
to eliminate the signal gain (section 1.2). Following this they are subjected to
a transformation 1 :

$$\vec{\vartheta} = T(\vec{\phi})$$

before finally being passed as input to the RBFnetwork, which computes the speaker probability:

$$P(I|\vec{\vartheta})$$

Frame Selection

Phoneme durations are a function of phoneme context, overall speech tempo
and other factors; phoneme durations are highly variable. For a static modelling
approach it is necessary to represent the phonemes by a fixed number of features.
This can be done by using the Markov segmentation, where each phoneme is
segmented into a number of sub-segments corresponding to the different emitting Markov states
in the phoneme model. Possible representation schemes are:

1. Compute a new "variable" frame segmentation (and speech parameterisation), where the new frame length is adjusted to be an integer fraction of the total phoneme segment. Computationally this may be relatively expensive, but the advantage is that the entire phoneme segment is used.

2. Select a fixed number ($N$) of the existing frames as representatives of the phoneme segment. Several frame selection strategies may be considered:

a. Linear selection: select $N$ linearly spaced frames from the phoneme segment.
    b. Sub-segment selection: select one frame from each sub-honeme segment. In order to promote homogeneity of representation, the selection should be done consistently; e.g. by always selecting the center frames in each sub-phoneme segment modelled by separate HMM states. This is motivated by the hypothesis that center frames represent the same point in the "moving average" transition which the speech signal undergoes in the phoneme segment.
    c. Maximum Likelihood Selection: select the frame from each sub-phoneme segment that has the highest likelihood.

After the relevant frames have been identified, the corresponding feature vectors are "concatenated" to form one long vector.

Selection schemes 2A and 2B are quite similar; it has here been chosen to use 2B as the frame selection strategy, because in connection with ensemble methods (see section 2.7) variations in the frame selection strategy can be used for generating "different" phoneme models for the same phoneme. Selection scheme 2B can easily be varied by selecting, e.g. the right or left most frames in each sub segment instead of the center frame.

Normalisation

A problem with the filter bank representation of the speech signal is that the signal gain is not well controlled. The signal gain depends on the speakers speaking level, the distance to the microphone, the angle between the mouth and the microphone and the recording equipment. This effectively means that the absolute gain cannot be used for speaker recognition, and must be normalised. As is usual for speech processing, a logarithmic filter bank representation is used here. This means that the logarithm of the energy output from each filter

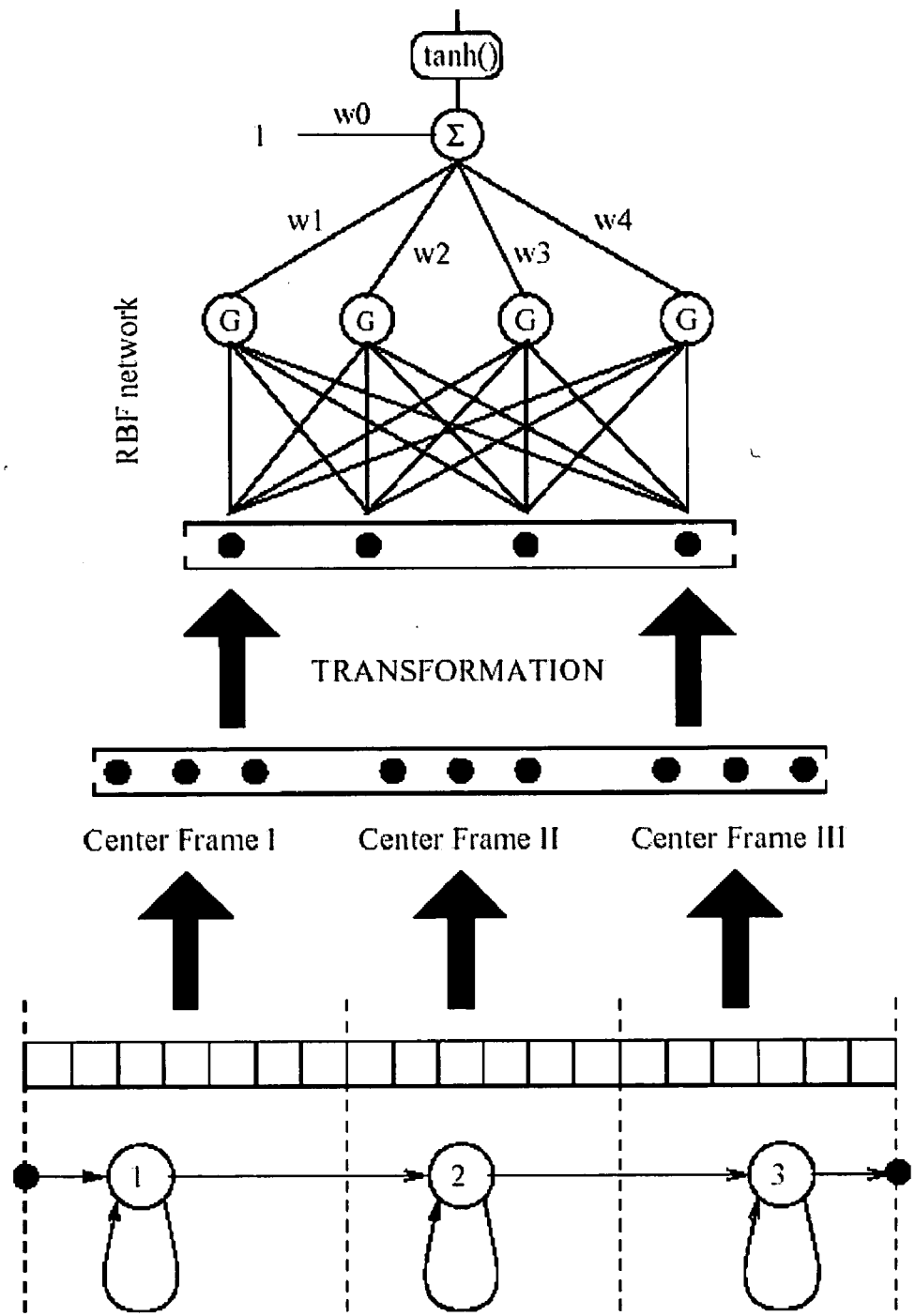
Figur 7: RBF network
bank is used. Energy outputs below one are discarded; they most likely represent noise and due to the singular behaviour[2] of the log function, it is best not to model these energies.

In the logarithmic energy domain, the gain factor becomes an additive bias:

$$\log(S\vec{x}) = \log(S) + \log \vec{x} \quad \longleftarrow \quad \text{Equation: 1}$$

Taking the log() of a vector here means that the log() function is applied to every vector element. Likewise, addition (multiplication) of a scalar and a vector means that the scaler is added (multiplied) to every vector element. Since scale is not relevant, phoneme vectors are assumed to have norm 1:

$$\|\vec{x}\| = \sqrt{\sum_{i=1}^{D} x_i^2} = 1 \quad \longleftarrow \quad \text{Equation: 2}$$

after scaling the norm is $$\|S\vec{x}\| = S\sqrt{\sum_{i=1}^{D} x_i^2} = S \quad \longleftarrow \quad \text{Equation: 3}$$

The gain can therefore be removed by computing the norm of, $$\|S\vec{x}\|$$

and subtracting the logarithmic norm from the filter banks put out:

$$\vec{y} = \log(S\vec{x}) - \log\|S\vec{x}\| = \log \vec{x} \quad \longleftarrow \quad \text{Equation: 4}$$

To further homogenise the data, the vector:

$$\vec{y}$$

is here normalised to have norm 1

If an independent gain factor is associated with each filter bank channel, this results in a bias *vector* being added to the feature vectors. This type of gain can not be eliminated by looking at one particular feature vector, but can instead be compensated for by estimating the average energy output over one utterance.

Bias removal is a useful heuristic in practise, but is actually a non-trivial problem because the bias which is estimated depends on the phonetic content of the utterance (Zhao 1994). This heuristic is not used here.

RBF Training:

The normalised phoneme vectors are subjected to a transformation before being input to a phoneme, $$(\vec{\Phi})$$

and speaker dependent RBF network, which is used for computing the function:

$$g_\Phi(\vec{\phi}) = \tanh\left[S \sum_i w_i u_i(\vec{\phi})\right] \quad \leftarrow \text{Equation: 5}$$

where S is the activation function scale and $$u_i(\vec{\phi}) = \exp\left(-\frac{C_i}{2} \sum_{k=1}^{D} \left(\frac{x_k - \mu_{ik}}{\sigma_{ik}}\right)^2\right) \quad \leftarrow \text{Equation: 6}$$

were D is the dimensionality of the input vectors. The basis function scales, $C_i$, and the variances, $$\vec{\sigma}^2$$

, are constrained by:

$$E = \sum_{p=1}^{N} \frac{1}{2}\left(g(\vec{\phi}_p) - t_p\right)^2 \quad \leftarrow \text{Equation: 7}$$

which ensures that the network will approximate the optimal Bayes Discriminant function:

$$g_{\Phi,\text{Bayes}}(\vec{\phi}) = P(I|\vec{\phi}) - P(\neg I|\vec{\phi})$$

A number of techniques can be used for this (Press et al. 1995; Bishop 1995). In this case, the simplest approach is to use gradient descent, because the gradient here is easy to compute; because of the size of the network the training algorithm converges so fast that conjugate gradient, or Quasi-Newton methods are not required. Gradient descent is an iterative technique, where the parameters in iteration $t$ are updated according to:

$$w_i^{(t)} = w_i^{(t-1)} - \eta(t)\frac{\partial E}{\partial w_i} \quad \longleftarrow \text{Equation: 8}$$

$$\mu_{ik}^{(t)} = \mu_{ik}^{(t-1)} - \eta(t)\frac{\partial E}{\partial \mu_{ik}} \quad \longleftarrow \text{Equation: 9}$$

$$\sigma_{ik}^{(t)} = \sigma_{ik}^{(t-1)} - \eta(t)\frac{\partial E}{\partial \sigma_{ik}} \quad \longleftarrow \text{Equation: 10}$$

$$C_i^{(t)} = C_i^{(t-1)} - \eta(t)\frac{\partial E}{\partial C_i} \quad \longleftarrow \text{Equation: 11}$$

$$S^{(t)} = S^{(t-1)} - \eta(t)\frac{\partial E}{\partial S} \quad \longleftarrow \text{Equation: 12}$$

where $$\sum_{t=1}^{\infty} \eta(t) = \infty \wedge \sum_{t=1}^{\infty} \eta^2(t) < \infty \quad \longleftarrow \text{Equation: 13}$$

and $$\frac{\partial E}{\partial w_i} = \sum_{p=1}^{N} \left(g(\vec{\phi}_p') - t_p\right) \frac{\partial \tanh(\Upsilon(\vec{\phi}_p'))}{\partial \Upsilon(\vec{\phi}_p')} u_i(\vec{\phi}_p') \quad \longleftarrow \text{Equation: 14}$$

$$\frac{\partial E}{\partial \mu_{ik}} = \sum_{p=1}^{N} \left(g(\vec{\phi}_p') - t_p\right) \frac{\partial \tanh(\Upsilon(\vec{\phi}_p'))}{\partial \Upsilon(\vec{\phi}_p')} \left(\frac{x_{kp} - \mu_{ik}}{\sigma_{ik}^2}\right) C_i w_i u_i(\vec{\phi}_p')$$

$$\frac{\partial E}{\partial w_i} = \sum_{p=1}^{N} \left(g(\vec{\phi}_p') - t_p\right) \frac{\partial \tanh(\Upsilon(\vec{\phi}_p'))}{\partial \Upsilon(\vec{\phi}_p')} u_i(\vec{\phi}_p') \quad \longleftarrow \text{Equation: 14}$$

$$\frac{\partial E}{\partial \mu_{ik}} = \sum_{p=1}^{N} \left(g(\vec{\phi}_p') - t_p\right) \frac{\partial \tanh(\Upsilon(\vec{\phi}_p'))}{\partial \Upsilon(\vec{\phi}_p')} \left(\frac{x_{kp} - \mu_{ik}}{\sigma_{ik}^2}\right) C_i w_i u_i(\vec{\phi}_p') \quad \longleftarrow \text{Equation: 15}$$

$$\frac{\partial E}{\partial \sigma_{ik}^2} = \sum_{p=1}^{N}\left(g(\vec{\phi}_p)-t_p\right)\frac{\partial \tanh(\Upsilon(\vec{\phi}_p'))}{\partial \Upsilon(\vec{\phi}_p)}\left(\frac{(x_{kp}-\mu_{ik})^2}{\sigma_{ik}^4}\right)C_i w_i u_i(\vec{\phi}_p) \quad \text{Equation: 16}$$

$$\frac{\partial E}{\partial C_i} = \sum_{p=1}^{N}\left(g(\vec{\phi}_p)-t_p\right)\frac{\partial \tanh(\Upsilon(\vec{\phi}_p'))}{\partial \Upsilon(\vec{\phi}_p)}\left(-\sum_{k=1}^{D}\left[\frac{x_k-\mu_k}{\sigma_i}\right]^2\right)S w_i u_i(\vec{\phi}') \quad \text{Equation: 17}$$

$$\frac{\partial E}{\partial S} = \sum_{p=1}^{N}\left(g(\vec{\phi}_p)-t_p\right)\frac{\partial \tanh(\Upsilon(\vec{\phi}_p'))}{\partial \Upsilon(\vec{\phi}_p)} S \sum_i w_i u_i(\vec{\phi}') \quad \text{Equation: 18}$$

and $$\frac{\partial \tanh(\Upsilon(\vec{\phi}'))}{\partial \Upsilon(\vec{\phi}')} = \frac{4}{\left(\exp(\Upsilon(\vec{\phi}'))+\exp(-\Upsilon(\vec{\phi}'))\right)^2}$$

$$\Upsilon(\vec{\phi}') = \sum_i w_i u_i(\vec{\phi}')$$

The gradients are here shown to be computed as the summation over all the training samples. In order to speed the training process up, this requirement is usually relaxed so that subsets or even individual samples are used as the basis for computing the gradient and updating the parameters. This is reasonable if the training data is "periodic"[1].

The form of the gradient equations are relatively easy to understand. The gradient equations have some common terms and some specific terms.

Common Terms All gradients include the error term, $$(g(\vec{\phi}_p)-t_p)$$

which is zero unless samples are misclassified. Hence, the parameters are not updated if samples are classified correctly. In case of misclassifications, the error term is positive if the target output is negative and negative if the target output is positive. The error term can be given a class dependent weight in order to emphasise one class error rate over the other. For instance, target speaker patterns may be given a higher weight, because the training set contains relatively

---

[1] The period should here be at least two so that a target speaker pattern and an impostor speaker pattern is presented in each period. More generally the –period- could be increased so that each update is based on a set of distinct phoneme observations -for instance corresponding to different phoneme contexts. If this this is not done the learning can tend to be "erratic": the network becomes biased to the most recently presented training token and –forgets- some of the information it has previously been taught.

few target speaker patterns, and hence the classifier is more likely to "over learn" these patterns than it is the abundant impostor speaker patterns.

A second term which is present in all gradients is, $$\frac{\partial \tanh(\Upsilon(\vec{\phi}_p))}{\partial \Upsilon(\vec{\phi}_p)}$$

This term has the effect of preventing parameter changes if, $$|\Upsilon(\vec{\phi}_p)| >> 0$$

i.e. if the parameters, $$\vec{\phi}_p$$

is misclassified by a large margin. Intuitively this is useful if the training set contains outliers, which can not be correctly classified by a small change of the existing parameters.

A third term shared by all gradients is the basis function output, $$u_i(\vec{\phi}')$$

which is a value between zero and one. Hence, the parameters related to a given basis function are not updated unless the sample, $$\vec{\phi}'$$

falls in the hyper elliptical region where, $$u_i(\vec{\phi}')$$

is activated.

Weights

Weights are updated so that for misclassified samples, the weight is increased if the target output is positive and decreased otherwise. In the final classifier, basis functions with a positive weight represent class $l$ and basis functions with a negative weight represent class $\cup l$.

Means

Basis functions representing the target class, $$(\text{sign}(w_i) = \text{sign}(t_p))$$

are moved closer to the misclassified sample and basis functions representing the opposite class are moved away. The step size depends on how "activated" the individual basis functions, $$u_i(\vec{\phi}_p)$$

are, the radius of the basis functions, $$C_i, \vec{\sigma}^2$$

the distance to the misclassified point and as usual the size of the classification error.

Basis Function Scales
The width of the basis functions are controlled by $$C_i$$

For basis functions representing the target class, $$C_i$$

is decreased (the width is increased) so as to include that sample in the sphere of influence of those basis functions. For basis functions representing the opposite class, $$C_i$$

is increased (the width is decreased) so as to exclude the sample from the sphere of influence of these basis functions.

Updating the variances has the same effect of widening the width of the basis functions for the basis functions representing the target class and decreasing the width of the basis functions representing the opposite class.

Variances
The variances, $$\vec{\sigma}^{-2}$$

specify the relative variance of the individual feature elements. The variances do not necessarily correspond to the statistical variances of the individual elements, but rather to the importance of the features. Feature components that have little importance for the classification, may be given a large "variance" so that they have relatively less influence on the activation of the basis function.

Activation Function Scale
The scale of the activation function $S$ is increased for samples on the correct side of the hyper plane implemented by the perceptron, and decreased for samples on the incorrect side. The classification of samples, however, is not improved or changed by updating $S$. Consequently the learning algorithm does not change the value of $S$ for the purpose of minimising the error rate. The activation function scale may, however, be adjusted subsequently in order to improve the RBF model as a probability estimator.

Initialisation

The iterative training algorithm requires initial estimates of the network parameters. The parameters of a RBF network are much easier to interpret than the weights of a MLP, and consequently it is not necessary to initialise using random values. Specifically, a clustering algorithm can be used for computing reasonable basis functions representing respectively the target speaker and the cohort speakers. The weights corresponding to target speaker basis functions can be initialised to $$w_i^{(I)} = \frac{N_i^{(I)}}{\sum_j N_j^{(I)}}$$ ← Equation: 19 where $$N_i^{(I)}$$

is the number of training samples falling in the $i$th target speaker cluster. Likewise the weights corresponding to cohort speaker basis functions can be initialised to:

$$w_i^{(\neg I)} = -\frac{N_i^{(\neg I)}}{\sum_j N_j^{(\neg I)}}$$ ← Equation: 20

The bias weight, $$(w_0)$$

should be initialised to a value less than zero: if the network is presented with a phoneme vector that does not activate any basis functions, the classification should be $\neg I$ (rejection).

The convergence of the training algorithm depends critically on the initialisation of the basis functions, but is in practise insensitive to the weight initialisation. Hence, the weights may simply be initialised to random values (in the range [-1; 1]).

Posterior Probabilities

The RBF networks are trained to minimise the mean square error rate on the training set (equation 1.9). Minimisation of this error criteria causes the RBF network to approximate the optimal (Bayes) discriminant function given by:

$$g_{Bayes}(\vec{\phi}) = P(I|\vec{\phi}) - P(\neg I|\vec{\phi})$$ ← Equation: 21

This important fact has been proved by several authors (Ruck et al. 1990;

Richard and Lippmann 1991; Gish 1990a; Ney 1991).

Even though $g_\Phi(\vec{\phi})$ approximates the optimal discriminant function, it still remains to answer whether or not it, in principle, is capable of exactly implementing this function. The squashing function, tanh(), present in the output, of the RBF network limits the number of mappings from $R^D$ to [-1;1] that can be implemented. For instance, a general function such as $$h(\vec{\phi}) = a\tanh(\Upsilon_1(\vec{\phi})) + b\tanh(\Upsilon_2(\vec{\phi}))$$

can not be implemented by an RBF network of the above type, even if it had an infinite number of basis functions. It would be unfortunate if $g_{Bayes}(\vec{\phi})$ was of this type, because that would mean that it could not, even in principle, be computed.

The underlying function $\Upsilon(\vec{\phi})$ is, however, very flexible. By application of the Stone-Weierstrass Theorem it can in fact be shown that this function can approximate any mapping from $R^D$ to $R^1$ arbitrarily well (Hornik 1989; Cotter 1990). Since tanh(x) is a monotone function which can take on any value in the interval [0;1], it is up to to approximate the function:

$$\Upsilon(\vec{\phi}) = \text{arctanh}\left(P(I|\vec{\phi}) - P(I|\vec{\phi})\right) \quad \longleftarrow \quad \text{Equation: 22}$$

The choice of tanh(x) as activation function is, however, not arbitrary. Consider, for instance, that in a 2-class classification problem, the two classes to be discriminated are characterised by Gaussian probability distributions:

$$p(\vec{\phi}|I) = \frac{1}{(2\pi)^{D/2}|U_I|^{1/2}} \exp\left(-\frac{1}{2}(\vec{\phi} - \vec{\mu}_I)^T U_I^{-1}(\vec{\phi} - \vec{\mu}_I)\right) \quad \text{Equation: 23}$$

$$p(\vec{\phi}|\neg I) = \frac{1}{(2\pi)^{D/2}|U_{\neg I}|^{1/2}} \exp\left(-\frac{1}{2}(\vec{\phi} - \vec{\mu}_{\neg I})^T U_{\neg I}^{-1}(\vec{\phi} - \vec{\mu}_{\neg I})\right) \quad \text{Equation: 24}$$

According to Bayes rule, the a posteriori probability of class $I$ is given by:

$$P(I|\vec{\phi'}) = \frac{p(\vec{\phi'}|I)P(I)}{p(\vec{\phi'}|I)P(I) + p(\vec{\phi'}|\neg I)P(\neg I)}$$

$$= \frac{1}{1 + \frac{P(\neg I)p(\vec{\phi'}|\neg I)}{P(I)p(\vec{\phi'}|I)}}$$

$$= \frac{1}{1 + \exp(-2a)} \quad \longleftarrow \text{Equation: 25}$$

$$= \frac{1}{2}\tanh(a) + \frac{1}{2}$$

where $$-2a = \ln\left(\frac{P(I)|\mathbf{U}_I|^{1/2}}{P(\neg I)|\mathbf{U}_{\neg I}|^{1/2}}\right)$$
$$+ 0.5(\vec{\phi} - \vec{\mu}_I)^{\mathrm{T}}\mathbf{U}_I^{-1}(\vec{\phi} - \vec{\mu}_I)$$
$$- 0.5(\vec{\phi} - \vec{\mu}_{\neg I})^{\mathrm{T}}\mathbf{U}_{\neg I}^{-1}(\vec{\phi} - \vec{\mu}_{\neg I}) \quad \longleftarrow \text{Equation: 26}$$

This is exactly the form we would like it to have, since if the RBF network approximates the discriminant function:

$$g(\vec{\phi}) = P(I|\vec{\phi}) - P(\neg I|\vec{\phi}) \quad \longleftarrow \text{Equation: 27}$$

then we have (using 2.5):

$$P(I|\vec{\phi}) = \frac{1}{2}g(\vec{\phi}) + \frac{1}{2} \quad \longleftarrow \text{Equation: 28}$$

$$P(\neg I|\vec{\phi}) = -\frac{1}{2}g(\vec{\phi}) + \frac{1}{2} \quad \longleftarrow \text{Equation: 29}$$

where $$g(\vec{\phi}) = \tanh(\Upsilon(\vec{\phi}))$$ ← Equation: 30

Adjusting the Activation Function Scale

As probability estimates, equations 33 and 34, are somewhat crude. If a steep activation function (large activation function scale S) is used, the output is essentially a binary variable. The *activation function scale (S)* may be adjusted by first estimating the empirical activation function from - ideally - an independent test set:

$$G(\vec{\phi}) = \frac{1}{N_I}\sum_{i=1}^{N_I}\Theta\left(\Upsilon(\vec{\phi}) - \Upsilon(\vec{\phi}_i)\right) - \left[1 - \frac{1}{N_{\neg I}}\sum_{j=1}^{N_{\neg I}}\Theta\left(\Upsilon(\vec{\phi}) - \Upsilon(\vec{\phi}_j)\right)\right]$$

$$= \frac{1}{N_I}\sum_{i=1}^{N_I}\Theta\left(\Upsilon(\vec{\phi}) - \Upsilon(\vec{\phi}_i)\right) - \frac{1}{N_{\neg I}}\sum_{j=1}^{N_{\neg I}}\Theta\left(\Upsilon(\vec{\phi}_j) - \Upsilon(\vec{\phi})\right)$$

Equation: 31 where $\Theta(x)$ is a step function:

$$\Theta(x) = \begin{cases} 1 & \text{if } x \geq 0 \\ 0 & \text{otherwise} \end{cases}$$ ← Equation: 32 and where $\vec{\phi}_{1,I},\ldots,\vec{\phi}_{N_I,I}$ and $\vec{\phi}_{1,\neg I},\ldots,\vec{\phi}_{N_{\neg I},\neg I}$ are the phoneme vectors in the independent test set. Now the value, $G(\Upsilon_{P_I})$, for which $P(I) = P_I$ is identified (i.e. $G(\Upsilon_{P_I}) = 2P(I) - 1$)) and the activation function scale adjusted so that $$\tanh(S''\Upsilon_{P_I}) = P_I$$ ← Equation: 33

This is done by choosing:

$$S'' = \frac{\operatorname{arctanh}(P_I)}{\Upsilon_{P_I}}$$ ← Equation: 34 where $$\operatorname{arctanh}(x) = \frac{1}{2}\ln\left(\frac{1+x}{1-x}\right)$$

Equation: 35

An alternative, and potentially more accurate approach is to simply replace tanh() by the empirical activation function (equation 36).

An alternative, and potentially more accurate approach is to simply replace tanh() by the empirical activation function (equation 36).

Adjusting the Bias

Training a RBF network from a limited training set is diffcult. The problem is usually not the impostor part of the training set, but rather the target speaker part. This, of course, can in itself make it diffcult to train a speaker model, but in particular it makes it diffcult to adjust the model so that it achieves the desired balance between the TA and IR errors. The balance can to some extent be controlled by various training parameters, eg. by scaling the error term $(g(\vec{\phi}_p) - t_p)$ differently for target speaker samples and cohort speaker samples, by presenting target/cohort patterns with different frequencies, or by the way the models are constrained using weight/radii penalties. These means are, however, fairly crude, and a more accurate approach is to adjusting the bias $(w_0)$. of the RBF models. This can be done by estimating the mean and variance of $\Upsilon(\vec{\phi})$ given the target speaker, $\Upsilon(\vec{\phi}|I)$, and given the impostor speakers, $\Upsilon(\vec{\phi}|\neg I)$. Assuming a Gaussian distribution of these two variables, the bias is reduced $(b_{new} = b_{old} - \Delta b)$, so that, $$\frac{\mathcal{N}\left(\Upsilon(\vec{\phi}); \overline{\Upsilon(\vec{\phi}|I)}, \operatorname{var}(\Upsilon(\vec{\phi}|I))\right)}{\mathcal{N}\left(\Upsilon(\vec{\phi}|\neg I); \overline{\Upsilon(\vec{\phi}|\neg I)}, \operatorname{var}(\Upsilon(\vec{\phi}|\neg I))\right)} = B$$

Equation: 36

This solution can be found by determining the roots of:

Equation: 37

$$\left(\frac{1}{\sigma_2^2} - \frac{1}{\sigma_1^2}\right)x^2 + \left(\frac{2\mu_1}{\sigma_1^2} - \frac{2\mu_2}{\sigma_2^2}\right)x + \frac{\mu_2^2}{\sigma_2^2} - \frac{\mu_1^2}{\sigma_1^2} - 2\ln\left(\frac{\sigma_1}{\sigma_2}\right) - \ln B = 0$$

where the following shorthand was used:

Equation: 38

$$x = \Upsilon(\vec{\phi})$$

$$\mu_1 = \overline{\Upsilon(\vec{\phi}|I)} \quad \longleftarrow \text{Equation: 39}$$

$$\mu_2 = \text{var}(\Upsilon(\vec{\phi}|I)) \quad \longleftarrow \text{Equation: 40}$$

For B = 1 this is the same equation as equation 1.26, (the example on object classification. The solution we are interested in is the one between $\Upsilon(\vec{\phi}|I)$ and $\Upsilon(\vec{\phi}|\neg I)$.

An alternative - if the Gaussian assumption is poor - is to use the empirical activation function (equation x.36). If a different balance, B, of errors is desired, the bias can be adjusted according to:

$$\frac{G(\Upsilon(\vec{\phi})) + 1}{-G(\Upsilon(\vec{\phi})) + 1} = B \quad \longleftarrow \text{Equation: 41}$$

$$\Updownarrow \quad \longleftarrow \text{Equation: 42}$$

$$G(\Upsilon(\vec{\phi})) = \frac{B-1}{B+1} \quad \longleftarrow \text{Equation: 43}$$

Hence, to adjust the odds ratio to have balance B, the solution, $\Delta b = \Upsilon(\vec{\phi})$, to equation 48 is determined and subtracted from the bias:

$$w_{0,\text{new}} = w_{0,\text{old}} - \Delta b$$

For $B = 1$ the equal error rate is approximated, for B < 1 the number of TA errors is minimised at the expense of the IR errors, and for B > 1 the IR errors are minimised at the expense of the TA errors.

Figure 8 shows an example where the class conditional empirical distribution functions, $$P(\Upsilon(\vec{\phi}|I))$$

and $$P(\Upsilon(\vec{\phi}|\neg I)),$$

and the empirical activation function, $$G(\Upsilon(\vec{\phi}))$$

for a set of speaker models. The figure shows the functions both

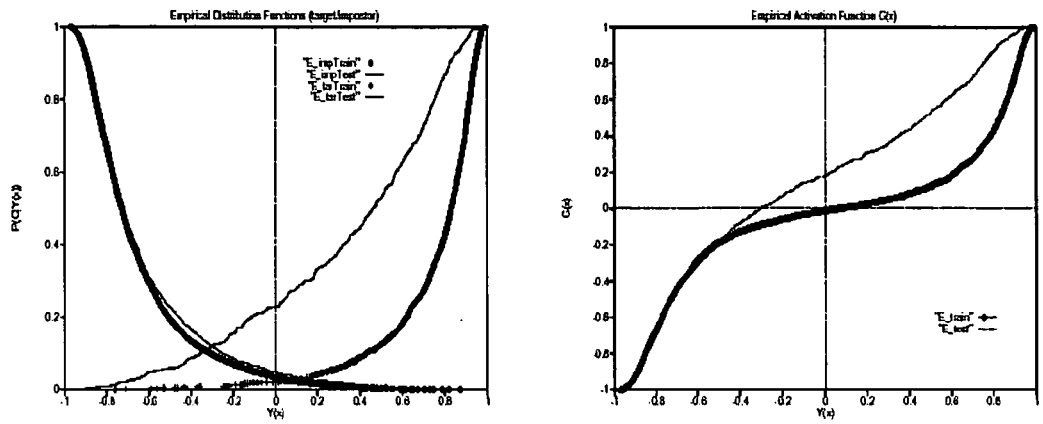

Figur 8 Empirical distribution functions

For the training data, respectively 1622 and 6488 local target speaker and impostor speaker decisions were used. For the test data, respectively 394 and 1576 local decisions were used.

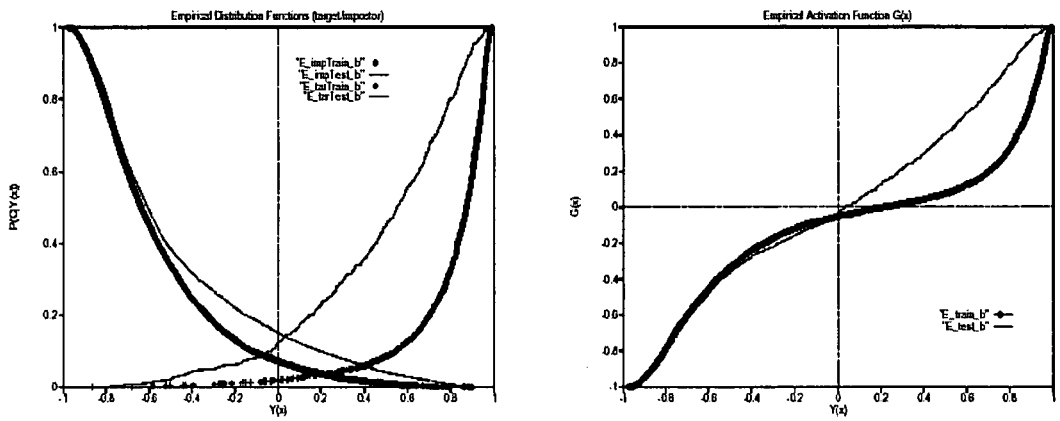

Figur 9 Empirical distribution functions after bias compensation for the training data and for the test data. For the training data the empirical activation function is approximately zero for $\Upsilon(\vec{\phi}) = 0$, but not for the test data (the speaker models are "overtrained"). Figure 9 shows the same functions as Figure 8, but after bias compensation.

In summary, a phoneme based speaker model has been described. The model uses HMM's as "feature extractors" that represent phoneme observations as fixed vectors (phoneme vectors) of spectral feature elements; this part of the model is speaker
independent. The phoneme vectors are transformed and finally passed as input
to a phoneme dependent RBF network, trained to estimate the speaker probability from the phoneme vectors. The speaker probability can be used directly
for producing a (local) speaker verification decision, or it can be combined with other speaker probabilities estimated from other phoneme observations in order to produce a more robust decision. The input vector (phoneme) is only stated to exemplify what an object based i.e. verification could be. Any other type of biometric vectors could be used with training filters accordingly.

Appendix 3: Object Based Decision Making Exemplified By Speaker Verification

Object verification – or in this case speaker verification is a binary decision problem, and can therefore in the end be reduced to computing a score and verifying identity claims by determining whether or not the score is greater or less than a given threshold, $t$:

$$\text{Decide} \begin{cases} \text{accept} & \text{if score} > t \\ \text{reject} & \text{otherwise} \end{cases}$$

equation: 1

When computing this score or i.e. an object value, each phoneme segment in the speech signal makes a contribution (even when phonemes are not explicitly modelled). In a conventional text independent speaker verification algorithm, the contribution of the different phonemes to the overall score (e.g. utterance likelihood) is unknown; the overall score depends on the particular frequency with which the phonemes are represented in the test utterance, and on the duration of each phoneme segment.

This is clearly not optimal, since no regard is taken to the extent that local scores contributed by individual phoneme segments express speaker identity and the extent to which different phonemes express the same information about the speaker; e.g. a nasal and a vowel presumably represent information which is largely complimentary whereas two back vowels, say, represent highly correlated information about the speaker.

The algorithm described here has two parts: first phoneme segments are identified and the speaker identity modelled for each phoneme segment independently. The result of this is a number of local scores -one for each different phoneme in an utterance - which subsequently must be combined in order to produce a global verification decision or a class of object data.

Combining Scores

An RBF networks are trained to approximate the discriminant function:

$$g_\Phi(\vec{\phi'}) = P(I|\vec{\phi'}) - P(\neg I|\vec{\phi'})$$

equation: 2 where $$\vec{\phi'}$$

is a phoneme observation. Since:

$$P(I|\vec{\phi'}) + P(\neg I|\vec{\phi'}) = 1$$

equation: 3 we have $$\begin{aligned} P(I|\vec{\phi'}) &= \frac{1}{2}g_\Phi(\vec{\phi'}) + \frac{1}{2} \\ P(\neg I|\vec{\phi'}) &= -\frac{1}{2}g_\Phi(\vec{\phi'}) + \frac{1}{2} \end{aligned}$$

equation: 4 & equation: 5 which can be used for implementing a decision rule for a single phoneme observation. When several independent phoneme observations are available, more robust decisions can be made by combining the local scores into a global score. Two basically different approaches can be followed: ensemble combination and probability combination.

Ensemble Combination

One approach to combining local verification scores is simply to "average" the local scores:

$$\text{score} = \frac{1}{\sum_{i=1}^{\#\Phi}\#\Phi_i}\sum_{i=1}^{\#\Phi}\sum_{j=1}^{\#\Phi_i}g_{\Phi_i}(\vec{\phi}_{ij})$$

equation: 6 where $$\#\Phi$$

is the number of different phonemes in the alphabet, $$\#\Phi_i$$

the number of observations of phoneme $\Phi_i$ and $\vec{\phi}_{ij}$ the $j$'th observation (phoneme vector)

of phoneme $\Phi_i$. It is a characteristic of this scoring rule that for an increasing number of observations, the score will converge to a value in the range [-1; 1]; The magnitude is not directly affected by the number of observations.

Probability Combination

An alternative to ensemble combination is to exploit the fact that the networks compute a posteriori probabilities. When several independent observations, $\Phi^{(\tau)} = \vec{\phi}_1, \ldots, \vec{\phi}_\tau$ are made, the confidence of the classification is expected to rise. This can be expressed by defining the *odds ratio*:

$$\mathcal{R}(\Phi^{(\tau)}) = \prod_{i=1}^{\tau} \frac{P(I|\vec{\phi}_i')}{P(\neg I|\vec{\phi}_i')} = \prod_{i=1}^{\tau} \frac{g_\Phi(\vec{\phi}_i') + 1}{-g_\Phi(\vec{\phi}_i') + 1}$$

equation: 7 since $$P(I|\Phi^{(\tau)}) + P(\neg I|\Phi^{(\tau)}) = 1$$

equation: 8 it follows that $$P(I|\Phi^{(\tau)}) = \frac{1}{1 + \mathcal{R}^{-1}(\Phi^\tau)}$$

$$P(\neg I|\Phi^{(\tau)}) = \frac{1}{1 + \mathcal{R}(\Phi^\tau)}$$

equation: 9 & equation: 10

Hence, an alternative scoring strategy is to use $$\text{score} = P(I|\Phi^{(\tau)}) - P(\neg I|\Phi^{(\tau)})$$

equation: 11

It is a characteristic of this scoring rule that in practise it will converge to either -1 or +1 when more phoneme observations are added.

The difference between equation 6 and 11 is mainly the assumption about the independence of the observations. Suppose for a given phoneme vector, $(\vec{\Phi'})$ the speaker probability is estimated to, say, $P(I|\vec{\Phi'}) = 0.7$ If equation 11 (probability combination) is used we assume that the probability is only 0.7 and not 1.0, because the observation $(\vec{\Phi'})$ has been affected by "random" noise, whereas if equation 1.6 (ensemble combination) is used, we assume that a certain proportion of the impostor population is capable of producing phoneme vectors like $(\vec{\Phi'})$.

This distinction is important, because noise can be "averaged" (derived) away, whereas obtaining more observations (of the same event) cannot be expected to improve the probability estimate, if the same impostor speakers are fundamentally able to produce the same phoneme vectors as the target speaker.

A problem with both equation 1.6 and 1.11 is, however, that the overall score will be dominated by the most frequently occurring phoneme. This is unreasonable to the extent that different phonemes can be regarded as different sources of speaker information (Olsen 1997b; Olsen 1996b).

In practise it is, however, possible to use equation 1.6 and 1.11 with good results, because "pathological" sentences that are dominated by a specific class of phonemes are not frequently occurring. Any reasonable sentence will typically have a broad selection of phonemes represented, but it should still not be left to chance how to weight the evidence provided by each phoneme observation.

Committee Machines

Each phoneme model can be regarded as a speaker verification expert given a specific type of information: observations of a specific phoneme. Since individual experts are assumed to model different "aspects" of the speaker, it makes sense to limit the influence each expert can have on the global score. One approach to this is to use either equation 1.6 or 1.11 for combining the local scores from the same expert into a phoneme level local score. A local binary decision - with an empirically known probability of being correct - can then be made for each phoneme represented in the test utterance:

$$D_L(\Phi_i) = \begin{cases} 1 & \text{if } P(I|\Phi_i) \geq 0.5 \\ -1 & \text{otherwise} \end{cases}$$

equation: 12

Following this approach, the simplest way of combining local decisions into a global decision, is by making a "majority" vote:

$$\text{score} = \sum_{i=1}^{\#\Phi} D_L(\Phi_i)$$

equation: 13

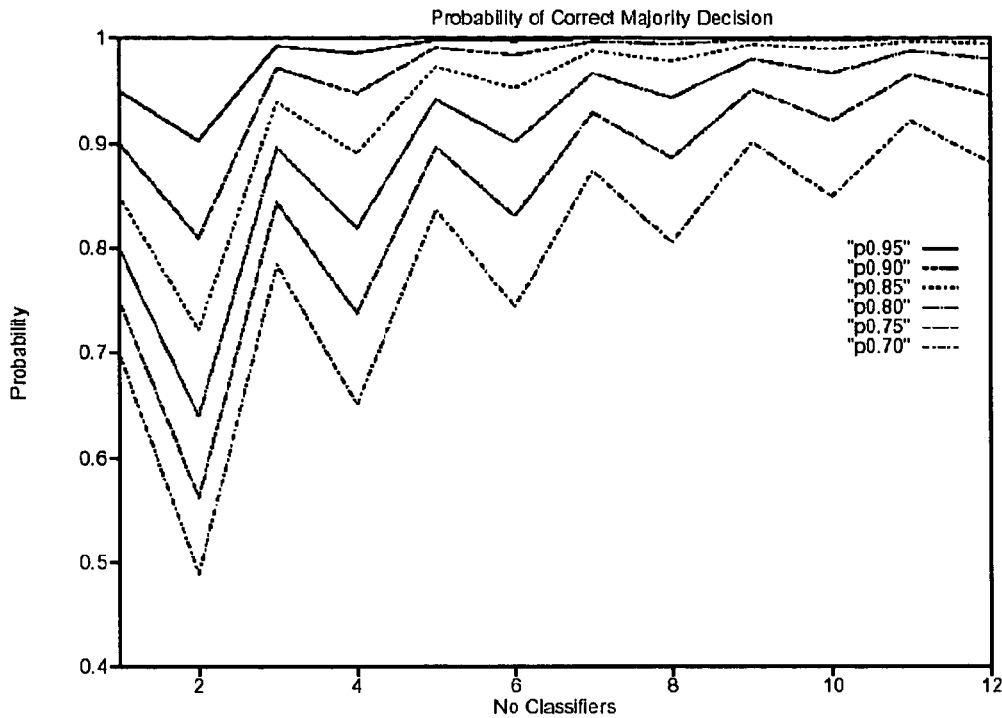

Figure: 1 The probability of a committee machine making a correct decision as a function of the number of committee members.

where $\#\Phi$ is the number of different phonemes represented in the test utterance. This type of global classifier is called a committee machine (Nilsson 1965; Mazurov et al. 1987).

If the individual decisions are independent and all have the same probability, $P$, of making a correct decision, the probability of the committee machine making a correct decision is given by:

$$P_{\text{comm}}(N) = \sum_{k=\lfloor N/2 \rfloor+1}^{N} \binom{N}{k} P^k (1-P)^{N-k}$$

equation: 14 where $N$ is the number of committee members. The probability function $P_{\text{comm}}(N)$ is shown in figure 1. The graph is "rippled" because for even $N$, a tie $(k = N/2)$ is counted as an error even though the error probability is actually only 50%. As long as the errors are uncorrelated, the performance of the committee machine can be improved by adding more members. Provided $P > 0.5$, the committee machine always performs better than the individual committee members.

This is not necessarily the case if the individual classifiers have different classification accuracies, but the model is nevertheless remarkably robust in this case. Assume, for instance, that three classifiers with individual accuracies $P1$; $P2$ and $P3$ are to be combined. The committee machine performs at least as well as the most accurate of the individual classifiers (say $P1$), provided:

$$P_1 < P_1P_2P_3 + P_1P_2(1-P_3) + P_1(1-P_2)P_3 + (1-P_1)P_2P_3$$

$$P_1 < \frac{P_2P_3}{1+2P_2P_3-P_2-P_3}$$

equation: 15 & equation: 16

For instance if *P2* = *P3* = 0.9, then *P1* must have an accuracy higher than 0.99 if it alone is supposed to be more accurate than the combination of *P1*, *P2* and *P3*.

Expert Weighting

Votes from different experts are not equally important; the different phoneme dependent speaker models have different accuracies. The basic voting scheme can therefore be improved by weighting the individual votes differently. A "static" approach to this would be to simply weight each vote by the expected equal accuracy rate, $A_{EER}$ = 1 - EER, of the corresponding classifier:

$$D_L(\Phi_i) = \begin{cases} A_{EER} & \text{if } P(I|\Phi_i) \geq 0.5 \\ -A_{EER} & \text{otherwise} \end{cases}$$

equation: 17

The corresponding "dynamic" weighting scheme would be to weight each vote by the differential speaker probability computed by the classifier:

$$D_L(\Phi_i) = P(I|\Phi_i) - P(\neg I|\Phi_i)$$

equation: 18

Even if the probability estimate $P(I|\Phi_i)$ is somewhat crude, the advantage here is that the weight is dependent on the actual phoneme observations.

Expert Grouping

Phonemes can be divided into different groups, e.g. nasals, fricatives, plosives, vowels etc. Two experts specialising on, say, two nasal phonemes are intuitively likely to show correlations in the voting domain, whereas two experts specialising of different phonemes, say, respectively a nasal and a fricative phoneme, are less likely to show correlations. It may therefore be reasonable to divide the experts into groups representing different phoneme classes. A speaker verification score, $D_{C;L}$ can then be computed for each phoneme group*(C)*:

$$D_{C,L}(\Phi_i) = \begin{cases} 1 & \text{if } \sum_{i=1}^{\#C} P(I|\Phi_i) \geq t_C \\ -1 & \text{otherwise} \end{cases}$$

equation: 19 where #C denotes the number of phonemes in group C. Equation 19 effectively defines a new set of experts. The global verification decision can then be made as before by combining the votes from the group experts, rather than from the "phoneme" experts. In principle this decision strategy can be extended, to include several layers of experts, where the experts at the lowest level represent different individual phonemes and experts at the upper levels represent broader sound classes (nasals, vowels, fricatives, etc.).

Modelling Expert Votes

An attractive way of combining N expert votes is to train a network (RBF or MLP) to learn the empirically best combination strategy (Wolpert 1992). This way both the accuracy of the individual experts and the correlation between different expert votes can be taken into account directly. When this approach is followed, all that has taken place up to the point where the expert votes must be combined is essentially regarded as feature extraction; the feature vectors are here decision vectors:

$$\vec{D}_L(\vec{\Phi}^{(r)}) = \left(D_L(\Phi_1^{(r_1)}), \ldots, D_L(\Phi_N^{(r_N)})\right)^T$$

equation: 20

There are, however, two problems with this approach.

- The first problem is that the "super" network, which combines local expert votes, can not be trained on decision vectors produced simply by evaluating the local experts on the data on which they were trained -the experts are likely to be over trained and their - training data votes- are therefore too "optimistic". Hence, either additional training data must be provided or alternatively the super network must be speaker independent.

- The second problem is that here the local expert votes represent different phonemes and the phonetic make of different test utterances can vary a lot, and this makes it impossible to train a network that optimally combines the votes resulting from particular test utterances.

Given a limited number of training utterances, it is of course possible to simulate a much larger number of decision vectors by combining relevant expert decisions extracted from different training utterances. However, the number of possible phoneme combinations that can occur is still very large. Suppose, for instance, that in any given utterance, exactly 15 different phonemes out of 30 possible will be represented. Then up to $$\begin{pmatrix} 30 \\ 15 \end{pmatrix} = \frac{30!}{15!(30-15)!} \approx 1.6 \cdot 10^8$$

different vote combinations would have to be considered. This calculation ignores that votes may be based on more than one phoneme observation – and hence be more reliable - and that the actual number of different phonemes may be more or may be less than 15.

A possible solution to this dilemma is to make the super classifier utterance specific, i.e. to postpone the training until the moment it is decided which prompting text to issue next - or even more convenient: until a phoneme segmentation has been computed for the actual speech utterance. The super classifier may in this case be a simple perceptron, and the training is therefore not in itself a serious Computational problem. Figure 2 shows an example of this.

Alternatively - in order to avoid the iterative perceptron training algorithm - Fisher's linear discriminant function can be used for learning the individual expert weights.

In summary, this example discusses how local speaker probabilities estimated from individual phoneme observations (which essentially is an object can be combined in order to produce global speaker verification decisions. Successful combination schemes must take into account that on the one hand some specific phonemes are more informative than others, and on the other hand that different phonemes to some extent provide complimentary information about a speaker.

The main difficulty faced when deciding how to weight each local decision is that -unless the prompting texts given to speakers are seriously constrained - the total number of different phoneme combinations that can occur in test utterances is extremely large. Hence, these weights can not easily be computed a priori.

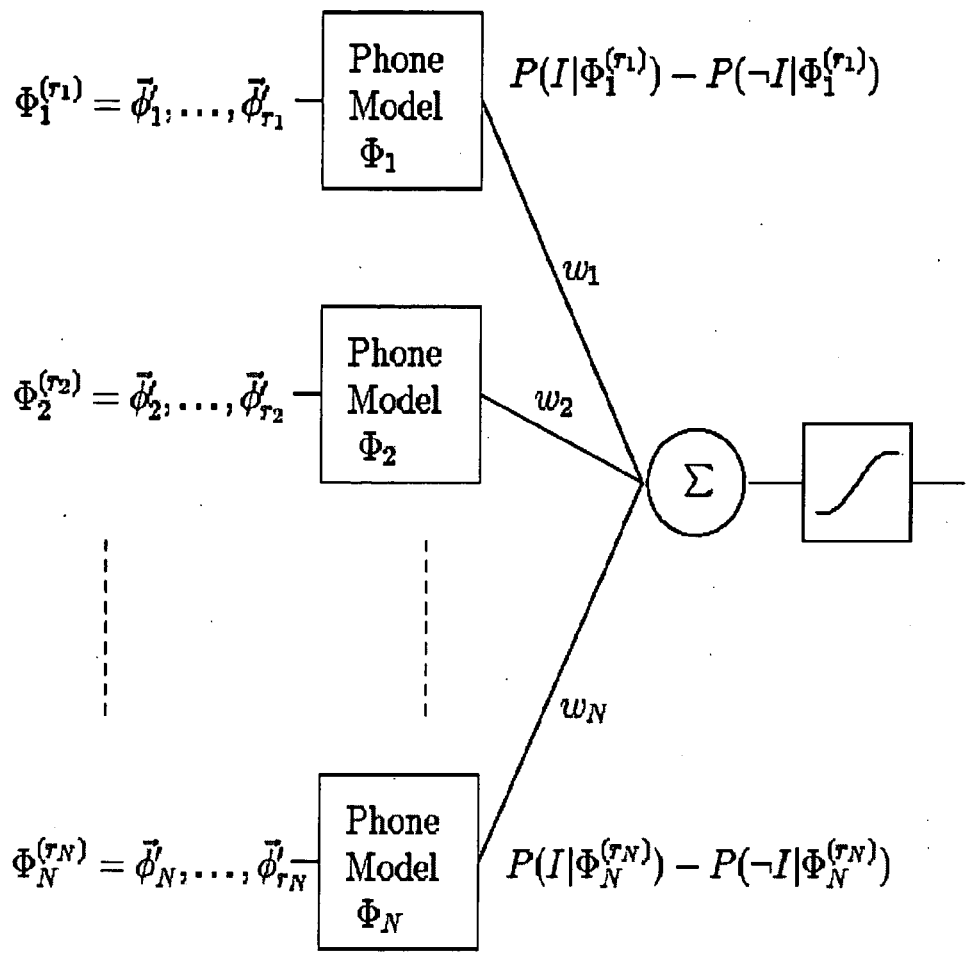
Figure: 2 A super classifier
The classifier takes the differential speaker probabilities from the individual phoneme models as input and combines them into a global score:
$$P(I|\Phi_1^{(r_1)},\ldots,\Phi_N^{(r_N)}) - P(\neg I|\Phi_1^{(r_1)},\ldots,\Phi_N^{(r_N)})$$

We claim:

1. A system of secure network connectivity between one or more users and at least one network server, comprising:
   at least one intelligent data carrier, issued to one user, wherein said intelligent data carrier comprises at least (i) one memory, adapted to store data, (ii) one input-output apparatus, adapted to input and output data, and (iii) one processor, adapted to process the data stored in said memory, wherein said intelligent data carrier is capable of connecting to a host computer device thereby transmitting data via said input-output apparatus over the network, and wherein said intelligent data carrier is adapted to establish a network identity for the user through an authentication and encryption scheme; and
   a dynamic datagram switch for dynamic allocation and swapping of datagrams for a multiplicity of applications in service to the one or more users.

2. The system of claim 1, wherein said intelligent data carrier is mobile.

3. The system of claim 1, wherein said intelligent data carrier is implemented with one of USB key, Compact Flash, Smart Media, Compact Disk, DVD, PDA, firewire device, and token device.

4. The system of claim 1, wherein said multiplicity of applications comprises at least one of window-based remote terminal server applications, applications on 3270/5250 terminal emulators for mainframe, directly embedded applications, and multimedia applications, wherein the directly embedded applications comprise at least one of database applications, data analysis tools, Customer Relation Management tools, and Enterprise Resource Planning packages.

5. The system of claim 1, wherein said dynamic datagram switch comprises a datagram schema and a parser, wherein said datagram schema comprises two or more datagrams, belonging to one or more datagram types, wherein each datagram type comprises a plurality of functions, and wherein said parser is adapted to parse the one or more datagram types.

6. The system of claim 5, wherein said datagram schema comprises at least one major datagram type and within said one major datagram type, at least one minor datagram type.

7. The system of claim 6, wherein the parser is adapted to parse a matrix of datagram types, said matrix comprising a first multiplicity of major datagram types and in each major datagram type of said first multiplicity, a second multiplicity of minor datagram types.

8. The system of claim 7, wherein the major datagram type is selected from the group consisting of (i) a server messages and connection control datagram, adapted to authenticate and control user connections, (ii) a content datagram, adapted to transmit the content data, (iii) a broadcast datagram, adapted to manage point-to-point, point-to-multipoint, and multipoint-to-multipoint data transmission, (iv) a connection proxy datagram, adapted to pass proxy data between the network server and the intelligent data carrier, (v) a instant message type, adapted to transmit messages in real-time, (vi) a large content transfer datagram, adapted to transfer oversized data and media files, (vii) a user directory datagram, adapted to search for network users, and (viii) a remote management datagram, adapted to remotely control network users.

9. The system of claim 8, wherein the server messages and connection control datagram comprises minor datagram types selected from the group consisting of: (i) a authentication request datagram, adapted to initiate an authentication request, (ii) a authentication reply datagram, adapted to send a response upon a request of authentication, and (iii) a authentication result datagram, adapted to send the result of an authentication session.

10. The system of claim 9, wherein the content datagram comprises minor datagram types selected from the group consisting of: (i) a normal content datagram, adapted to transmit the content data, (ii) a remote logging datagram, adapted to communicate with the network server and establish a login session, (iii) a remote data collector datagram, adapted to transmit data from a remote connection, (iv) a content approval request datagram, adapted to request verification of the content data transmitted, and (v) a content approval reply datagram, adapted to respond to a request of verification of the content data transmitted.

11. The system of claim 8, wherein the connection proxy datagram comprises minor datagram types selected from the group consisting of: (i) proxy data to server, adapted to pass proxy data to the network server from the intelligent data carrier, and (ii) proxy data from server, adapted to pass the proxy data from the network server to the intelligent data carrier.

12. The system of claim 8, wherein the instant message type comprises minor datagram types selected from the group consisting of: (i) a file transmission type, (ii) a audio-video transmission type, (iii) a instant mail message type, and (iv) a remote data collection type.

13. The system of claim 1, wherein each datagram in the datagram schema has a generic layout comprising:
    (A) header fields for (i) one or more major datagram types, (ii) one or more minor datagram type, (ii) the datagram length, and (iii) a datagram checksum, and
    (B) a datagram payload for carrying data in transmission.

14. The system of claim 13, wherein the generic layout comprises one or more additional header fields.

15. The system of claim 13, wherein the generic layout follows a TCP header.

16. The system of claim 1, wherein the intelligent data carrier further comprises a radar connector, wherein the radar connector interfaces the network and is adapted to monitor and control network connections.

17. The system of claim 16, wherein the network server further comprises a radar connector adapted to monitor and control network connections, wherein the radar connector of the network server is connected to the radar connector of the intelligent data carrier over the network.

18. The system of claim 17, wherein said radar connector is further adapted to detect lost connections and initialize contact to the network server thereby reestablishing connections.

19. The system of claim 1, further comprising an injector, adapted to connect an existing networks to the network server and transmit data between said existing network and the intelligent data carrier via the network server, wherein said existing network is wired or wireless.

20. The system of claim 19, wherein the injector further comprises a radar connector, interfacing the network and adapted to monitor and control network connections.

21. A client-server communication system, comprising:
    at least one server, comprising a dynamic datagram switch for dynamic allocation and swapping of datagrams for a multiplicity of network applications; and
    at least one client, wherein the client is an intelligent data carrier, comprising at least (i) one memory, adapted to store data, (ii) one input-output apparatus, adapted to input and output data, and (iii) one processor, adapted to process the data stored in said memory, wherein said intelligent data carrier is capable of connecting to a host computer device thereby transmitting data via said input-output apparatus over the network, and wherein said intelligent data carrier is adapted to establish a network user identity through an authentication and encryption scheme for secure data transmission between said server and said client.

22. The client-server communication system of claim 21, wherein said intelligent data carrier is implemented with one of USB key, Compact Flash, Smart Media, Compact Disk, DVD, PDA, firewire device, and token device.

23. The client-server communication system of claim 21, wherein said dynamic datagram switch comprises a datagram schema and a parser, wherein said datagram schema comprises two or more datagrams, belonging to one or more datagram types, wherein each datagram type comprises a plurality of functions, and wherein said parser is adapted to parse the one or more datagram types.

24. The client-server communication system of claim 21, wherein said datagram schema comprises at least one major datagram type and within said one major datagram type, at least one minor datagram type.

25. The client-server communication system of claim 21, wherein the parser is adapted to parse a matrix of datagram types, said matrix comprising a first multiplicity of major datagram types and in each major datagram type of said first multiplicity, a second multiplicity of minor datagram types.

26. The client-server communication system of claim 21, wherein each datagram in the datagram schema has a generic layout comprising:
(A) header fields for (i) one or more major datagram types, (ii) one or more minor datagram type, (ii) the datagram length, and (iii) a datagram checksum, and
(B) a datagram payload for carrying data in transmission.

27. The client-server communication system of claim 21, further comprising an injector, adapted to connect an existing network to the server and transmit data between the existing networks and the client via the server, wherein the existing network is wired or wireless.

28. The client-server communication system of claim 27, wherein the server, client, and injector each comprises a radar connector, wherein the radar connector interfaces the network and is adapted to monitor and control network connections, wherein the radar connector of the client is connected to the radar connector of the server over the network, and wherein the radar connector of the injector is connected to the radar connector of the server over the network.

29. The client-server communication system of claim 28, wherein the radar connector of the client is further adapted to detect lost connections and initialize contact to the server thereby reestablishing connections.

30. The client-server communication system of claim 21, wherein the server further comprises an encrypted virtual file system for dedicated data storage for the client.

31. An intelligent data carrier, comprising at least (i) one memory, adapted to store data, (ii) one input-output apparatus, adapted to input and output data, and (iii) one processor, adapted to process the data stored in said memory, wherein the intelligent data carrier is capable of connecting to a host computer device on a network thereby transmitting data via said input-output apparatus over the network, wherein the data transmission is through dynamically-switched datagrams in a datagram schema, wherein the intelligent data carrier is adapted to establish a network user identity through an authentication and encryption scheme for secure network data transmission.

32. The intelligent data carrier of claim 31, said intelligent data carrier is implemented with one of USB keys, Compact Flash, Smart Media, Compact Disks, DVDs, PDAs, firewire devices, and token devices.

33. The intelligent data carrier of claim 31, wherein the dynamically-switched datagrams belong to one or more datagram types and are adapted to carry (i) content data for network transmission and (ii) other information for managing and controlling network connections and supporting network applications, wherein each datagram type comprises a plurality of functions.

34. The intelligent data carrier of claim 33, wherein the datagram types comprise at least one major datagram type and within the major datagram type, at least one minor datagram type.

35. The intelligent data carrier of claim 34, wherein the datagrams conform to a generic layout, said generic layout comprising:
(A) header fields for (i) one or more major datagram types, (ii) one or more minor datagram type, (ii) the datagram length, and (iii) a datagram checksum, and
(B) a datagram payload for carrying data in transmission.

36. A method for secure network communication, comprising:
issuing to a network user an intelligent data carrier, wherein the intelligent data carrier comprises at least (i) one memory, adapted to store data, (ii) one input-output apparatus, adapted to input and output data, and (iii) one processor, adapted to process the data stored in said memory, wherein the intelligent data carrier is capable of connecting to a host computer device on the network thereby transmitting data via said input-output apparatus over the network, wherein the intelligent data carrier is adapted to establish a network identity for the network user through an authentication and encryption scheme; and
providing a dynamic datagram switch in a server on the network for dynamic allocation and swapping of datagrams in support of a multiplicity of applications.

37. The method of claim 36, wherein said dynamic datagram switch comprises a datagram schema and a parser, wherein said datagram schema comprises two or more datagrams, belonging to one or more datagram types, wherein each datagram type comprises a plurality of functions, and wherein said parser is adapted to parse the one or more datagram types.

38. The method of claim 36, wherein the authentication and encryption scheme comprises the following sequential steps:
(a) a request being caused to forward from the intelligent data carrier to the server that the intelligent data carrier be authenticated;
(b) the server presenting to the intelligent data carrier a plurality of authentication methods;
(c) the intelligent data carrier selecting one authentication method from said plurality through an event;
(d) the server sending the intelligent data carrier a demand, based on said selected method, for authentication data from the intelligent data carrier;
(e) the server transforming said authentication data received from the intelligent data carrier into one or more data authentication objects, wherein each of said data authentication objects is a data vector object, capable of being analyzed using one or more classifiers;
(f) the server analyzing said data authentication objects, according to said one or more classifiers, thereby determining the result of the authentication; and (g) the server sending said result to the intelligent data carrier, indicating a successful or failed authentication attempt.

39. The method of claim 38, wherein said event in step (c) comprises at least one of a click of a mouse, a touch on a screen, a keystroke, an utterance, and a biometric measurement.

40. The method of claim 38, wherein said demand in step (d) comprises at least one of a pseudo random and a true random code, wherein a pseudo random code is generated based on a mathematically pre-calculated list, and wherein the true random code is generated by sampling and processing a source of entropy outside of the system.

41. The method of claim 38, wherein said analyzing in step (f) is performed based on one or more analysis rules, wherein said one or more analysis rules comprise classification according to the one or more classifiers of step (e).

42. The method of claim 41, wherein said classification comprises speaker verification, wherein the data object vectors involve two classes, the target speaker and the impostor, wherein each class is characterized by a probability density function, and wherein the determining in step (f) is a binary decision problem.

43. The method of claim 38, wherein said determining in step (f) comprises computing at least one of the sum, superiority, and probability from said one or more data vector objects, based on the one or more classifiers of step (e), wherein the sum is one of a superior and a random sum computed from the one or more data vector obiects.

44. The method of claim 38, wherein said one or more classifiers in step (e) comprise a super classifier derived from the more than one data vector objects, wherein said super classifier is based on one of physical biometrics and performance biometrics, wherein physical biometrics comprises at least one of voice recognition, fingerprints, handprints, blood vessel patterns, DNA tests, retinal or iris scan, and face recognition, wherein performance biometrics comprises habits or naftems of individual behaviors.

45. The method of claim 36, wherein said authentication and encryption scheme comprises symmetrical and asymmetrical multi-cipher encryption, wherein said encryption uses at least one of output feedback, cipher feedback, cipher forwarding, and cipher block chaining.

46. The method of claim 45, wherein the encryption is based on Advanced Encryption Standard (AES) Rijndael.

47. The method of claim 36, wherein said authentication and encryption scheme implements Secure Key Exchange, wherein the Secure Key Exchange employs one of a public key sYstem and Elliptic Curve Cryptosystem private keys.

48. The method of claim 36, wherein the authentication and encryption scheme comprises at least one of a logic test adapted to validate that the intelligent data carrier has been registered with the server, a device test adapted to validate the physical parameters at the intelligent data carrier and the host computer device, and a personal test adapted to authenticate the user based on event-level data.

49. The method of claim 36, further comprising providing a first radar connector in the intelligent data carrier and a second radar connector in the server, wherein the first radar connector is adapted to connected to the second radar connector over the network, wherein the first and the second radar connector are adapted to monitor and control network connections.

50. The method of claim 49, wherein the first radar connector is further adapted to detect lost connections and initialize contact to the second radar connector thereby reestablishing connections.

51. The method of claim 36, further comprising providing an encrypted virtual file system in the server for dedicated data storage for the client.

52. The method of claim 36, wherein the dynamic datagram switch performs datagram allocation and swapping in real time.

53. The method of claim 36, wherein the dynamic datagram switch performs datagram allocation and swapping based on memory pointers of two or more datagrams.

54. A method for target delivery of one or more applications to a user, comprising:
   issuing the user an intelligent data carrier, adapted to dock onto a host computer device that is connected to a network on which a network server sits and communicate with the network server over the network, wherein the network server communicates with the intelligent data carrier through dynamically-switched datagrams in a datagram schema, wherein the intelligent data carrier comprises at least (i) one memory, adapted to store data, (ii) one input-output apparatus, adapted to input and output data, and (iii) one processor, adapted to process the data stored in said memory;
   the server authenticating the user through an authentication and encryption scheme; and
   granting the user access to the one or more applications upon successful authentication.

55. The method of claim 54, wherein said one or more applications are preloaded on the intelligent data carrier or installed on the network server or the host computer device.

56. The method of claim 55, wherein the host computer device is connected to the network via wired or wireless means.

57. The method of claim 55, wherein the host computer device comprises at least one of a desktop or laptop computer, a personal digital assistant (PDA), a mobile phone, a digital TV, an audio or video player, a computer game consol, a digital camera, a camera phone, and a network-enabled domestic appliance.

58. The method of claim 57, wherein the network-enabled domestic appliance is one of a network-enabled refrigerator, microwave, washer, dryer, and dishwasher.

59. The method of claim 54, wherein said one or more applications comprise at least one of window-based remote terminal server applications, applications on 3270/5250 terminal emulators for mainframe, directly embedded applications, and multimedia applications, wherein the directly embedded applications comprise at least one of database applications, data analysis tools, Customer Relation Management tools, and Enterprise Resource Planning packages.

* * * * *